United States Patent
Ruiz Delgado et al.

(10) Patent No.: US 9,281,880 B2
(45) Date of Patent: Mar. 8, 2016

(54) WIRELESS TRANSMISSION DEVICE AND WIRELESS RECEPTION DEVICE

(75) Inventors: Alvaro Ruiz Delgado, Osaka (JP);
Takashi Onodera, Osaka (JP);
Hiromichi Tomeba, Osaka (JP); Hiroshi Nakano, Osaka (JP); Minoru Kubota, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 125 days.

(21) Appl. No.: 14/239,088

(22) PCT Filed: Aug. 13, 2012

(86) PCT No.: PCT/JP2012/070619
§ 371 (c)(1),
(2), (4) Date: Feb. 14, 2014

(87) PCT Pub. No.: WO2013/024838
PCT Pub. Date: Feb. 21, 2013

(65) Prior Publication Data
US 2014/0204841 A1    Jul. 24, 2014

(30) Foreign Application Priority Data

Aug. 15, 2011 (JP) ................................ 2011-177718
Sep. 16, 2011 (JP) ................................ 2011-203597

(51) Int. Cl.
*H04W 4/00* (2009.01)
*H04B 7/04* (2006.01)
(Continued)

(52) U.S. Cl.
CPC ............ *H04B 7/0456* (2013.01); *H04B 7/0452* (2013.01); *H04B 7/0689* (2013.01); *H04L 2025/03802* (2013.01)

(58) Field of Classification Search
CPC ...... H04L 1/06; H04L 1/0001; H04B 7/0465; H04B 7/0452; H04B 7/0626; H04B 7/0639; H04B 7/0417; H04W 72/042
See application file for complete search history.

(56) References Cited

U.S. PATENT DOCUMENTS

| | | | |
|---|---|---|---|
| 7,961,808 B2 * | 6/2011 | Ihm et al. | ........................ 375/267 |
| 8,116,267 B2 | 2/2012 | van Rensburg et al. | |

(Continued)

FOREIGN PATENT DOCUMENTS

| | | | |
|---|---|---|---|
| JP | 2008-306732 A | 12/2008 | |
| JP | 2009-055607 A | 3/2009 | |

(Continued)

OTHER PUBLICATIONS

Harashima et al., "Matched-Transmission Technique for Channels With Intersymbol Interference", IEEE Transaction on Communications, vol. COM-20, No. 4, Aug. 1972, pp. 774-780.

(Continued)

*Primary Examiner* — Jung-Jen Liu
(74) *Attorney, Agent, or Firm* — Birch, Stewart, Kolasch & Birch, LLP

(57) ABSTRACT

A wireless reception device is notified of whether a multi-user MIMO signal transmitted from a wireless transmission device has undergone linear precoding or non-linear precoding without increasing the amount of control information. A wireless transmission device having a plurality of transmit antennas 303, for transmitting spatially multiplexed signals to a plurality of wireless reception devices includes a group construction unit 307 configured to classify the wireless reception devices into a plurality of groups and to determine a precoding scheme for each of the groups, a selection unit 315 configured to select one group from among the groups, and a precoding unit 323 configured to precode transmit data addressed to each of wireless reception devices belonging to the selected group, using a precoding scheme determined for the selected group.

16 Claims, 19 Drawing Sheets

(51) Int. Cl.
*H04B 7/06* (2006.01)
*H04L 25/03* (2006.01)

(56) References Cited

U.S. PATENT DOCUMENTS

| | | | |
|---|---|---|---|
| 8,249,613 B2 | 8/2012 | Liu et al. | |
| 8,316,267 B2* | 11/2012 | Sun et al. | 714/747 |
| 8,374,109 B2 | 2/2013 | Luo et al. | |
| 8,374,275 B2 | 2/2013 | Yu et al. | |
| 2007/0183380 A1* | 8/2007 | Rensburg et al. | 370/338 |
| 2008/0159425 A1* | 7/2008 | Khojastepour et al. | 375/260 |
| 2009/0052571 A1 | 2/2009 | Liu et al. | |
| 2009/0060013 A1* | 3/2009 | Ashikhmin et al. | 375/222 |
| 2009/0116582 A1* | 5/2009 | Ashikhmin et al. | 375/296 |
| 2009/0122854 A1* | 5/2009 | Zhu et al. | 375/232 |
| 2009/0180454 A1* | 7/2009 | Au et al. | 370/342 |
| 2009/0279500 A1 | 11/2009 | Luo et al. | |
| 2010/0061479 A1* | 3/2010 | Mazet et al. | 375/295 |
| 2010/0142633 A1* | 6/2010 | Yu et al. | 375/260 |
| 2010/0226417 A1* | 9/2010 | Ihm et al. | 375/219 |
| 2010/0246715 A1* | 9/2010 | Dao et al. | 375/296 |
| 2010/0303002 A1* | 12/2010 | Zorba Barah et al. | 370/316 |
| 2010/0316163 A1* | 12/2010 | Forenza et al. | 375/296 |
| 2011/0044193 A1* | 2/2011 | Forenza et al. | 370/252 |
| 2011/0194511 A1 | 8/2011 | Chen et al. | |
| 2011/0243045 A1* | 10/2011 | Dao et al. | 370/310 |
| 2011/0305263 A1* | 12/2011 | Jöngren et al. | 375/219 |
| 2012/0069924 A1* | 3/2012 | Khojastepour et al. | 375/267 |
| 2012/0082258 A1* | 4/2012 | Nuzman et al. | 375/285 |
| 2012/0087430 A1* | 4/2012 | Forenza et al. | 375/267 |
| 2012/0093078 A1* | 4/2012 | Perlman et al. | 370/328 |
| 2012/0270535 A1* | 10/2012 | Chen et al. | 455/422.1 |
| 2012/0294240 A1* | 11/2012 | Nakano et al. | 370/328 |
| 2012/0307706 A1* | 12/2012 | Nakano et al. | 370/312 |
| 2012/0314570 A1* | 12/2012 | Forenza et al. | 370/230 |
| 2013/0034040 A1* | 2/2013 | Priotti | 370/312 |
| 2013/0101062 A1* | 4/2013 | Giridhar et al. | 375/285 |
| 2014/0044209 A1* | 2/2014 | Moulsley et al. | 375/267 |
| 2014/0050277 A1* | 2/2014 | Wu et al. | 375/267 |

FOREIGN PATENT DOCUMENTS

| | | |
|---|---|---|
| JP | 2010-521873 A | 6/2010 |
| JP | 2011-35828 A | 2/2011 |
| JP | 2011-516012 A | 5/2011 |
| JP | 2011-146995 A | 7/2011 |
| WO | WO 2011/096138 A1 | 8/2011 |

OTHER PUBLICATIONS

Joham et al., "MMSE Approaches to Multiuser Spatio-Temporal Tomlinson-Harashima Precoding", Proc. 5th Int. ITG Conf. on Source and Channel Coding, Jan. 2004, pp. 387-394.

Liu et al., "Improved Tomlinson-Harashima Precoding for the Downlink of Multiple Antenna Multi-User System", Proc. IEEE Wireless and Communications and Networking Conference, Mar. 2005, pp. 466-472.

Nakano et al., "Adaptive THP Scheme Control for Downlink MU-MIMO System", IEICE Technical Report, RCS2009-293, Mar. 2010, pp. 203-208.

Robert Stacey, Intel, "IEEE P802.11 Wireless LANs Specification Framework for Tgac", IEEE 802.11-09/0992r21, Jan. 2011, pp. 1-50.

Spencer et al., "An Introduction to the Multi-User MIMO Downlink", IEEE Communication Magazine, vol. 42, Issue 10, Oct. 2004, pp. 60-67.

Takeda et al., "Single-Carrier HARQ Using Joing THP and FDE", Proc. 2007 IEEE 66th Vehicular Technology Conference (VTC-2007 Fall), Sep. 2007, pp. 1188-1192.

Wolniansky et al., "V-BLAST: An Architecture for Realizing Very High Data Rates Over the Rich-Scattering Wireless Channel", Proc. ISSSE-98, Sep. 1998, pp. 295-300.

Daewon Lee, LG Electronics, "STA Group Management for MU-MIMO", IEEE 802.11-10/0581r0, May 17, 2010, Slides 1-13.

Joonsuk Kim et al., "GroupID Concept for Downlink MU-MIMO Transmission", IEEE 802.11-10/0073r2, Mar. 15, 2010, Slides 1-10.

* cited by examiner

FIG. 7

| GROUP ID | PRECODING SCHEME | WIRELESS RECEPTION DEVICES BELONGING TO GROUP |
|---|---|---|
| 1 | LINEAR | 200-1, 200-2, 200-3, 200-6 |
| 2 | LINEAR | 200-2, 200-4, 200-5, 200-8 |
| 3 | NON-LINEAR | 200-1, 200-2, 200-4, 200-7 |
| 4 | NON-LINEAR | 200-1, 200-4, 200-7 |

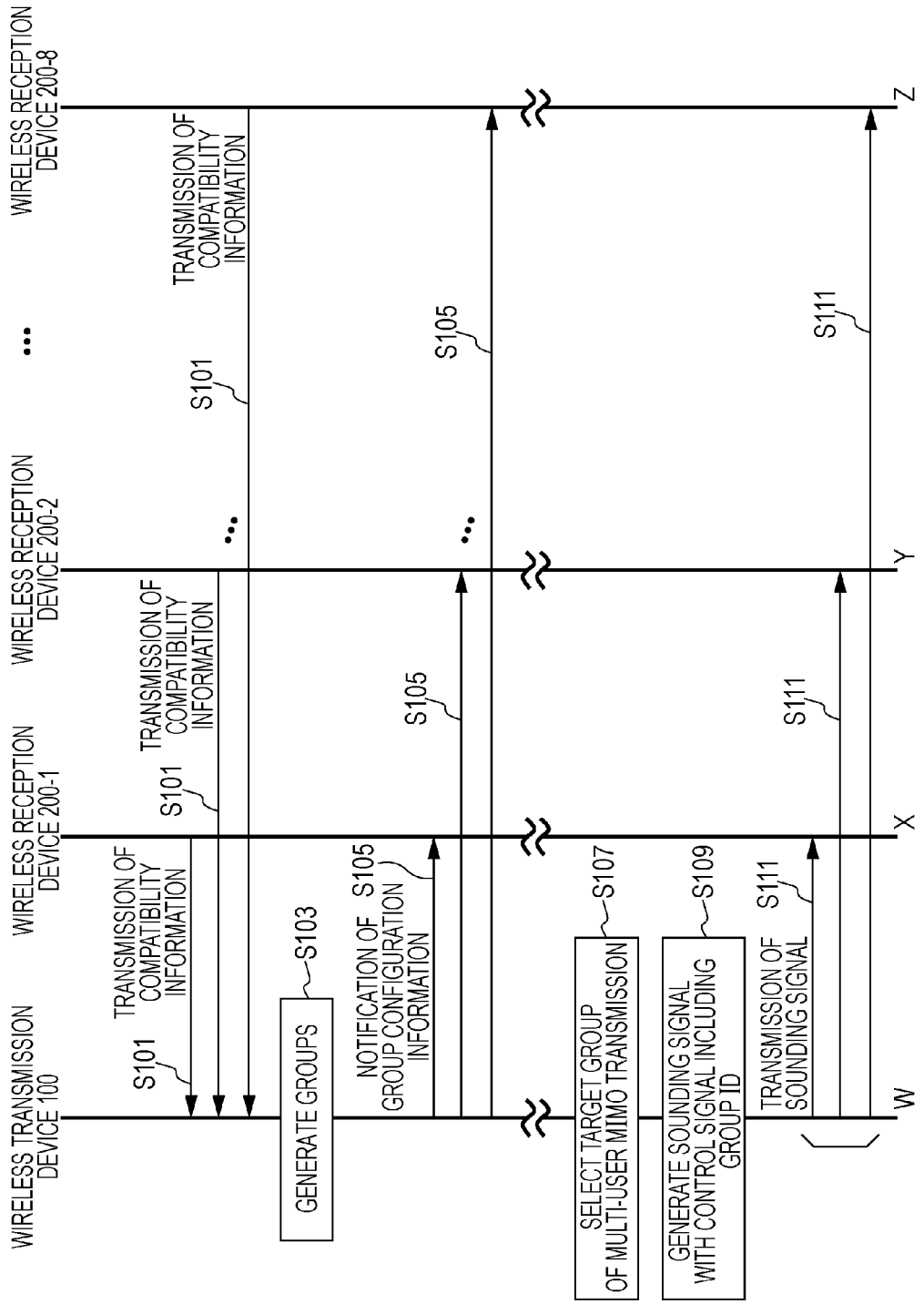

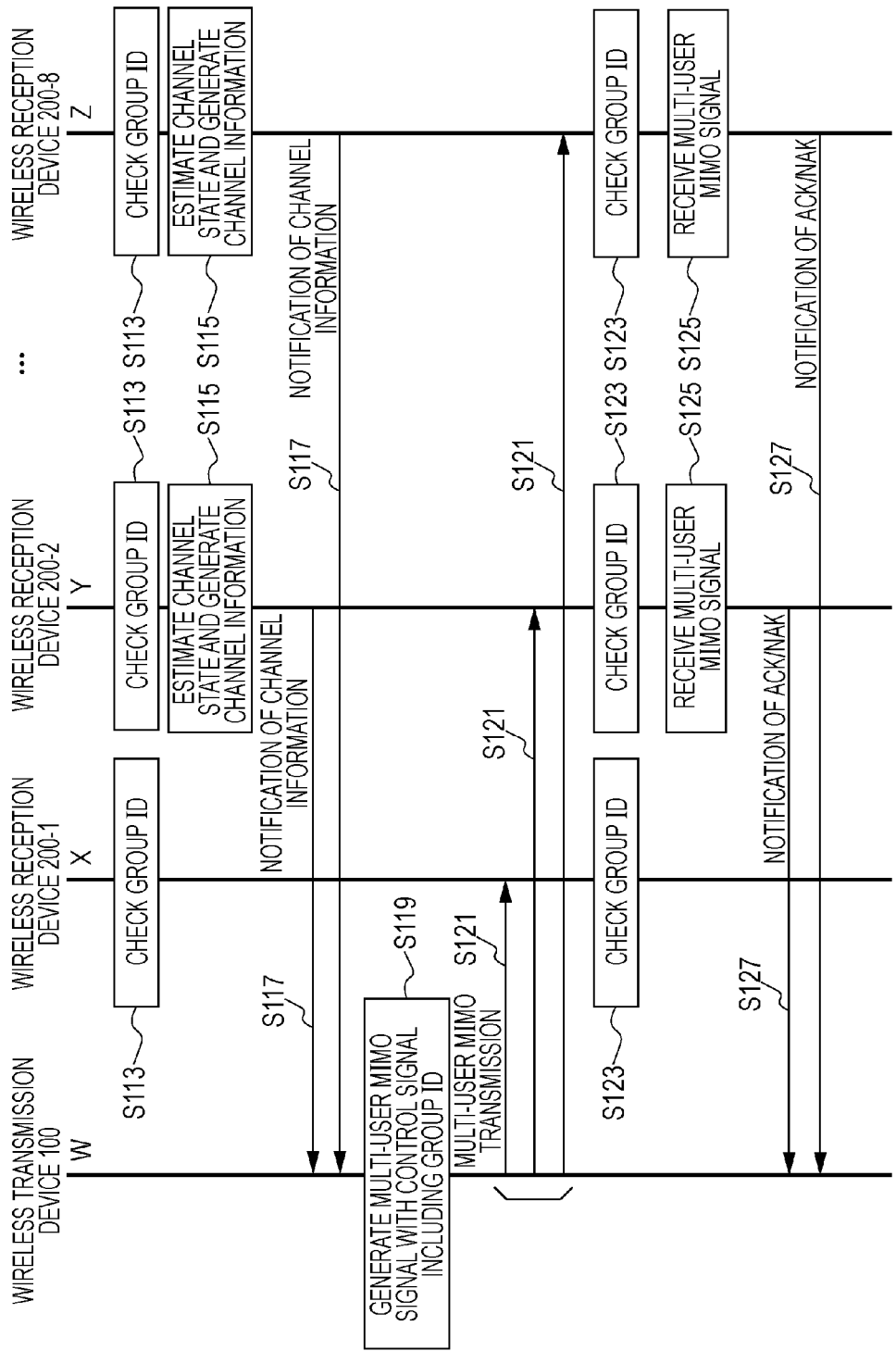

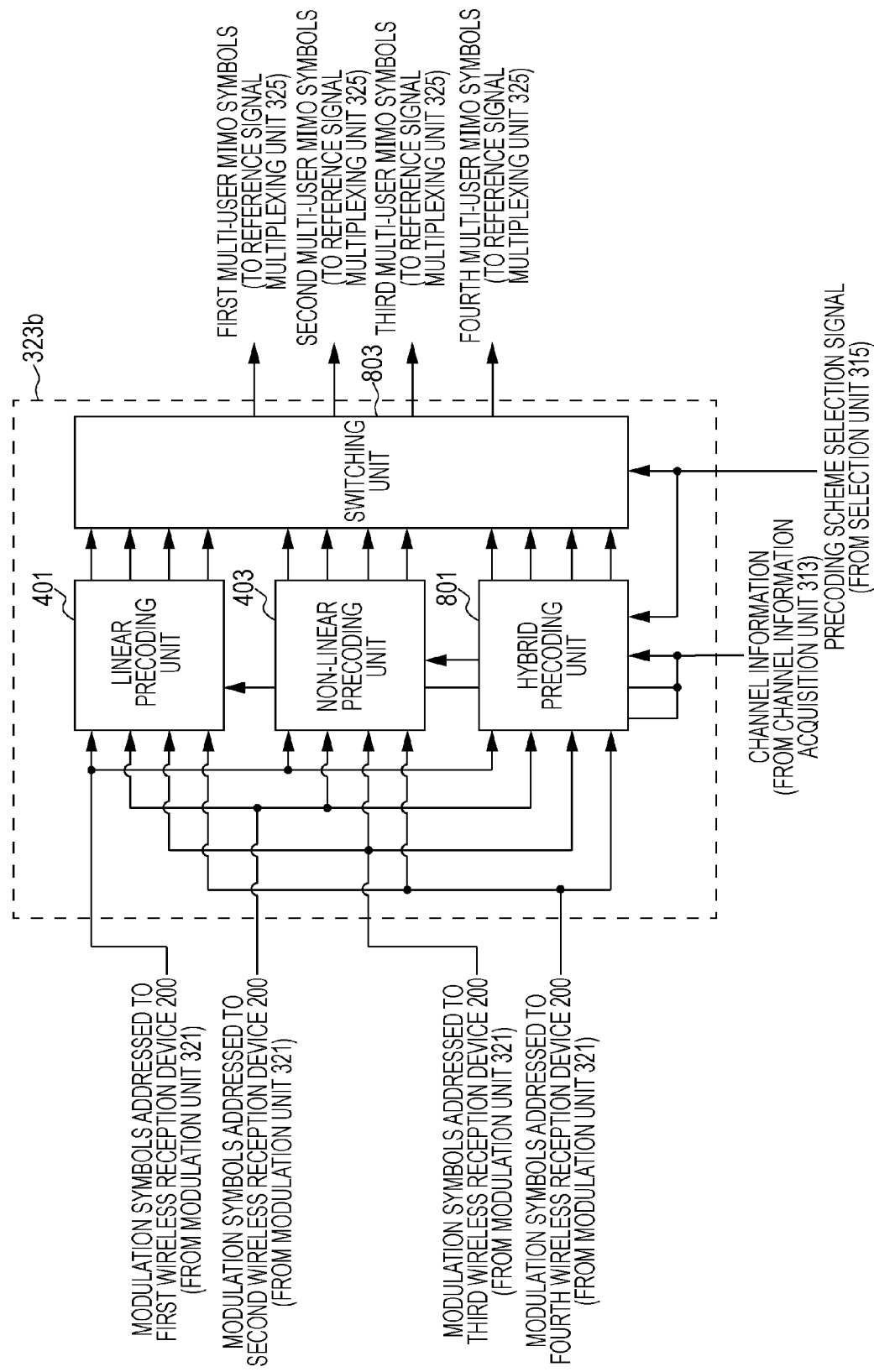

FIG. 11

| GROUP ID | PRECODING SCHEME | WIRELESS RECEPTION DEVICES BELONGING TO GROUP |
|---|---|---|
| 1 | LINEAR | 200-1, 200-2, 200-3, 200-6 |
| 2 | LINEAR | 200-2, 200-4, 200-5, 200-8 |
| 3 | NON-LINEAR | 200-1, 200-2, 200-4, 200-7 |
| 4 | NON-LINEAR | 200-1, 200-4, 200-7 |
| 5 | HYBRID | 200-3 (LINEAR), 200-5 (LINEAR), 200-1 (NON-LINEAR), 200-7 (NON-LINEAR) |
| 6 | HYBRID | 200-6 (LINEAR), 200-8 (LINEAR), 200-2 (NON-LINEAR), 200-4 (NON-LINEAR) |

FIG. 14

| GROUP ID | PRECODING SCHEME | WIRELESS RECEPTION DEVICES BELONGING TO GROUP |
|---|---|---|
| 0 | | UNOCCUPIED |
| 1 | LINEAR | 200-1, 200-2, 200-4, 200-7 |
| 2 | | 200-2, 200-4, 200-5, 200-8 |
| ⋮ | | ⋮ |
| 31 | | 200-1, 200-2, 200-5, 200-7 |
| 32 | NON-LINEAR | 200-3, 200-5, 200-6, 200-8 |
| 33 | | 200-5, 200-3, 200-8, 200-6 |
| ⋮ | | ⋮ |
| 62 | | 200-3, 200-5, 200-8 |
| 63 | | UNOCCUPIED |

FIG. 15

| GROUP ID | PRECODING SCHEME | WIRELESS RECEPTION DEVICES BELONGING TO GROUP |
|---|---|---|
| 0 | | UNOCCUPIED |
| 1 | LINEAR | 200-1, 200-2, 200-4, 200-7 |
| 2 | | 200-2, 200-4, 200-5, 200-8 |
| ⋮ | | ⋮ |
| 31 | | 200-1, 200-2, 200-5, 200-7 |
| 32 | NON-LINEAR | 200-3, 200-5, 200-6, 200-8 |
| 33 | | 200-1, 200-3, 200-6, 200-7 |
| ⋮ | | ⋮ |
| 62 | | 200-2, 200-5, 200-8 |
| 63 | | UNOCCUPIED |

FIG. 16

| GROUP ID | PRECODING SCHEME | WIRELESS RECEPTION DEVICES BELONGING TO GROUP |
|---|---|---|
| 0 | | UNOCCUPIED |
| 1 | LINEAR | 200-1, 200-2, 200-4, 200-7 |
| 2 | | 200-2, 200-4, 200-5, 200-8 |
| ⋮ | | ⋮ |
| 20 | | 200-1, 200-2, 200-5, 200-7 |
| 21 | NON-LINEAR | 200-3, 200-5, 200-6, 200-8 |
| 22 | | 200-1, 200-3, 200-6, 200-7 |
| ⋮ | | ⋮ |
| 40 | | 200-2, 200-5, 200-8 |
| 41 | HYBRID LINEAR AND NON-LINEAR | 200-2, 200-4, 200-5, 200-8 |
| 42 | | 200-3, 200-5, 200-6, 200-8 |
| ⋮ | | ⋮ |
| 62 | | 200-1, 200-3, 200-6, 200-7 |
| 63 | | UNOCCUPIED |

WIRELESS TRANSMISSION DEVICE AND WIRELESS RECEPTION DEVICE

TECHNICAL FIELD

The present invention relates to a wireless transmission device, a wireless reception device, and a wireless communication system for simultaneous data transmission from a wireless transmission device to a plurality of wireless reception devices using spatial multiplexing.

BACKGROUND ART

MIMO (Multiple-Input Multiple-Output) transmission techniques that allow, with the use of a plurality of antennas for transmission and reception, simultaneous communication of a plurality of different data sequences (data streams) in the same frequency band by spatial multiplexing have been practically used in wireless LANs, cellular systems, and the like. In single user MIMO that allows transmission of a plurality of different data sequences to one certain wireless reception device (terminal device) by spatial multiplexing, there has been a method for precoding a transmit signal at a wireless transmission device (base station device, access point) before transmission in order to improve the performance of the wireless reception device for separating and detecting a plurality of data sequences. Furthermore, in next-generation cellular systems, wireless LANs, and the like, there has been proposed a system in which a wireless transmission device includes transmit antennas the number of which is significantly larger than the number of receive antennas included in a wireless reception device. In order to make effective use of the transmit antennas at the wireless transmission device in this system to further improve system throughput, there has been proposed multi-user MIMO that provides MIMO multiplexing of data sequences addressed to a plurality of wireless reception devices (users).

However, it is difficult for each of a plurality of wireless reception devices that receive signals multiplexed in multi-user MIMO to know the signals received by the other wireless reception devices. Under these circumstances, therefore, the performance will significantly degrade due to Multi-User Interference (MUI) caused between streams addressed to individual users. Accordingly, there have been proposed several methods that enable a wireless transmission device to generate a transmit signal capable of MUI suppression at the time of reception at wireless reception devices without imposing large loads on the wireless reception devices if the wireless transmission device knows CSI (Channel State Information), which is channel state information from each transmit antenna at the wireless transmission device to each receive antenna at each wireless reception device (NPL 1).

For example, there is a method for precoding a transmit signal at a wireless transmission device before transmission so as to enable a wireless reception device to receive the signal with MUI suppressed at the time of reception. Examples of this method include linear precoding (LP) for precoding a transmit signal through linear processing, such as Zero-forcing (ZF) precoding for weighting a transmit signal (multiplying a transmit signal by $W=H^{-1}$) using as a weight matrix (linear filter) $W$ the inverse matrix $H^{-1}$ (or pseudo-inverse matrix $H^{\dagger}=H^{H}(HH^{H})^{-}$: the superscript H denotes the Hermitian conjugate) of a channel matrix H whose elements correspond to complex channel gain between each transmit antenna and each receive antenna at each wireless reception device, which is determined from CSI, and Minimum Mean Square Error (MMSE) precoding for weighting a transmit signal with a weight matrix (linear filter) $W=H^{H}(HH^{H}+\alpha I)^{-1}$ (I denotes a unit matrix and $\alpha$ denotes a normalization factor) determined by MMSE criteria.

Other examples include non-linear precoding (NLP) for precoding a transmit signal through non-linear processing to subtract an interference signal component determined from CSI from the transmit signal in advance and to encode the interference-subtracted signal to constellation points where transmission power is reduced in a signal space in order to suppress an increase in transmission power after interference subtraction. One type of non-linear precoding, Tomlinson-Harashima Precoding (THP), which allows suppression of an increase in transmission power by performing a modulo (remainder) operation on signals at both a wireless transmission device and wireless reception devices, has been proposed (NPL 2, NPL 3, NPL 4). In this case, wireless reception devices on the receive side also perform a modulo operation on received signals in a manner similar to that for transmission. Here, a modulo operation $Mod_\tau$ with a modulo width $\tau$ is represented by Expression (1) if a complex vector representing an interference-subtracted signal on the transmit side or a received signal on the receive side is represented by v. In Expression (1), j denotes the imaginary unit, floor(a) denotes a maximum integer not exceeding a, and Re(v) and Im(v) denote the real part (corresponding to the in-phase component of a signal) and the imaginary part (corresponding to the quadrature component of a signal) of the complex number v, respectively. The term "non-linear processing", as used here, mainly refers to processing that uses processing in which discontinuity points are present in the output of the modulo operation or the like.

[Math. 1]

$$Mod_\tau(v) = v - \text{floor}\left(\frac{\text{Re}(v) + \frac{\tau}{2}}{\tau}\right) \cdot \tau - j \cdot \text{floor}\left(\frac{\text{Im}(v) + \frac{\tau}{2}}{\tau}\right) \cdot \tau \quad (1)$$

Another scheme has been proposed that takes into account performance degradation, called Modulo-Loss at a low Signal to Noise power Ratio (SNR), which is caused by modulo operation in THP, in which processing similar to linear precoding is performed without application of a modulo operation to a terminal with a low MUI and a small effect of transmission power suppression achieved by the modulo operation, whereas non-linear precoding based on THP is performed with application of a modulo operation to only a terminal with a high MUI and a large effect of transmission power suppression achieved by the modulo operation (NPL 6).

On the other hand, a method for identifying a plurality of wireless reception devices to which data sequences spatially multiplexed into multi-user MIMO signals, which are transmitted from a wireless transmission device, are addressed, namely, a method for determining combinations (groups) of wireless reception devices for which spatial multiplexing with multi-user MIMO processing is performed and embedding group IDs (GIDS) each identifying one of the groups into control information of transmit frames when the frames are sent via multi-user MIMO transmission, has been proposed in wireless LAN standard IEEE (The Institute of Electrical and Electronics Engineers, Inc.) 802.11ac under establishment (NPL 7). Here, each wireless reception device may belong to a plurality of groups. A wireless transmission device (access point) determines combinations (groups) of wireless reception devices for which spatial multiplexing with multi-user MIMO is performed, before multi-user MIMO transmission, and adds group IDs each identifying one of the groups to notify each of the wireless reception devices of a group to which the wireless reception device belongs. The wireless transmission device also notifies each of the wireless reception devices of the group configurations.

CITATION LIST

Non Patent Literature

NPL 1: Spencer et al., "An Introduction to the Multi-User MIMO Downlink," IEEE Communication Magazine, Vol. 42, Issue 10, p. 60-67, October 2004

NPL 2: Harashima et al., "Matched-Transmission Technique for Channels With Intersymbol Interference," IEEE Transaction on Communications, Vol.COM-20, No. 4, p. 774-780, August 1972

NPL 3: J. Liu et al., "Improved Tomlinson-Harashima Precoding for the Downlink of Multiple Antenna Multi-User Systems," Proc. IEEE Wireless and Communications and Networking Conference, p. 466-472, March 2005

NPL 4: M. Joham et al., "MMSE Approaches to Multiuser Spatio-Temporal Tomlinson-Harashima Precoding," Proc. 5th Int. ITG Conf. on Source and Channel Coding, p. 387-394, January 2004

NPL 5: P. W. Wolniansky et al., "V-BLAST: an architecture for realizing very high data rates over the rich-scattering wireless channel," Proc. ISSSE-98, p. 295-300, September 1998

NPL 6: Nakano et al., "Adaptive THP Scheme Control for Downlink MU-MIMO Systems," Technical Report of IEICE, RCS2009-293, March 2010

NPL 7: "IEEE P802.11 Wireless LANs Specification Framework for TGac," IEEE 802.11-09/0992r21, January 2011

NPL 8: Kazuki Takeda and others, "Single-Carrier HARQ Using Joint THP and FDE," Proc. 2007 IEEE 66th Vehicular Technology Conference (VTC-2007 Fall), p. 1188-1192, September 2007

SUMMARY OF INVENTION

Technical Problem

A wireless reception device that receives a signal which has been interference-suppressed by non-linear precoding and transmitted needs to perform, unlike the case of linear precoding, a modulo operation on the received signal in a manner similar to that on the transmit side. Accordingly, in a case where two types of interference suppression schemes are used in a wireless communication system in a mixed manner, such as in a case where a wireless transmission device supports both linear precoding and non-linear precoding and some wireless reception devices support both linear precoding and non-linear precoding, or in a case where, as in NPL 6, a wireless transmission device performs interference suppression by simultaneously using a combination of linear precoding and non-linear precoding, wireless reception devices need to switch between performing modulo operation and not performing modulo operation in accordance with the interference suppression scheme. This requires that the wireless transmission device notify a reception device that is to receive a signal which has been interference-suppressed and transmitted of whether the signal to be received by the wireless reception device has undergone linear precoding or non-linear precoding, by using control information or the like, causing a problem of increasing the amount of control information.

The present invention has been made in view of the foregoing situation, and it is an object of the present invention to provide a wireless transmission device, a wireless reception device, a program, an integrated circuit, and a wireless communication system that enable notification of a wireless reception device of whether a multi-user MIMO signal transmitted from a wireless transmission device has undergone linear precoding or non-linear precoding, without increasing the amount of control information.

Solution to Problem (1-1) In order to achieve the foregoing object, the present invention takes the following solutions: A wireless transmission device of the present invention is a wireless transmission device having a plurality of transmit antennas, for transmitting spatially multiplexed signals to a plurality of wireless reception devices, including a group construction unit configured to cause each of the plurality of wireless reception devices to belong to at least one group and configured to determine a precoding scheme for each of the groups; a selection unit configured to select one group from among the groups; and a precoding unit configured to precode transmit data addressed to each of wireless reception devices belonging to the selected group using a precoding scheme determined for the selected group.

In this manner, transmit data addressed to each of wireless reception devices belonging to a selected group is preceded using a preceding scheme determined for the selected group. Thus, a wireless reception device can identify a preceding scheme by which a spatially multiplexed signal transmitted from a wireless transmission device has been preceded, from the group. As a result, it is possible to notify wireless reception devices of preceding schemes without increasing the amount of control information.

(1-2) Furthermore, the wireless transmission device of the present invention further includes a group storage unit configured to store the determined groups; a configuration information generation unit configured to generate group configuration information on each of the groups; and an identification information generation unit configured to generate group identification information on the selected group, wherein the group configuration information, the group identification information, and the precoded signals are transmitted to individual wireless reception devices belonging to the selected group.

This configuration enables notification of wireless reception devices of precoding schemes without increasing the amount of control information.

(1-3) Furthermore, in the wireless transmission device of the present invention, the precoding scheme is one of linear precoding or non-linear precoding.

This configuration enables supporting of both linear preceding and non-linear precoding, and also enables switching between them for use.

(1-4) Furthermore, a wireless transmission device of the present invention is a wireless transmission device having a plurality of transmit antennas, for transmitting spatially multiplexed signals to a plurality of wireless reception devices, including a group construction unit configured to cause each of the plurality of wireless reception devices to belong to at least one group and configured to determine a preceding scheme for each of wireless reception devices belonging to each of the groups; a selection unit configured to select one group from among the groups; and a precoding unit configured to precode transmit data addressed to each of wireless reception devices belonging to the selected group using a precoding scheme determined for each of the wireless reception devices.

In this manner, transmit data addressed to each of wireless reception devices belonging to a selected group is precoded using a precoding scheme determined for each of the wireless reception devices. Thus, a wireless reception device can identify a precoding scheme by which a spatially multiplexed signal transmitted from a wireless transmission device has been precoded, from the group. As a result, it is possible to notify wireless reception devices of precoding schemes without increasing the amount of control information. It is also possible to use a different precoding scheme for each of a plurality of wireless reception devices so as to use them in a mixed manner.

(1-5) Furthermore, the wireless transmission device of the present invention further includes a group storage unit configured to store the determined groups; a configuration information generation unit configured to generate group configuration information on each of the groups; and an identification information generation unit configured to generate group identification information on the selected group, wherein the group configuration information, the group identification information, and the precoded signals are transmitted to individual wireless reception devices belonging to the selected group.

This configuration enables notification of wireless reception devices of precoding schemes without increasing the amount of control information.

(1-6) Furthermore, in the wireless transmission device of the present invention, the precoding scheme is one of linear precoding or non-linear precoding.

This configuration enables supporting of both linear precoding and non-linear precoding, and also enables switching between them for use.

(1-7) Furthermore, a wireless reception device of the present invention is a wireless reception device for receiving a spatially multiplexed signal from a wireless transmission device having a plurality of transmit antennas, including a reception unit configured to receive group configuration information and group identification information on a group to which a wireless reception device to which the spatially multiplexed signal is to be transmitted belongs; a determination unit configured to determine whether the wireless reception device belongs to the group on the basis of the group configuration information and the group identification information; and a reception processing unit configured to perform reception processing on a signal addressed to the wireless reception device in accordance with a precoding scheme determined for each of the groups in a case where it is determined that the wireless reception device belongs to the group.

In this manner, in a case where the wireless reception device belongs to the group, reception processing is performed in accordance with a precoding scheme determined for each of the groups. Thus, the wireless reception device can identify a precoding scheme by which a spatially multiplexed signal transmitted from a wireless transmission device has been precoded, from the group. As a result, it is possible to notify a wireless reception device of a precoding scheme without increasing the amount of control information.

(1-8) Furthermore, in the wireless reception device of the present invention, the precoding scheme is one of linear precoding or non-linear precoding, and the reception processing unit performs a modulo operation on a received data symbol in a case where the precoding scheme is non-linear precoding.

This configuration enables supporting of both linear precoding and non-linear precoding, and also enables switching between them for use.

(1-9) Furthermore, a wireless reception device of the present invention is a wireless reception device for receiving a spatially multiplexed signal from a wireless transmission device having a plurality of transmit antennas, including a reception unit configured to receive group configuration information and group identification information on a group to which a wireless reception device to which the spatially multiplexed signal is to be transmitted belongs; a determination unit configured to determine whether the wireless reception device belongs to the group on the basis of the group configuration information and the group identification information; and a reception processing unit configured to perform reception processing on a signal addressed to the wireless reception device in accordance with a precoding scheme determined for the wireless reception device in the group in a case where it is determined that the wireless reception device belongs to the group.

In this manner, in a case where the wireless reception device belongs to the group, reception processing is performed on a signal addressed to the wireless reception device in accordance with a precoding scheme determined for the wireless reception device in the group. Thus, the wireless reception device can identify a precoding scheme by which a spatially multiplexed signal transmitted from a wireless transmission device has been precoded, from the group. As a result, it is possible to notify a wireless reception device of a precoding scheme without increasing the amount of control information.

(1-10) Furthermore, in the wireless reception device of the present invention, the precoding scheme is one of linear precoding or non-linear precoding, and the reception processing unit performs a modulo operation on a received data symbol in a case where the precoding scheme is non-linear precoding.

This configuration enables supporting of both linear precoding and non-linear precoding, and also enables switching between them for use.

(1-11) Furthermore, a program of the present invention is a program for controlling a wireless transmission device having a plurality of transmit antennas and configured to transmit spatially multiplexed signals to a plurality of wireless reception devices, the program causing a computer to execute a series of operations including an operation of causing each of the plurality of wireless reception devices to belong to at least one group; an operation of determining a precoding scheme for each of the groups; an operation of selecting one group from among the groups; and an operation of precoding transmit data addressed to each of wireless reception devices belonging to the selected group using a precoding scheme determined for the selected group.

In this manner, transmit data addressed to each of wireless reception devices belonging to a selected group is precoded using a precoding scheme determined for the selected group. Thus, a wireless reception device can identify a precoding scheme by which a spatially multiplexed signal transmitted from a wireless transmission device has been precoded, from the group. As a result, it is possible to notify wireless reception devices of precoding schemes without increasing the amount of control information.

(1-12) Furthermore, a program of the present invention is a program for controlling a wireless transmission device having a plurality of transmit antennas and configured to transmit spatially multiplexed signals to a plurality of wireless reception devices, the program causing a computer to execute a series of operations including an operation of causing each of the plurality of wireless reception devices to belong to at least one group; an operation of determining a precoding scheme for each of wireless reception devices belonging to each of the groups; an operation of selecting one group from among the groups; and an operation of precoding transmit data addressed to each of wireless reception devices belonging to the selected group using a precoding scheme determined for each of the wireless reception devices.

In this manner, transmit data addressed to each of wireless reception devices belonging to a selected group is precoded using a precoding scheme determined for each of the wireless reception devices. Thus, a wireless reception device can identify a precoding scheme by which a spatially multiplexed signal transmitted from a wireless transmission device has been precoded, from the group. As a result, it is possible to notify wireless reception devices of precoding schemes without increasing the amount of control information. It is also possible to use a different precoding scheme for each of a plurality of wireless reception devices so as to use them in a mixed manner.

(1-13) Furthermore, a program of the present invention is a program for controlling a wireless reception device for receiving a spatially multiplexed signal from a wireless transmission device having a plurality of transmit antennas, the program causing a computer to execute a series of operations including an operation of receiving group configuration information and group identification information on a group to which a wireless reception device to which the spatially multiplexed signal is to be transmitted belongs; an operation of determining whether the wireless reception device belongs to the group on the basis of the group configuration information and the group identification information; and an operation of receiving a signal addressed to the wireless reception device in accordance with a precoding scheme determined for each of the groups in a case where it is determined that the wireless reception device belongs to the group.

In this manner, in a case where the wireless reception device belongs to the group, the wireless reception device receives a signal addressed to the wireless reception device in accordance with a precoding scheme determined for each of the groups. Thus, the wireless reception device can identify a precoding scheme by which a spatially multiplexed signal transmitted from a wireless transmission device has been precoded, from the group. As a result, it is possible to notify a wireless reception device of a precoding scheme without increasing the amount of control information.

(1-14) Furthermore, a program of the present invention is a program for controlling a wireless reception device for receiving a spatially multiplexed signal from a wireless transmission device having a plurality of transmit antennas, the program causing a computer to execute a series of operations including an operation of receiving group configuration information and group identification information on a group to which a wireless reception device to which the spatially multiplexed signal is to be transmitted belongs; an operation of determining whether the wireless reception device belongs to the group on the basis of the group configuration information and the group identification information; and an operation of receiving a signal addressed to the wireless reception device in accordance with a precoding scheme determined for each of wireless reception devices belonging to the group in a case where it is determined that the wireless reception device belongs to the group.

In this manner, in a case where the wireless reception device belongs to the group, the wireless reception device receives a signal addressed to the wireless reception device in accordance with a precoding scheme determined for each of wireless reception devices belonging to the group. Thus, the wireless reception device can identify a precoding scheme by which a spatially multiplexed signal transmitted from a wireless transmission device has been precoded, from the group. As a result, it is possible to notify a wireless reception device of a precoding scheme without increasing the amount of control information.

(1-15) Furthermore, an integrated circuit of the present invention is an integrated circuit mounted in a wireless transmission device having a plurality of transmit antennas to cause the wireless transmission device to implement a plurality of functions, the integrated circuit causing the wireless transmission device to implement a series of functions including a function to transmit spatially multiplexed signals to a plurality of wireless reception devices; a function to cause each of the plurality of wireless reception devices to belong to at least one group; a function to determine a precoding scheme for each of the groups; a function to select one group from among the groups; and a function to precode transmit data addressed to each of wireless reception devices belonging to the selected group using a precoding scheme determined for the selected group.

In this manner, transmit data addressed to each of wireless reception devices belonging to a selected group is precoded using a precoding scheme determined for the selected group. Thus, a wireless reception device can identify a precoding scheme by which a spatially multiplexed signal transmitted from a wireless transmission device has been precoded, from the group. As a result, it is possible to notify a wireless reception device of a precoding scheme without increasing the amount of control information.

(1-16) Furthermore, an integrated circuit of the present invention is an integrated circuit mounted in a wireless transmission device having a plurality of transmit antennas to cause the wireless transmission device to implement a plurality of functions, the integrated circuit causing the wireless transmission device to implement a series of functions including a function to transmit spatially multiplexed signals to a plurality of wireless reception devices; a function to cause each of the plurality of wireless reception devices to belong to at least one group; a function to determine a precoding scheme for each of wireless reception devices belonging to each of the groups; a function to select one group from among the groups; and a function to precode transmit data addressed to each of wireless reception devices belonging to the selected group using a precoding scheme determined for each of the wireless reception devices.

In this manner, transmit data addressed to each of wireless reception devices belonging to a selected group is precoded using a precoding scheme determined for each of the wireless reception devices. Thus, a wireless reception device can identify a precoding scheme by which a spatially multiplexed signal transmitted from a wireless transmission device has been precoded, from the group. As a result, it is possible to notify wireless reception devices of precoding schemes without increasing the amount of control information. It is also possible to use a different precoding scheme for each of a plurality of wireless reception devices so as to use them in a mixed manner.

(1-17) Furthermore, an integrated circuit of the present invention is an integrated circuit mounted in a wireless reception device to cause the wireless reception device to implement a plurality of functions, the integrated circuit causing the wireless reception device to implement a series of functions including a function to receive a spatially multiplexed signal from a wireless transmission device having a plurality of transmit antennas; a function to receive group configuration information and group identification information on a group to which a wireless reception device to which the spatially multiplexed signal is to be transmitted belongs; a function to determine whether the wireless reception device belongs to the group on the basis of the group configuration information and the group identification information; and a function to receive a signal addressed to the wireless reception device in accordance with a precoding scheme determined for each of the groups in a case where it is determined that the wireless reception device belongs to the group.

In this manner, in a case where the wireless reception device belongs to the group, the wireless reception device receives a signal addressed to the wireless reception device in accordance with a precoding scheme determined for each of the groups. Thus, the wireless reception device can identify a precoding scheme by which a spatially multiplexed signal transmitted from a wireless transmission device has been precoded, from the group. As a result, it is possible to notify a wireless reception device of a precoding scheme without increasing the amount of control information.

(1-18) Furthermore, an integrated circuit of the present invention is an integrated circuit mounted in a wireless reception device to cause the wireless reception device to implement a plurality of functions, the integrated circuit causing the wireless reception device to implement a series of functions including a function to receive a spatially multiplexed signal from a wireless transmission device having a plurality of transmit antennas; a function to receive group configuration information and group identification information on a group to which a wireless reception device to which the spatially multiplexed signal is to be transmitted belongs; a function to determine whether the wireless reception device belongs to the group on the basis of the group configuration information and the group identification information; and a function to receive a signal addressed to the wireless reception device in accordance with a precoding scheme determined for each of wireless reception devices belonging to the group in a case where it is determined that the wireless reception device belongs to the group.

In this manner, in a case where the wireless reception device belongs to the group, the wireless reception device receives a signal addressed to the wireless reception device in accordance with a precoding scheme determined for each of wireless reception devices belonging to the group. Thus, the wireless reception device can identify a precoding scheme by which a spatially multiplexed signal transmitted from a wireless transmission device has been precoded, from the group. As a result, it is possible to notify a wireless reception device of a precoding scheme without increasing the amount of control information.

(1-19) Furthermore, a wireless communication system of the present invention is a wireless communication system including a plurality of wireless reception devices and a wireless transmission device having a plurality of transmit antennas and configured to transmit spatially multiplexed signals to the plurality of wireless reception devices, wherein the wireless transmission device and each of the wireless reception devices each store group configuration information in which each of the plurality of wireless reception devices belongs to at least one group and a precoding scheme is determined for each of the groups; the wireless transmission device selects one group from among the groups, transmits group identification information on the selected group, precodes transmit data addressed to each of wireless reception devices belonging to the selected group on the basis of the stored group configuration information using a precoding scheme determined for the selected group, and spatially multiplexes and transmits a precoded signal; and the wireless reception device receives the group identification information transmitted from the wireless transmission device, determines whether the wireless reception device belongs to the group on the basis of the stored group configuration information and the received group identification information, and performs reception processing on a signal addressed to the wireless reception device in accordance with a precoding scheme determined for each of the groups in a case where it is determined that the wireless reception device belongs to the group.

In this manner, transmit data addressed to each of wireless reception devices belonging to a selected group is precoded using a precoding scheme determined for the selected group. Thus, a wireless reception device can identify a precoding scheme by which a spatially multiplexed signal transmitted from a wireless transmission device has been precoded, from the group. As a result, it is possible to notify wireless reception devices of precoding schemes without increasing the amount of control information.

(1-20) Furthermore, a wireless communication system of the present invention is a wireless communication system including a plurality of wireless reception devices and a wireless transmission device having a plurality of transmit antennas and configured to transmit spatially multiplexed signals to the plurality of wireless reception devices, wherein the wireless transmission device and each of the wireless reception devices each store group configuration information in which each of the plurality of wireless reception devices belongs to at least one group and a precoding scheme is determined for each of wireless reception devices belonging to each of the groups; the wireless transmission device selects one group from among the groups, transmits group identification information on the selected group, precodes transmit data addressed to each of wireless reception devices belonging to the selected group on the basis of the stored group configuration information using a precoding scheme determined for each of wireless reception devices belonging to the selected group, and spatially multiplexes and transmits a precoded signal; and the wireless reception device receives the group identification information transmitted from the wireless transmission device, determines whether the wireless reception device belongs to the group on the basis of the stored group configuration information and the received group identification information, and performs reception processing on a signal addressed to the wireless reception device in accordance with a precoding scheme determined for the wireless reception device in the group in a case where it is determined that the wireless reception device belongs to the group.

In this manner, transmit data addressed to each of wireless reception devices belonging to a selected group is precoded using a precoding scheme determined for each of the wireless reception devices. Thus, a wireless reception device can identify a precoding scheme by which a spatially multiplexed signal transmitted from a wireless transmission device has been precoded, from the group. As a result, it is possible to notify wireless reception devices of precoding schemes without increasing the amount of control information. It is also possible to use a different precoding scheme for each of a plurality of wireless reception devices so as to use them in a mixed manner.

(2-1) In order to achieve the foregoing object, the present invention takes the following solutions: A wireless transmission device of the present invention is a wireless transmission device having a plurality of transmit antennas, for transmitting spatially multiplexed signals to a plurality of wireless reception devices, including a group construction unit configured to create a plurality of groups each by selecting a plurality of wireless reception devices from among a plurality of wireless reception devices, determine, for each of the groups, a precoding scheme used to precode a signal to be transmitted to a wireless reception device belonging to each of the groups, and assign one identification number among candidate identification numbers determined in advance in association with the precoding scheme to each of the groups; a selection unit configured to select one group from among the groups; and a precoding unit configured to precode a signal to be transmitted to a wireless reception device belonging to the selected group using the precoding scheme corresponding to the identification number assigned to the selected group.

In this manner, a signal to be transmitted to a wireless reception device belonging to a selected group is precoded using a preceding scheme corresponding to an identification number assigned to the selected group. Thus, a wireless reception device can identify whether a multi-user MIMO signal transmitted from a wireless transmission device has been precoded using a linear precoding scheme or a non-linear preceding scheme, from the identification number. Accordingly, it is possible to notify wireless reception devices of precoding schemes without increasing the amount of control information.

(2-2) Furthermore, the wireless transmission device of the present invention further includes a group storage unit configured to store the created groups; a configuration information generation unit configured to generate group configuration information on each of the groups; and an identification information generation unit configured to generate group identification information for notification of the identification number of the selected group, wherein the group configuration information is transmitted to each of the wireless reception devices, and the group identification information and the precoded signals are transmitted to individual wireless reception devices belonging to the selected group.

This configuration enables notification of wireless reception devices of precoding schemes without increasing the amount of control information.

(2-3) Furthermore, in the wireless transmission device of the present invention, the precoding scheme is one of linear precoding or non-linear precoding.

This configuration enables supporting of both linear precoding and non-linear precoding, and also enables switching between them for use.

(2-4) Furthermore, in the wireless transmission device of the present invention, the precoding scheme is one of linear precoding, non-linear precoding, or hybrid linear and non-linear preceding including a mixture of linear preceding and non-linear preceding.

This configuration enables notification of wireless reception devices of precoding schemes without increasing the amount of control information.

(2-5) Furthermore, in the wireless transmission device of the present invention, the precoding unit performs a modulo operation on a signal to be transmitted to a wireless reception device belonging to the selected group in a case where the preceding scheme corresponding to the identification number assigned to the selected group is non-linear precoding.

This configuration enables identification of a precoding scheme by identification number. Thus, it is possible to notify wireless reception devices of precoding schemes without increasing the amount of control information.

(2-6) Furthermore, in the wireless transmission device of the present invention, in a case where the precoding scheme corresponding to the identification number assigned to the selected group is non-linear precoding, the precoding unit does not perform a modulo operation on a signal to be transmitted to a wireless reception device which supports only linear precoding in a case where the wireless reception device which supports only linear precoding belongs to the selected group.

This configuration enables even a wireless reception device which does not support non-linear precoding scheme to receive a linearly precoded multi-user MIMO signal from a wireless transmission device without performing any additional special processing.

(2-7) Furthermore, in the wireless transmission device of the present invention, the group construction unit further determines an ordinal number of wireless reception devices belonging to each of the groups, in the group, and in a case where the precoding scheme corresponding to the identification number assigned to the selected group is hybrid linear and non-linear precoding, the precoding unit does not perform a modulo operation on a signal to be transmitted to a wireless reception device with an ordinal number less than or equal to a predetermined threshold value among wireless reception devices belonging to the selected group, and performs a modulo operation on a signal to be transmitted to a wireless reception device with an ordinal number greater than the threshold value.

This configuration enables notification of wireless reception devices of preceding schemes without increasing the amount of control information.

(2-8) Furthermore, in the wireless transmission device of the present invention, in a case where the precoding scheme corresponding to the identification number assigned to the selected group is hybrid linear and non-linear precoding, the preceding unit does not perform a modulo operation on a signal to be transmitted to a wireless reception device which supports only linear precoding in a case where the wireless reception device which supports only linear preceding is included in wireless reception devices with ordinal numbers greater than the threshold value among the wireless reception devices belonging to the selected group.

This configuration enables notification of wireless reception devices of precoding schemes without increasing the amount of control information.

(2-9) Furthermore, in the wireless transmission device of the present invention, the group construction unit allows a wireless reception device which supports only linear precoding to be included in a group that is identical to a group including a wireless reception device which supports non-linear preceding.

This configuration enables identification of a precoding scheme by identification number. Thus, it is possible to notify wireless reception devices of precoding schemes without increasing the amount of control information.

(2-10) Furthermore, a wireless reception device of the present invention is a wireless reception device for receiving a spatially multiplexed signal from a wireless transmission device having a plurality of transmit antennas, including an identification information acquisition unit configured to acquire group identification information for notification of an identification number of a group from the wireless transmission device; a determination unit configured to determine whether the wireless reception device belongs to a group identified by the identification number; and a reception processing unit configured to perform reception processing in accordance with a precoding scheme determined in advance in association with the identification number in a case where it is determined that the wireless reception device belongs to the group.

In this manner, in a case where the wireless reception device belongs to the group, the wireless reception device performs reception processing in accordance with a precoding scheme determined in advance in association with the identification number. Thus, the wireless reception device can identify whether a multi-user MIMO signal transmitted from a wireless transmission device has been precoded using a linear precoding scheme or a non-linear precoding scheme, from the identification number. Accordingly, it is possible to notify a wireless reception device of a precoding scheme without increasing the amount of control information.

(2-11) Furthermore, the wireless reception device of the present invention further includes a configuration information acquisition unit configured to acquire group configuration information on a group to which a wireless reception device to which the wireless transmission device is to transmit a signal belongs; and a group storage unit configured to store information on the group.

This configuration enables reception of a notification of a precoding scheme without increasing the amount of control information.

(2-12) Furthermore, in the wireless reception device of the present invention, the precoding scheme is one of linear precoding or non-linear precoding, and the reception processing unit performs a modulo operation on a received data symbol in a case where the precoding scheme is non-linear precoding.

This configuration enables identification of a precoding scheme by identification number. Thus, it is possible to receive a notification of a precoding scheme without increasing the amount of control information.

(2-13) Furthermore, in the wireless reception device of the present invention, the precoding scheme is one of linear precoding, non-linear precoding, or hybrid linear and non-linear precoding including a mixture of linear precoding and non-linear precoding, and the reception processing unit performs a modulo operation on a received data symbol in a case where the precoding scheme is non-linear precoding.

This configuration enables identification of a precoding scheme by identification number. Thus, it is possible to receive a notification of a precoding scheme without increasing the amount of control information.

(2-14) Furthermore, in the wireless reception device of the present invention, the precoding scheme is one of linear precoding, non-linear precoding, or hybrid linear and non-linear precoding including a mixture of linear precoding and non-linear precoding, and in a case where the precoding scheme is hybrid linear and non-linear precoding, the reception processing unit performs a modulo operation on a received data symbol in a case where the ordinal number of the wireless reception device in the group is greater than a predetermined threshold value.

This configuration enables identification of a precoding scheme by identification number. Thus, it is possible to receive a notification of a precoding scheme without increasing the amount of control information.

(2-15) Furthermore, a wireless communication system of the present invention includes the wireless transmission device described in any of (2-1) to (2-9) given above, and the wireless reception device described in any of (2-10) to (2-14) given above.

This configuration enables notification of wireless reception devices of precoding schemes without increasing the amount of control information.

(2-16) Furthermore, a program of the present invention is a program for a wireless transmission device having a plurality of transmit antennas and configured to transmit spatially multiplexed signals to a plurality of wireless reception devices, the program causing a computer to execute a series of operations including an operation of creating a plurality of groups each by selecting a plurality of wireless reception devices from among a plurality of wireless reception devices; an operation of determining, for each of the groups, a precoding scheme used to precode a signal to be transmitted to a wireless reception device belonging to each of the groups; an operation of assigning one identification number among candidate identification numbers determined in advance in association with the precoding scheme to each of the groups; an operation of selecting one group from among the groups; and an operation of precoding a signal to be transmitted to a wireless reception device belonging to the selected group using the preceding scheme corresponding to the identification number assigned to the selected group.

In this manner, a signal to be transmitted to a wireless reception device belonging to a selected group is preceded using a precoding scheme corresponding to an identification number assigned to the selected group. Thus, a wireless reception device can identify whether a multi-user MIMO signal transmitted from a wireless transmission device has been precoded using a linear preceding scheme or a non-linear precoding scheme, from the identification number. Accordingly, it is possible to notify wireless reception devices of precoding schemes without increasing the amount of control information.

(2-17) Furthermore, a program of the present invention is a program for a wireless reception device for receiving a spatially multiplexed signal from a wireless transmission device having a plurality of transmit antennas, the program causing a computer to execute a series of operations including an operation of acquiring group identification information for notification of an identification number of a group from the wireless transmission device; an operation of determining whether the wireless reception device belongs to a group identified by the identification number; and an operation of receiving a signal addressed to the wireless reception device in accordance with a precoding scheme determined in advance in association with the identification number in a case where it is determined that the wireless reception device belongs to the group.

In this manner, in a case where the wireless reception device belongs to the group, the wireless reception device performs reception processing in accordance with a precoding scheme determined in advance in association with the identification number. Thus, the wireless reception device can identify whether a multi-user MIMO signal transmitted from a wireless transmission device has been precoded using a linear precoding scheme or a non-linear precoding scheme, from the identification number. Accordingly, it is possible to notify a wireless reception device of a precoding scheme without increasing the amount of control information.

(2-18) Furthermore, an integrated circuit of the present invention is an integrated circuit mounted in a wireless transmission device having a plurality of transmit antennas to cause the wireless transmission device to implement a plurality of functions, the integrated circuit causing the wireless transmission device to implement a series of functions including a function to transmit spatially multiplexed signals to a plurality of wireless reception devices; a function to create a plurality of groups each by selecting a plurality of wireless reception devices from among a plurality of wireless reception devices; a function to determine, for each of the groups, a precoding scheme used to precode a signal to be transmitted to a wireless reception device belonging to each of the groups; a function to assign one identification number among candidate identification numbers determined in advance in association with the precoding scheme to each of the groups; a function to select one group from among the groups; and a function to precode a signal to be transmitted to a wireless reception device belonging to the selected group using the precoding scheme corresponding to the identification number assigned to the selected group.

In this manner, a signal to be transmitted to a wireless reception device belonging to a selected group is precoded using a precoding scheme corresponding to an identification number assigned to the selected group. Thus, a wireless reception device can identify whether a multi-user MIMO signal transmitted from a wireless transmission device has been precoded using a linear precoding scheme or a non-linear precoding scheme, from the identification number. Accordingly, it is possible to notify wireless reception devices of precoding schemes without increasing the amount of control information.

(2-19) Furthermore, an integrated circuit of the present invention is an integrated circuit mounted in a wireless reception device to cause the wireless reception device to implement a plurality of functions, the integrated circuit causing the wireless reception device to implement a series of functions including a function to receive a spatially multiplexed signal from a wireless transmission device having a plurality of transmit antennas; a function to acquire group identification information for notification of an identification number of a group from the wireless transmission device; a function to determine whether the wireless reception device belongs to a group identified by the identification number; and a function to receive a signal addressed to the wireless reception device in accordance with a precoding scheme determined in advance in association with the identification number in a case where it is determined that the wireless reception device belongs to the group.

In this manner, in a case where the wireless reception device belongs to the group, the wireless reception device performs reception processing in accordance with a preceding scheme determined in advance in association with the identification number. Thus, the wireless reception device can identify whether a multi-user MIMO signal transmitted from a wireless transmission device has been precoded using a linear precoding scheme or a non-linear preceding scheme, from the identification number. Accordingly, it is possible to notify a wireless reception device of a precoding scheme without increasing the amount of control information.

Advantageous Effects of Invention

According to the present invention, it is possible to notify a wireless reception device of whether a multi-user MIMO signal transmitted from a wireless transmission device has undergone linear preceding or non-linear preceding, without increasing the amount of control information.

BRIEF DESCRIPTION OF DRAWINGS

FIG. 7 is a diagram illustrating an example of group information created by a group construction unit 307 of the wireless transmission device 100 and shared with the wireless reception device 200 in Embodiment 1.1 of the present invention.

FIG. 8A illustrates an example of a sequence chart illustrating the operation between the wireless transmission device 100 and each wireless reception device according to Embodiment 1.1 of the present invention.

FIG. 8B illustrates the example of the sequence chart illustrating the operation between the wireless transmission device 100 and each wireless reception device according to Embodiment 1.1 of the present invention.

FIG. 9 is a functional block diagram illustrating a precoding unit 323b, which is an example configuration of a precoding unit 323 according to Embodiment 1.2 of the present invention.

FIG. 11 is a diagram illustrating an example of group information created by a group construction unit 307 of a wireless transmission device 100 and shared with a wireless reception device 200 in Embodiment 1.2 of the present invention.

FIG. 14 is a diagram illustrating an example of group information created by a group construction unit 307 of a wireless transmission device 100 and shared with the wireless reception device 200 in Embodiment 2.1 of the present invention.

FIG. 15 is a diagram illustrating an example of group information created by a group construction unit 307 of a wireless transmission device 100 and shared with a wireless reception device 200 in Embodiment 2.2 of the present invention.

FIG. 16 is a diagram illustrating an example of group information created by a group construction unit 307 of a wireless transmission device 100 and shared with a wireless reception device 200 in Embodiment 2.3 of the present invention.

DESCRIPTION OF EMBODIMENTS

Embodiments of the present invention will be described hereinafter with reference to the drawings.

(Embodiment 1.1)

A communication technique according to this embodiment will be described using as an example a wireless communication system in which a wireless transmission device (base station device, access point, etc.) selects a plurality of wireless reception devices from among multiple wireless reception devices (terminal devices) to perform multi-user MIMO transmission, and suppresses Multi-User Interference (MUI), which is caused between streams addressed to the respective wireless reception devices, using linear precoding or nonlinear precoding in advance before performing transmission.

Figure 1:
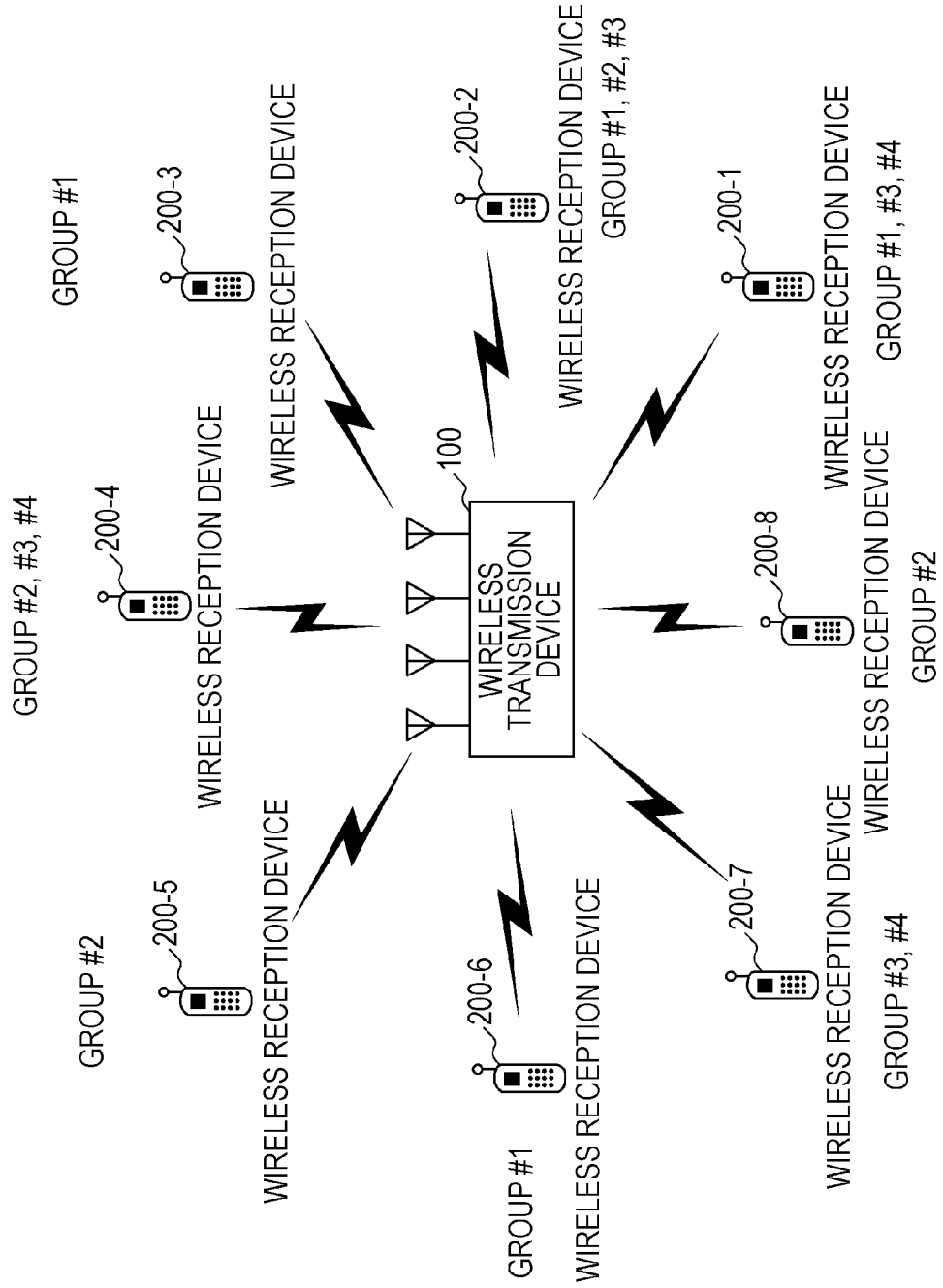
FIG. 1 is a diagram illustrating a schematic example configuration of a communication system of the present invention.

FIG. 1 is a diagram illustrating a schematic example configuration of a wireless communication system of the present invention. As illustrated in FIG. 1, in a wireless communication system according to this embodiment, when a wireless transmission device 100 is to communicate with a plurality of wireless reception devices (for example, wireless reception devices 200-1 to 200-8; the wireless reception devices 200-1 to 200-8 will also be collectively referred to as "wireless reception devices 200"), the wireless transmission device 100 creates a plurality of groups based on a plurality of combinations of wireless reception devices 200 among these wireless reception devices 200, and assigns group identification numbers (group IDs) each identifying one of the groups. Note that one wireless reception device 200 may belong to a plurality of groups. A precoding scheme to be used for multi-user MIMO transmission is determined for each of the groups. The wireless transmission device 100 notifies each of the wireless reception devices 200 of information on the grouping described above (information indicating a group to which each of the wireless reception devices 200 belongs), information on the determined precoding schemes, and information specifying the processing order of wireless reception devices in each group, prior to communication.

The wireless transmission device 100 selects one of the plurality of groups created in the way described above, which are candidate combinations of wireless reception devices 200 (target wireless reception devices) for which multi-user MIMO transmission is to be performed, and performs multi-user MIMO transmission to simultaneously communicate transmit data addressed to a plurality of wireless reception devices 200 belonging to the selected group through spatial multiplexing in the same frequency band. In this case, the wireless transmission device 100 notifies each of the wireless reception devices 200 of the group for which the multi-user MIMO transmission is to be performed, by using a group ID identifying the selected group. Based on the notification of the group ID, also, the wireless reception devices 200 can identify the precoding scheme that the wireless transmission device 100 has used. The transmission scheme will be described using, for example, but not limited to, a communication system based on Orthogonal Frequency Division Multiplexing (OFDM).

Each of the wireless reception devices 200-1 to 200-8 receives a reference signal (known signal between the transmitter and the receivers; a pilot signal, a training signal, etc.) from the wireless transmission device 100, estimates a channel state between each transmit antenna at the wireless transmission device 100 and each receive antenna at this wireless reception device 200, and informs the wireless transmission device 100 of channel information indicating the channel states. The wireless transmission device 100 selects one group from among the plurality of groups on the basis of the channel information or the like informed by the wireless reception devices 200, and performs multi-user MIMO transmission to simultaneously communicate transmit data addressed to the plurality of wireless reception devices 200 through spatial multiplexing.

The channel information, examples of which include a Channel Quality Indicator (CQI) indicating a Signal to Noise power Ratio (SNR), a Signal to Interference plus Noise power Ratio (SINR), a Carrier to Noise power Ratio (CNR), a Carrier to Interference plus Noise power Ratio (CINR), or a value calculated from them, Channel State Information (CSI) indicating complex channel gain from each transmit antenna at the wireless transmission device 100 to each receive antenna at each of the wireless reception devices 200 or the covariance value or the like of the complex channel gain, or a desired Precoding Matrix Index (PMI) determined from the channel state, is received from each of the wireless reception devices 200. A group of wireless reception devices 200 for which multiplexing with multi-user MIMO processing is performed is selected on the basis of the received information.

Figure 2:
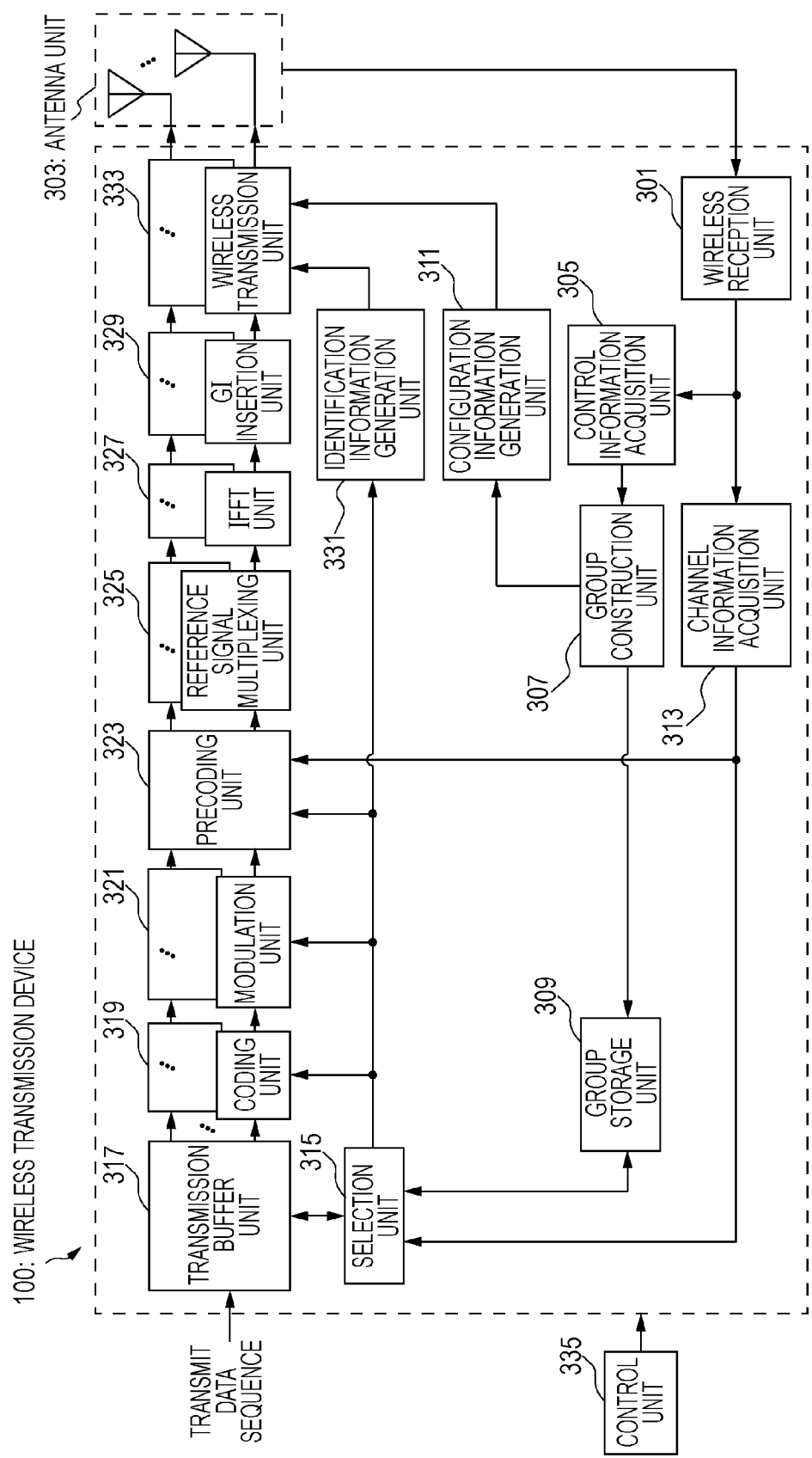
FIG. 2 is a functional block diagram illustrating an example configuration of a wireless transmission device 100 of the present invention.

FIG. 2 is a functional block diagram illustrating an example configuration of the wireless transmission device 100 of the present invention. In the example configuration of FIG. 2, the wireless transmission device 100 includes four antennas, and is capable of multi-user MIMO transmission of transmit data addressed to up to four wireless reception devices 200 through spatial multiplexing. A wireless reception unit 301 receives signals transmitted from the individual wireless reception devices 200 (the wireless reception devices 200-1 to 200-8) via a plurality of antennas of an antenna unit 303. A control information acquisition unit 305 acquires information on a precoding scheme supported by each of the wireless reception devices 200 (compatibility information) or category information by which the supporting precoding scheme can be determined (terminal class, compatibility standard information, reception function information indicating the presence or absence of the modulo operation function, etc.), which is received from a wireless reception device 200 with which the wireless transmission device 100 first establishes communication or from each of the wireless reception devices 200 or the like in cases such as when grouping is updated, and outputs supporting precoding scheme information of each of the wireless reception devices 200.

A group construction unit 307 creates a plurality of groups using a plurality of combinations of wireless reception devices 200 on the basis of at least the supporting precoding scheme information of each of the wireless reception devices 200, which is output from the control information acquisition unit 305, and determines a precoding scheme to be used for each group. The group construction unit 307 also determines the order of the wireless reception devices 200 in each group (the order of notification of channel information, acknowledgement/negative acknowledgement, and the like in multi-user MIMO transmission processing, the order of spatial streams, etc.). Note that one wireless reception device 200 may belong to a plurality of groups. In addition, there may be a wireless reception device 200 that belongs to none of the groups. The group construction unit 307 may also perform grouping using position information of each of the wireless reception devices 200 or information such as a result of estimating the angle of arrival of a radio wave from each of the wireless reception devices 200. In this case, for example, wireless reception devices 200 located away from each other or wireless reception devices 200 having largely different radio-wave arrival angles may be combined into a group in order to reduce channel correlation. There may also be a plurality of groups in which a preceding scheme or the order of wireless reception devices 200 is different for the same combination of wireless reception devices 200.

A group storage unit 309 stores information on the groups created by the group construction unit 307 (group configuration information including group IDs, wireless reception devices 200 belonging to the respective groups, precoding schemes used in the respective groups, and the orders of wireless reception devices 200 in the respective groups). A configuration information generation unit 311 generates group configuration information for notifying each of the wireless reception devices 200 of information on the groups created by the group construction unit 307. The wireless reception devices 200 may be notified of the group configuration information, for each group, by being notified of information indicating wireless reception devices 200 belonging to each group (identification information on the wireless reception devices 200, namely, user IDs, MAC addresses, etc.), the order of the wireless reception devices 200 in the group, and a precoding scheme supported by the group, or may be notified of the group configuration information, for each of the wireless reception devices 200, by being notified of information indicating a group to which each of the wireless reception devices 200 belongs, the ordinal number of the wireless reception device 200 in the group, and a precoding scheme for the group. A channel information acquisition unit 313 acquires channel information including information of CQI and CSI, which is transmitted from the wireless reception devices 200-1 to 200-8, from the received signals.

A selection unit 315 selects a group to which a plurality of wireless reception devices 200 (target wireless reception devices) for which multiplexing with multi-user MIMO processing is performed belong from among the plurality of groups stored in the group storage unit 309 on the basis of the amount of transmit data addressed to each of the wireless reception devices 200 and a priority, which are accumulated in a transmission buffer unit 317, and the channel information or the like on each of the wireless reception devices 200, which are acquired by the channel information acquisition unit 313. Furthermore, the selection unit 315 outputs a precoding scheme selection signal indicating a precoding scheme determined in advance in association with the selected group. The selection unit 315 may also select parameters, such as the Modulation and Coding Scheme (MCS) of transmit data addressed to each of the wireless reception devices 200, on the basis of the CQI or the like from each of the wireless reception devices 200, which are acquired by the channel information acquisition unit 313. In this embodiment, the description will focus on a case where a group to which four terminals, namely, first to fourth wireless reception devices 200 among the wireless reception devices 200-1 to 200-8, belong is selected and one sequence (one stream) is transmitted to each of the wireless reception devices 200.

The transmission buffer unit 317 accumulates transmit data sequences addressed to the respective wireless reception devices 200, which are input from the higher layer, and outputs the respective transmit data sequences addressed to the first to fourth wireless reception devices 200 selected by the selection unit 315 to a coding unit 319. The coding unit 319 performs error correction coding on the transmit data sequences addressed to the first to fourth wireless reception devices 200, which are input from the transmission buffer unit 317. In a case where the coding rate of the transmit data addressed to each of the wireless reception devices 200 has been selected by the selection unit 315, the coding unit 319 performs rate matching (puncturing) in accordance with the selected coding rate. If no coding rate is specified, the coding unit 319 may perform rate matching with a predetermined coding rate. A modulation unit 321 modulates the transmit data sequences addressed to the first to fourth wireless reception devices 200, each of which has undergone error correction coding, and outputs a modulation symbol for each of sub-carriers addressed to the first to fourth wireless reception devices 200. In a case where the modulation scheme of the transmit data addressed to each of the wireless reception devices 200 has been selected by the selection unit 315, the modulation unit 321 performs modulation using the selected modulation scheme. If no modulation scheme is specified, the modulation unit 321 preferably performs modulation using a predetermined modulation scheme.

A precoding unit 323 receives an input of modulation symbols addressed to the first to fourth wireless reception devices 200, and precodes each of the input modulation symbols on the basis of the CSI from each of the wireless reception devices 200, which is acquired by the channel information acquisition unit 313, using a precoding scheme determined in association with the group selected by the selection unit 315 to generate multi-user MIMO symbols for each of the plurality of antennas of the antenna unit 303 to be used for transmission. The details of the precoding unit 323 will be described below.

A reference signal multiplexing unit 325 multiplexes a reference signal to be transmitted from each antenna of the antenna unit 303 on a multi-user MIMO symbol to be transmitted from each antenna. The reference signals are preferably multiplexed so as to allow the wireless reception devices 200 to receive the reference signals transmitted from the respective antennas at the wireless transmission device 100 in an identifiable form. For example, the reference signals may be multiplexed by time division, multiplexed by frequency division so as to be divided into sub-carriers, or multiplexed by code division. In addition, in a case where a sounding signal (sounding frame, sounding packet, null data packet) not including a transmit data sequence but including a reference signal and a control signal is to be transmitted to each of the wireless reception devices 200 for the purpose of channel estimation, the reference signal multiplexing unit 325 directly outputs reference signals to be transmitted from the respective antennas.

An IFFT unit 327 performs frequency-time conversion, such as an Inverse Fast Fourier Transform (IFFT), on each of the multi-user MIMO signals for the respective antennas on which the reference signals have been multiplexed to convert the multi-user MIMO signals into signals in the time-domain. A GI insertion unit 329 inserts a Guard Interval (GI) into each of the time-domain signals for the respective antennas. An identification information generation unit 331 generates group identification information for notifying the wireless reception devices 200 of a group identification number (group ID) for identifying the selected group on the basis of the selection result of the selection unit 315. The group identification information may include information on the MCS of each of the wireless reception devices 200. A wireless transmission unit 333 transmits the signals with GIs inserted therein via the respective antennas of the antenna unit 303. The group configuration information generated by the configuration information generation unit 311 and the group identification information generated by the identification information generation unit 331 are also transmitted via one or more antennas of the antenna unit 303. A control unit 335 controls each of the units described above to execute the respective processing operations.

Figure 3:
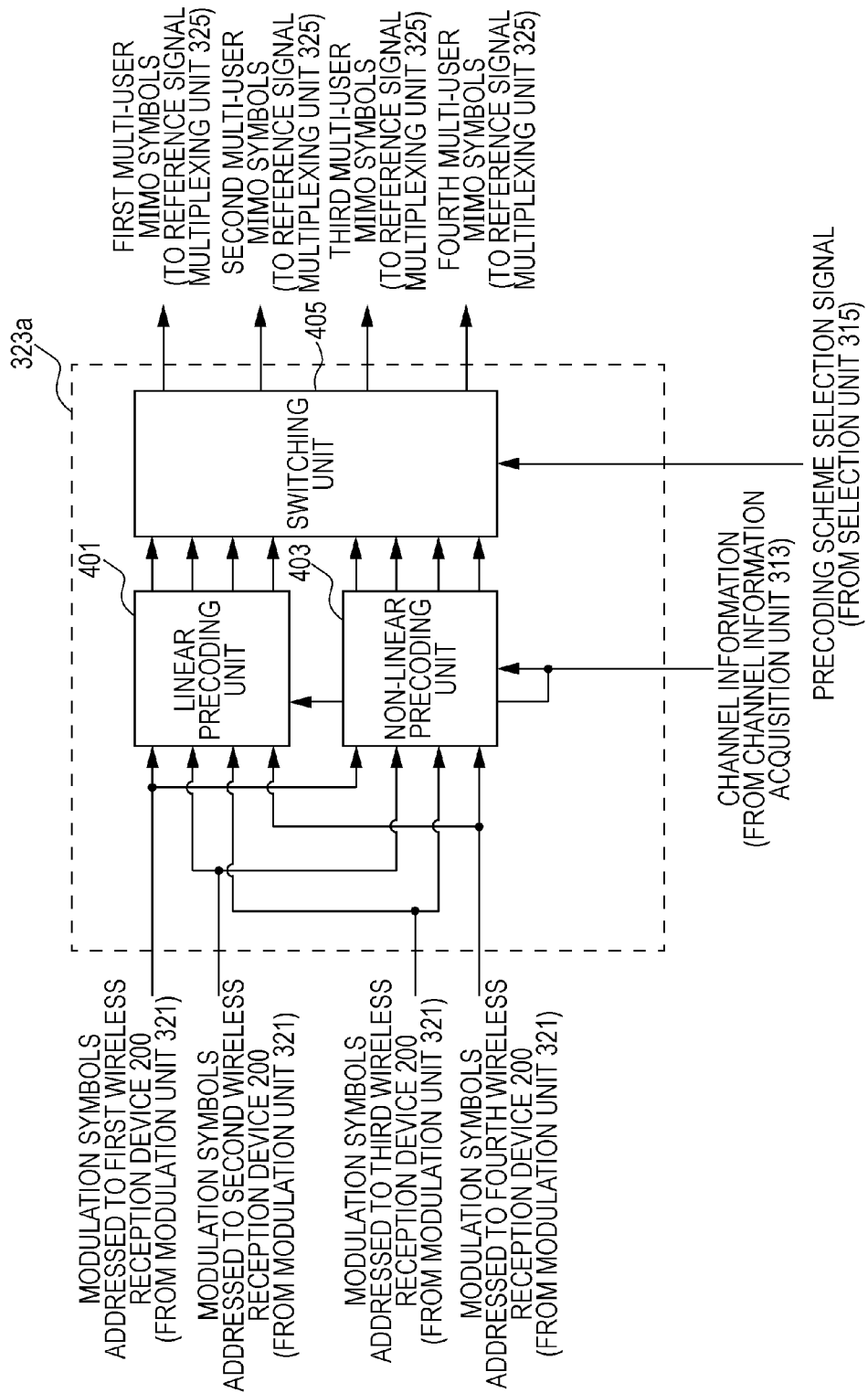
FIG. 3 is a functional block diagram illustrating a precoding unit 323a, which is an example configuration of a precoding unit 323 according to Embodiment 1.1 of the present invention.

FIG. 3 is a functional block diagram illustrating a precoding unit 323a, which is an example configuration of the precoding unit 323 according to Embodiment 1.1 of the present invention. The precoding unit 323a includes a linear precoding unit 401, a non-linear precoding unit 403, and a switching unit 405. The linear precoding unit 401 receives an input of modulation symbols addressed to the first to fourth wireless reception devices 200, and performs linear precoding on each of the input modulation symbols on the basis of the CSI or PMI in the channel information acquired by the channel information acquisition unit 313. The details of the linear precoding unit 401 will be described below. The non-linear precoding unit 403 receives an input of modulation symbols addressed to the first to fourth wireless reception devices 200, and performs non-linear precoding on each of the input modulation symbols on the basis of the CSI or PMI in the channel information acquired by the channel information acquisition unit 313. The details of the non-linear precoding unit 403 will be described below.

The switching unit 405 receives an input of the results of linear precoding, which are output from the linear precoding unit 401, and the results of non-linear precoding, which are output from the non-linear precoding unit 403, and selects one of them on the basis of a precoding scheme selection signal input from the selection unit 315 to output first to fourth multi-user MIMO symbols to be transmitted from the respective antennas of the antenna unit 303. Preferably, each of the linear precoding unit 401 and the non-linear precoding unit 403 does not perform a processing operation if the precoding scheme selection signal does not specify the selection of the corresponding precoding scheme. This can reduce power consumption.

Figure 4:
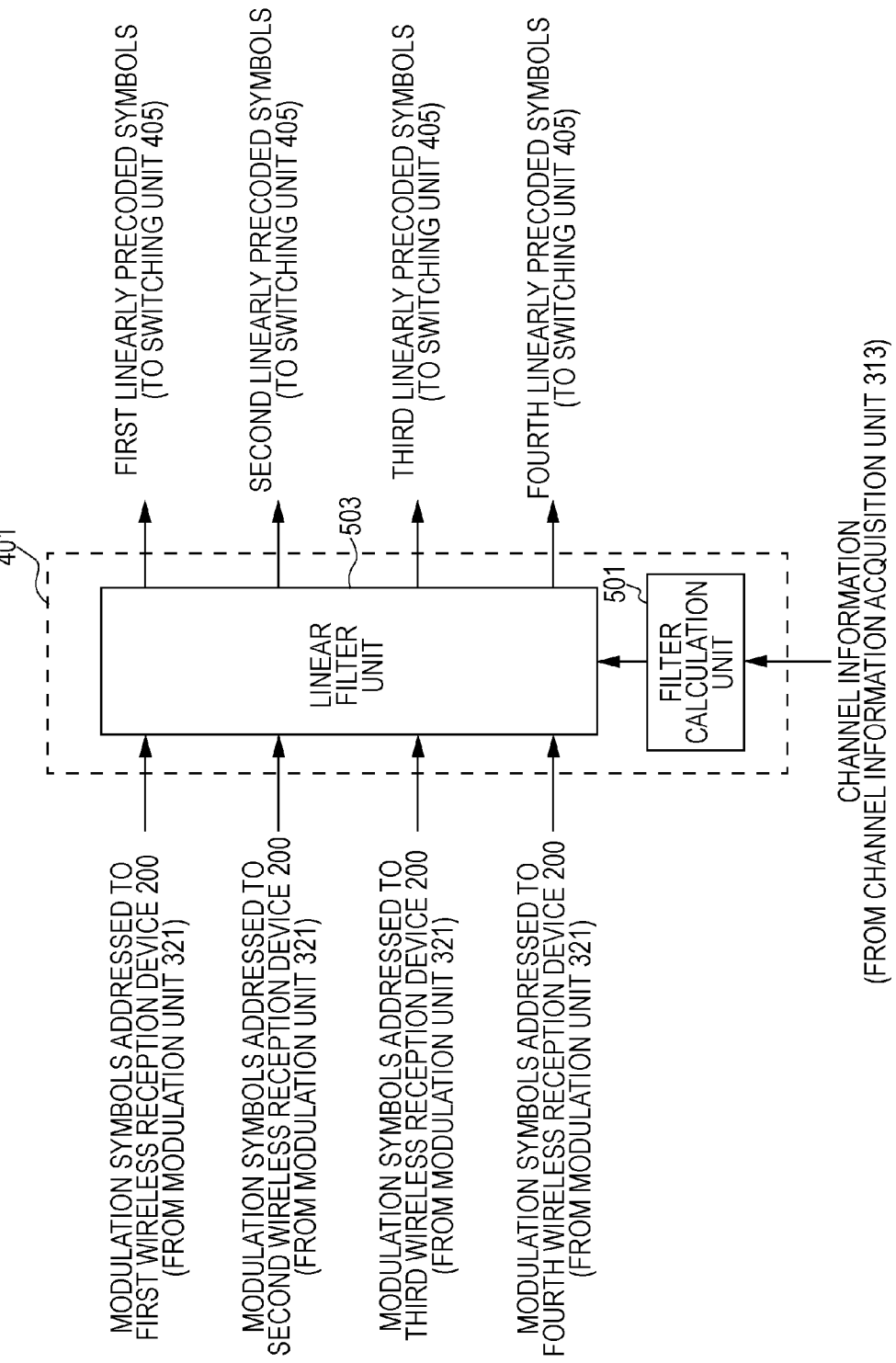
FIG. 4 is a functional block diagram illustrating an example configuration of a linear precoding unit 401 according to Embodiment 1.1 of the present invention.

FIG. 4 is a functional block diagram illustrating an example configuration of the linear precoding unit 401 according to Embodiment 1.1 of the present invention. The linear precoding unit 401 includes a filter calculation unit 501 and a linear filter unit 503. Referring to the example in FIG. 4, a description will be given to the case where Zero-Forcing precoding based on the CSI is performed as linear precoding to generate multi-user MIMO signals. The filter calculation unit 501 generates, for each sub-carrier, a channel matrix H whose elements correspond to complex channel gain between each antenna at the wireless transmission device 100 and antennas at each of the wireless reception devices 200, from the CSI in the channel information on each of the wireless reception devices 200, which is acquired by the channel information acquisition unit 313, and calculates the inverse matrix $H^{-1}$ (or pseudo-inverse matrix $H^{\dagger}=H^H(HH^H)^{-1}$) as a weight matrix W serving as a linear filter. The linear filter unit 503 receives an input of modulation symbols addressed to the first to fourth wireless reception devices 200, and multiplies, for each sub-carrier, the modulation symbols by the linear filter W calculated by the filter calculation unit 501 to output multi-user MIMO symbols (linearly preceded symbols) to be transmitted from the respective antennas of the antenna unit 303.

Accordingly, in a case where the multi-user MIMO symbols are received at the respective wireless reception devices 200, each of the wireless reception devices 200 receives only the signal addressed to this wireless reception device 200 while interference (MUI) due to the signals to be transmitted to the wireless reception devices 200 other than this wireless reception device 200 is canceled by linear precoding. The linear precoding unit 401 has been described in the context of, as an example, but not limited to, the filter calculation unit 501 calculating and using an inverse matrix as a linear filter. The weight matrix $W=H^H(HH^H+\alpha I)^{-1}$ (I denotes a unit matrix and $\alpha$ denotes a normalization factor) determined by MMSE criteria may be used as a linear filter. In this case, it is difficult to completely cancel MUI at the time of reception. However, it is possible to maximize the SINR, resulting in improvement in reception performance. In a communication system that uses PMI, furthermore, the filter calculation unit 501 determines a weight matrix from the precoding vector indicated by the PMI of each of the wireless reception devices 200, and uses the weight matrix as a linear filter.

Figure 5:
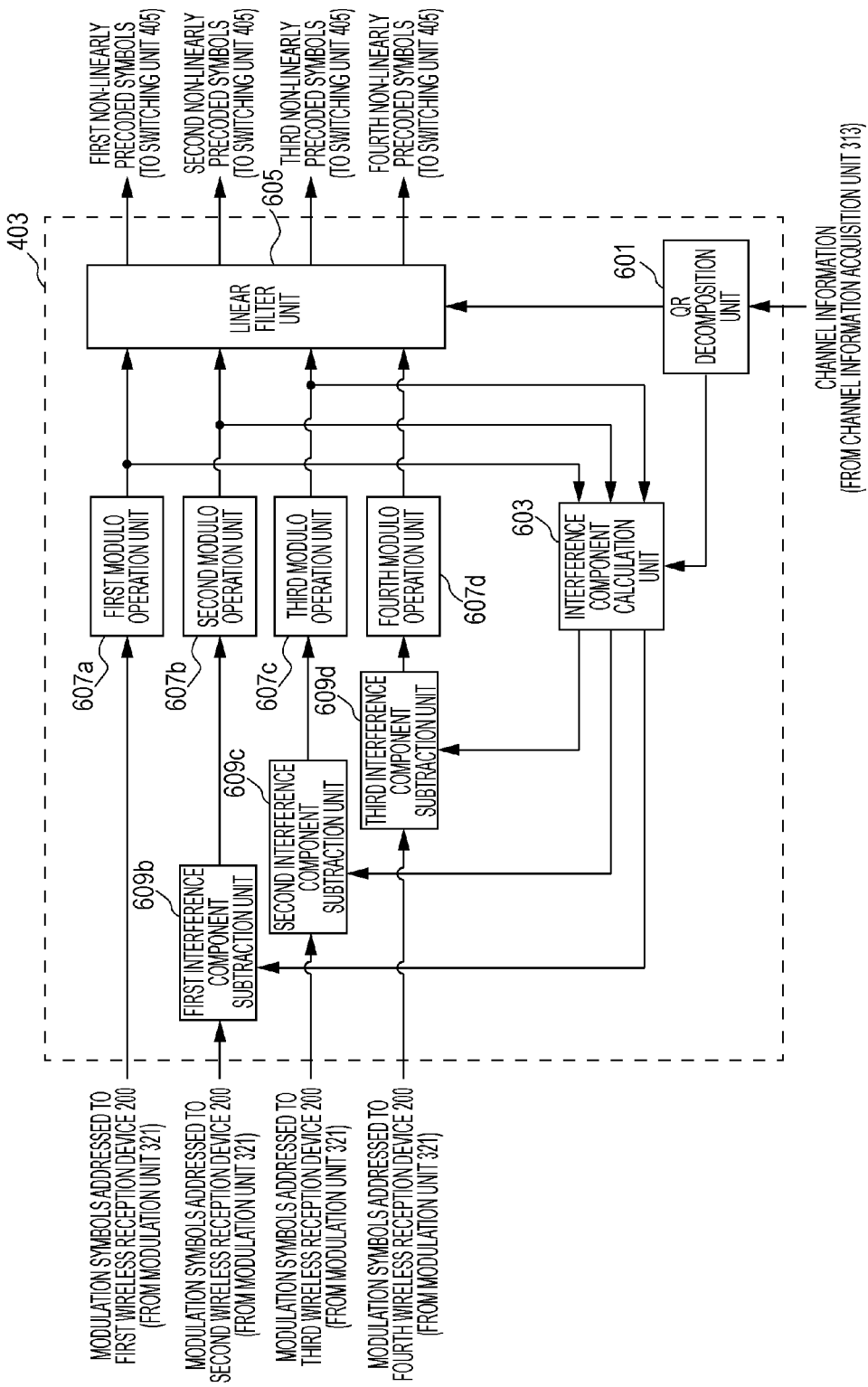
FIG. 5 is a functional block diagram illustrating an example configuration of a non-linear precoding unit 403 according to Embodiment 1.1 of the present invention.

FIG. 5 is a functional block diagram illustrating an example configuration of the non-linear precoding unit 403 according to Embodiment 1.1 of the present invention. Referring to the example in FIG. 5, a description will be given to the case where Tomlinson-Harashima precoding (THP) is performed as non-linear precoding to generate multi-user MIMO signals. A QR decomposition unit (interference matrix calculation unit) 601 generates, for each sub-carrier, a channel matrix H whose elements correspond to complex channel gain between each antenna at the wireless transmission device 100 and antennas at each of the wireless reception devices 200, from the CSI in the channel information on each of the wireless reception devices 200, which is acquired by the channel information acquisition unit 313, and performs QR decomposition on the Hermitian conjugate $H^H$ of the channel matrix H to decompose it into a unitary matrix Q and an upper triangular matrix R. The QR decomposition unit 601 further determines the Hermitian conjugate $R^H$ of the upper triangular matrix R (corresponding to a lower triangular matrix), and determines an interference matrix $B=(\text{diag}R^E)^{-1}R^H-I$ representing the gain of MUI between the wireless reception devices 200. The QR decomposition unit 601 outputs the interference matrix B to an interference component calculation unit 603, and outputs the unitary matrix Q to a linear filter unit 605. Note that diagX denotes a matrix having the diagonal elements of a matrix X, and I denotes a unit matrix. The interference matrix B is expressed in the form of Expression (2).

[Math. 2]

$$B = \begin{bmatrix} 0 & 0 & 0 & 0 \\ b_{21} & 0 & 0 & 0 \\ b_{31} & b_{32} & 0 & 0 \\ b_{41} & b_{42} & b_{43} & 0 \end{bmatrix} \quad (2)$$

A first modulo operation unit 607a performs a modulo operation on the modulation symbols addressed to the first wireless reception device 200, which are generated by the modulation unit 321. Since there is no MUI for the modulation symbols addressed to the first wireless reception device 200, the provision of an interference component subtraction unit 609 is omitted. The provision of the modulo operation unit 607 may also be omitted. The interference component calculation unit 603 calculates an interference component to be imposed on the modulation symbol of each sub-carrier addressed to the second wireless reception device 200 by the result of the modulo operation on the modulation symbol of each sub-carrier addressed to the first wireless reception device 200, on the basis of the interference matrix B determined by the QR decomposition unit 601. Here, an element $b_{21}$ in the second row and the first column of the interference matrix B represents the complex gain of the interference imposed by the modulation symbol addressed to the first wireless reception device 200 on the modulation symbol addressed to the second wireless reception device 200, and this element can be multiplied by the result of the modulo operation on the modulation symbol addressed to the first wireless reception device 200 to calculate the interference component.

A first interference component subtraction unit 609b subtracts, for each sub-carrier, the interference component for the modulation symbol addressed to the second wireless reception device 200, which is calculated by the interference component calculation unit 603, from the modulation symbol addressed to the second wireless reception device 200, which is generated by the modulation unit 321. A second modulo operation unit 607b performs a modulo operation on the modulation symbol addressed to the second wireless reception device 200 from which the interference component has been subtracted, using a predetermined modulo width based on the modulation scheme.

The interference component calculation unit 603 calculates an interference component to be imposed on the modulation symbol of each sub-carrier addressed to third wireless reception device 200 by the result of the modulo operation on the modulation symbol of each sub-carrier addressed to the first wireless reception device 200 and the result of the modulo operation on the modulation symbol of each sub-carrier addressed to the second wireless reception device 200. Here, an element $b_{31}$ in the third row and the first column of the interference matrix B represents the complex gain of the interference imposed by the modulation symbol addressed to the first wireless reception device 200 on the modulation symbol addressed to the third wireless reception device 200, and an element $b_{32}$ in the third row and the second column of interference matrix B represents the complex gain of the interference imposed by the modulation symbol addressed to the second wireless reception device 200 on the modulation symbol addressed to the third wireless reception device 200. These elements can be multiplied by the result of the modulo operation on the modulation symbol addressed to the first wireless reception device 200 and the result of the modulo operation on the modulation symbol addressed to the second wireless reception device 200 to calculate the interference components.

A second interference component subtraction unit 609c subtracts, for each sub-carrier, the interference component for the modulation symbol addressed to the third wireless reception device 200, which is calculated by the interference component calculation unit 603, from the modulation symbol addressed to the third wireless reception device 200, which is generated by the modulation unit 321. A third modulo operation unit 607c performs a modulo operation on the modulation symbol addressed to the third wireless reception device 200 from which the interference component has been subtracted, using a predetermined modulo width based on the modulation scheme.

The interference component calculation unit 603 calculates an interference component to be imposed on the modulation symbol of each sub-carrier addressed to the fourth wireless reception device 200 by the result of the modulo operation on the modulation symbol of each sub-carrier addressed to the first wireless reception device 200, the result of the modulo operation on the modulation symbol of each sub-carrier addressed to the second wireless reception device 200, and the result of the modulo operation on the modulation symbol of each sub-carrier addressed to the third wireless reception device 200. Here, an element $b_{41}$ in the fourth row and the first column of the interference matrix B represents the complex gain of the interference imposed by the modulation symbol addressed to the first wireless reception device 200 on the modulation symbol addressed to the fourth wireless reception device 200, an element $b_{42}$ in the fourth row and the second column of the interference matrix B represents the complex gain of the interference imposed by the modulation symbol addressed to the second wireless reception device 200 on the modulation symbol addressed to the fourth wireless reception device 200, and an element $b_{43}$ in the fourth row and the third column of the interference matrix B represents the complex gain of the interference imposed by the modulation symbol addressed to the third wireless reception device 200 on the modulation symbol addressed to the fourth wireless reception device 200. These elements can be multiplied by the result of the modulo operation on the modulation symbol addressed to the first wireless reception device 200 to the result of the modulo operation on the modulation symbol addressed to the third wireless reception device 200 to calculate the interference components.

A third interference component subtraction unit 609d subtracts, for each sub-carrier, the interference component for the modulation symbol addressed to the fourth wireless reception device 200, which is calculated by the interference component calculation unit 603, from the modulation symbol addressed to the fourth wireless reception device 200, which is generated by the modulation unit 321. A fourth modulo operation unit 607d performs a modulo operation on the modulation symbol addressed to the fourth wireless reception device 200 from which the interference component has been subtracted, using a predetermined modulo width based on the modulation scheme.

The linear filter unit 605 receives an input of the result of the modulo operation on the modulation symbol addressed to the first wireless reception device 200, which is output from the first modulo operation unit 607a, the result of the modulo operation on the modulation symbol addressed to the second wireless reception device 200, which is output from the second modulo operation unit 607b, the result of the modulo operation on the modulation symbol addressed to the third wireless reception device 200, which is output from the third modulo operation unit 607c, and the result of the modulo operation on the modulation symbol addressed to the fourth wireless reception device 200, which is output from the fourth modulo operation unit 607d, and multiplies, for each sub-carrier, the results by the unitary matrix Q calculated by the QR decomposition unit 601 as a linear filter to output multi-user MIMO symbols (non-linearly precoded symbols) to be transmitted from the respective antennas of the antenna unit 303.

Accordingly, in a case where the multi-user MIMO symbols are received at the respective wireless reception devices 200, each of the wireless reception devices 200 receives only the signal addressed to this wireless reception device 200 while interference (MUI) due to the signals to be transmitted to the wireless reception devices 200 other than this wireless reception device 200 is canceled by THP. In this embodiment, a method for implementing THP has been described in the context of, as an example, but not limited to, a method using QR decomposition of a channel matrix. A method that allows quasi-optimal ordering of the wireless reception devices 200 in THP by using the V-BLAST (Vertical Bell Laboratories Layered Space Time) approach, such as the method described in NPL 5 given above, may be used.

Figure 6A:
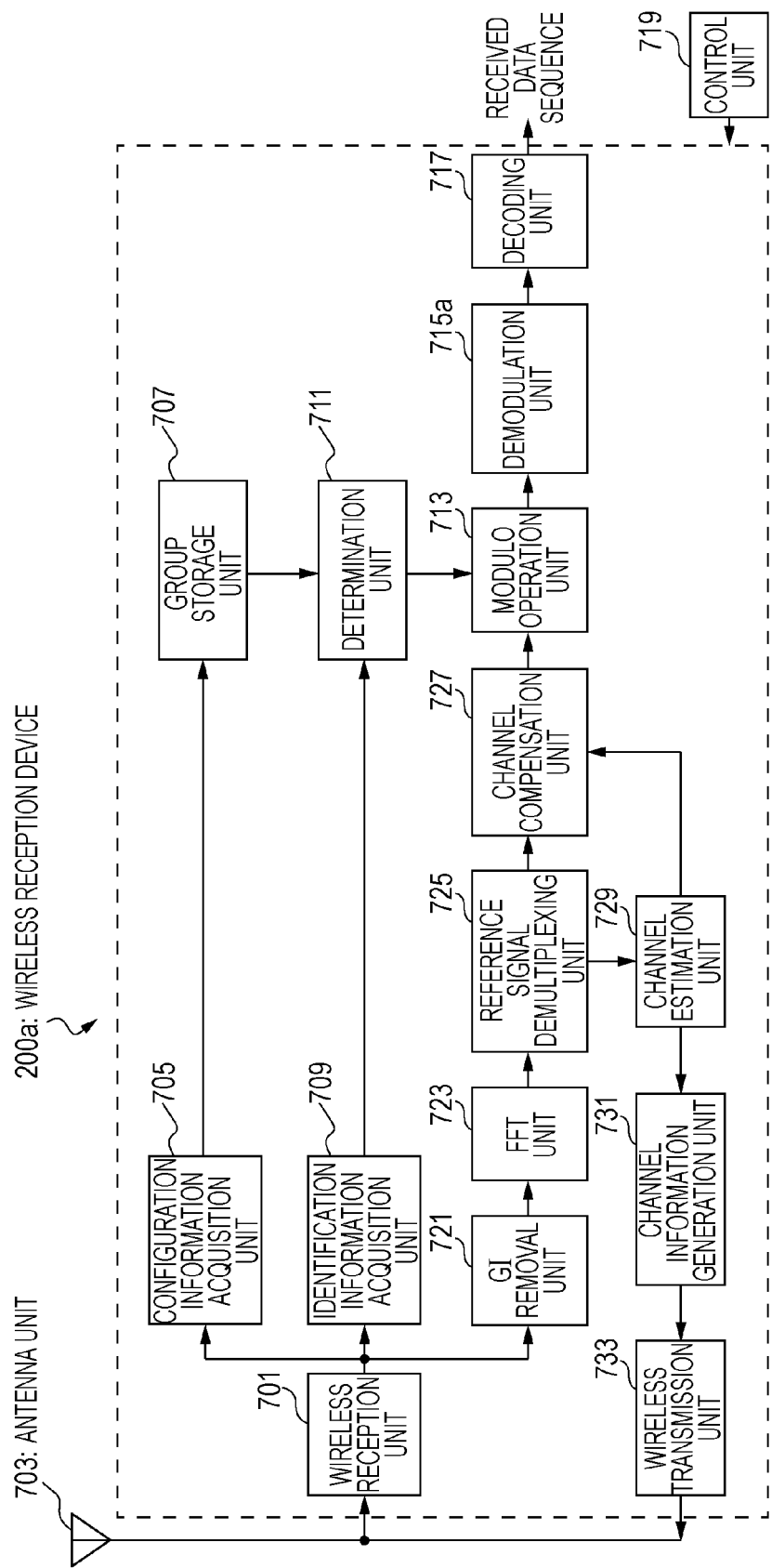
FIG. 6A is a functional block diagram illustrating an example configuration of a wireless reception device 200 according to Embodiment 1.1 of the present invention.

FIG. 6A is a functional block diagram illustrating an example configuration of a wireless reception device 200a according to Embodiment 1.1 of the present invention. The wireless reception device 200a and a wireless reception device 200b, described below, will also be collectively referred to as wireless reception devices 200. The wireless reception device 200a of FIG. 6A is an example of a wireless reception device 200 that supports both precoding schemes, namely, linear precoding and non-linear precoding (THP). A wireless reception unit (reception unit) 701 receives a signal from the wireless transmission device 100 via an antenna unit 703. A configuration information acquisition unit 705 acquires group configuration information notified by the wireless transmission device 100, and outputs the group configuration information to a group storage unit 707. The group storage unit 707 stores the group configuration information acquired by the configuration information acquisition unit 705. An identification information acquisition unit 709 acquires group identification information (group ID) notified by the wireless transmission device 100, and outputs the group identification information to a determination unit 711. If the group identification information includes information of MCS, the MCS information is also output to a modulo operation unit (constituting a reception processing unit together with a demodulation unit described below) 713, a demodulation unit 715*a*, and a decoding unit 717. The demodulation unit 715*a* and a demodulation unit 715*b*, described below, will also be collectively referred to as demodulation units 715.

The determination unit 711 refers to the group configuration information stored in the group storage unit 707 to determine whether the associated wireless reception device 200*a* (local station) belongs to a group identified by the group ID acquired by the identification information acquisition unit 709, and notifies a control unit 719 of the determination result. If the associated wireless reception device 200*a* belongs to the group, the determination unit 711 causes the execution of the data receiving operation, described below, through the control unit 719. The determination unit 711 also refers to the group configuration information stored in the group storage unit 707 to determine whether the group identified by the acquired group ID is a group for which multi-user MIMO based on linear precoding is performed or a group for which multi-user MIMO based on non-linear precoding is performed. If the group is a group for which multi-user MIMO based on linear precoding is performed, the determination unit 711 generates a signal instructing the modulo operation unit 713 not to perform a modulo operation. If the group is a group for which multi-user MIMO based on non-linear precoding is performed, the determination unit 711 generates a signal instructing the modulo operation unit 713 to perform a modulo operation. A GI removal unit 721 removes a guard interval (GI) from the received signal.

An FFT unit 723 performs a time-frequency conversion on the received signal from which the GI has been removed, using a Fast Fourier Transform (FFT) or the like to convert the received signal into modulation symbols of individual sub-carriers. A reference signal demultiplexing unit 725 demultiplexes the modulation symbols into symbols of received data and symbols of a reference signal, and inputs the symbols of the received data to a channel compensation unit 727, and the symbols of the reference signal to a channel estimation unit 729. The channel estimation unit 729 estimates the channel state (complex channel gain) between each antenna at the wireless transmission device 100 and the antenna unit 703 of the wireless reception device 200*a* and the reception quality expressed in SNR or SINR on the basis of the symbols of the reference signal obtained by demultiplexing. The channel compensation unit 727 performs channel compensation (equalization) on the received data symbols on the basis of the estimated channel state obtained by the channel estimation unit 729.

The channel-compensated received data symbols are input to the modulo operation unit 713. In a case where an instruction signal to perform a modulo operation is input to the modulo operation unit 713 from the determination unit 711, the modulo operation unit 713 performs a modulo operation on the channel-compensated received data symbols using a predetermined width of the modulo operation (modulo width) based on the modulation scheme (the modulation scheme in the MCS if MCS information has been input from the identification information acquisition unit 709). In a case where an instruction signal not to perform a modulo operation is input, the modulo operation unit 713 outputs the channel-compensated received data symbols as they are. The demodulation unit 715*a* demodulates each of the received data symbols output from the modulo operation unit 713 (on the basis of the modulation scheme in the MCS if MCS information has been input from the identification information acquisition unit 709).

The decoding unit 717 performs error correction decoding processing on the demodulated sequence to generate a received data sequence, and outputs the received data sequence. If MCS information has been input from the identification information acquisition unit 709, the decoding unit 717 performs rate matching (depuncturing) in accordance with the coding rate in the MCS. A channel information generation unit 731 generates a Channel Quality Indicator (CQI) indicating an SNR, an SINR, a CNR, a CINR, or a value calculated from them, and CSI indicating complex channel gain from each transmit antenna at the wireless transmission device 100 to each receive antenna at each wireless reception device 200*a* or the covariance value or the like of the complex channel gain on the basis of the estimated channel state. A wireless transmission unit 733 transmits the channel information generated by the channel information generation unit 731 to the wireless transmission device 100 via the antenna unit 703. The control unit 719 controls each of the units described above to execute the respective processing operations.

In this embodiment, the description has focused on an example of the configuration of the wireless reception device 200 in which if the determination unit 711 determines that the wireless reception device 200 is in a group for which multi-user MIMO based on non-linear precoding is performed, the modulo operation unit 713 performs a modulo operation on the channel-compensated received data symbols prior to demodulation at the demodulation unit 715 (determination of received constellation points). Another example configuration of the wireless reception device 200 is illustrated in FIG. 6B.

Figure 6B:
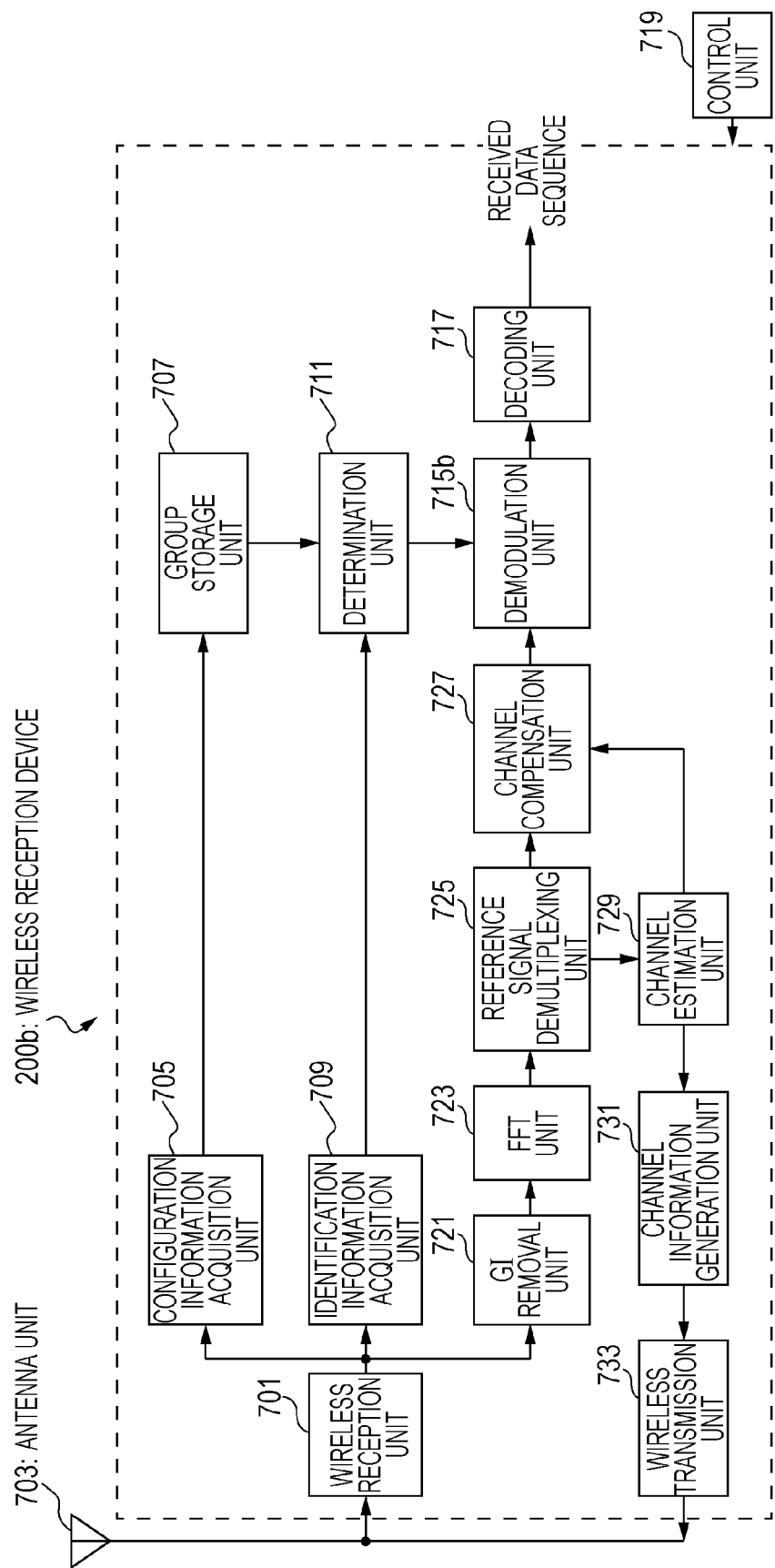
FIG. 6B is a functional block diagram illustrating another example configuration of the wireless reception device 200 according to Embodiment 1.1 of the present invention.

FIG. 6B is a functional block diagram illustrating an example configuration of a wireless reception device 200*b* according to Embodiment 1.1 of the present invention. Unlike the wireless reception device 200*a* of FIG. 6A, the wireless reception device 200*b* of FIG. 6B does not include the modulo operation unit 713. If the determination unit 711 determines that the wireless reception device 200*b* is in a group for which multi-user MIMO based on non-linear precoding is performed, the demodulation unit 715*b* takes into account that the arrangement of candidate constellation points of a received signal takes a form in which constellation points obtained when the wireless transmission device 100 performs modulation are repeatedly arranged with the modulo width due to the effect of the modulo operation performed by the wireless transmission device 100, and calculates the Log Likelihood Ratio (LLR) of a demodulated bit from the Euclidean distance between a (noisy) received constellation point and each of the candidate constellation points that are repeated with the modulo width (soft-decision demodulation processing). The demodulation unit 715*b* inputs the calculated LLR to the decoding unit 717 to perform error correction decoding. Here, the demodulation unit 715*b* may calculate an LLR by using, for example, a well-known method given by Expressions (15) to (20) described in NPL 6. That is, this calculation may be made using an algorithm for calculating an LLR using the Euclidean distance between a received constellation point and a candidate constellation point close to the received constellation point among candidate constellation points that are repeated with the modulo width. This configuration can also be applied to the wireless reception devices 200 of the following embodiments in a similar manner.

FIG. 7 is a diagram illustrating an example of group information created by the group construction unit 307 of the wireless transmission device 100 and shared with the wireless reception devices 200 in Embodiment 1.1 of the present invention. In the example in FIG. 7, four groups, namely, two groups (groups with group IDs 1 and 2) for which linear precoding is used as a precoding scheme and two groups (groups with group IDs 3 and 4) for which non-linear precoding is used as a precoding scheme, are defined for the wireless reception devices 200-1 to 200-8.

FIG. 8A and FIG. 8B illustrate an example of a sequence chart illustrating the operation between the wireless transmission device 100 and each of the wireless reception devices 200 according to Embodiment 1.1 of the present invention. In FIG. 8A and FIG. 8B, the wireless reception devices 200-1, 200-2, and 200-8 are illustrated as representatives of the wireless reception devices 200. In the following description, furthermore, group identification information is included in control information added to a sounding signal and a multi-user MIMO signal. First, each of the wireless reception devices 200 transmits information on a precoding scheme supported by each of the wireless reception devices 200 (compatibility information) or compatibility information based on category information by which the supporting precoding scheme can be determined (terminal class, compatibility standard information, reception function information indicating the presence or absence of the modulo operation function, etc.) to the wireless transmission device 100 (step S101). Each of the wireless reception devices 200 may transmit compatibility information at individual timing, for example, when it first establishes communication with the wireless transmission device 100 or when it receives a request from the wireless transmission device 100.

The wireless transmission device 100 creates groups by separating the wireless reception devices 200 into a plurality of groups for which precoding schemes to be used for multi-user MIMO transmission are determined on the basis of the compatibility information or the like notified by the wireless reception devices 200 (step S103), and notifies each of the wireless reception devices 200 of information on the corresponding group (group configuration information) (step S105). Then, the wireless transmission device 100 selects a group for which multi-user MIMO transmission is performed (step S107), generates a sounding signal with control information including a group ID identifying the selected group (step S109), and transmits the control information (step S111). The sounding signal is transmitted (step S111) once to all the wireless reception devices in the group.

Each of the wireless reception devices 200 receives the sounding signal described above, and checks the group ID included in the control information to determine whether this wireless reception device 200 belongs to the group (step S113). If this wireless reception device 200 belongs to the group, the wireless reception device 200 estimates the channel state between the wireless reception device 200 and the wireless transmission device 100 on the basis of the reception state of the reference signal included in the sounding signal, generates channel information indicating the estimated channel state (step S115), and notifies the wireless transmission device 100 of the channel information (step S117). In the illustration of the example in FIG. 8A and FIG. 8B, the wireless reception devices 200-2 and 200-8 belong to the group. The notification of channel information is made sequentially in the predetermined order of the wireless reception devices 200 in the group.

The wireless transmission device 100 receives channel information from each of the wireless reception devices 200 belonging to the selected group, and precodes transmit data sequences addressed to the wireless reception devices 200 using a precoding scheme determined for the selected group on the basis of the received channel information to generate multi-user MIMO symbols (step S119). Then, the wireless transmission device 100 transmits a multi-user MIMO signal to which control information including the group ID identifying the selected group is added (step S121). The multi-user MIMO signal is transmitted (step S121) once to all the wireless reception devices in the group. The transmission of a multi-user MIMO signal may be recognized as being included in the sequence from transmission of a sounding signal to the transmission of a multi-user MIMO signal, and no group ID may be added to the multi-user MIMO signal.

Each of the wireless reception devices 200 receives the multi-user MIMO signal described above, and checks the group ID included in the control information to determine whether this wireless reception device 200 belongs to the group (step S123). If this wireless reception device 200 belongs to the group, the wireless reception device 200 receives the multi-user MIMO symbols, and performs data receiving processing such as demodulation and error correction decoding (step S125). The wireless reception device 200 notifies the wireless transmission device 100 of an Acknowledgement (ACK) if no error is detected in the received data, and notifies the wireless transmission device 100 of a Negative Acknowledgment (NAK or NACK) if an error is detected (step S127). The notification of an ACK and an NAK is made sequentially in the predetermined order of the wireless reception devices 200 in the group.

As described above, according to this embodiment, in a wireless communication system configured such that the wireless transmission device 100 selects and uses one of linear precoding and non-linear precoding every time multi-user MIMO transmission is performed, it is possible to determine whether a multi-user MIMO signal transmitted from the wireless transmission device 100 has undergone linear precoding or non-linear precoding, by using a group ID, and it is possible to notify the wireless reception devices 200 of the determined precoding scheme without increasing the amount of control information.

(Embodiment 1.2)

A communication technique according to this embodiment will be described using as an example, similarly to Embodiment 1.1, a wireless communication system in which a wireless transmission device 100 selects a plurality of wireless reception devices 200 from among multiple wireless reception devices 200 to perform multi-user MIMO transmission, and suppresses MUI, which is caused between streams addressed to the wireless reception devices 200, using linear precoding or non-linear precoding in advance before performing transmission. In this embodiment, the description will focus on, by way of example, a wireless communication system using hybrid linear and non-linear precoding that allows mixing of linear precoding and non-linear precoding, one of which is selected for each of a plurality of wireless reception devices 200 to which data is simultaneously transmitted via multi-user MIMO transmission.

In the wireless communication system according to this embodiment, similarly to Embodiment 1.1, when the wireless transmission device 100 is to communicate with a plurality of wireless reception devices 200 (for example, the wireless reception devices 200-1 to 200-8), the wireless transmission device 100 creates a plurality of groups based on a plurality of combinations of wireless reception devices 200 among these wireless reception devices 200, determines, for each of the groups, a precoding scheme to be used for multi-user MIMO transmission, and notifies each of the wireless reception devices 200 of information on grouping and the determined precoding schemes prior to communication so that the information can be shared between the wireless transmission device 100 and the wireless reception devices 200. Unlike Embodiment 1.1, however, wireless reception devices 200 having different precoding schemes to be used for multi-user MIMO transmission may be included in the same group. In this case, each of the wireless reception devices 200 is notified of information on the preceding schemes to be used for the respective streams addressed to the wireless reception devices 200 in the group, prior to communication, so that the information can also be shared. Note that one wireless reception device 200 may belong to a plurality of groups.

Then, similarly to Embodiment 1.1, the wireless transmission device 100 selects one of the plurality of groups created in the way described above, which are candidate combinations of wireless reception devices 200 (target wireless reception devices) for which multi-user MIMO transmission is to be performed, and performs multi-user MIMO transmission to simultaneously communicate transmit data addressed to a plurality of wireless reception devices 200 belonging to the selected group through spatial multiplexing in the same frequency band. In this case, the wireless transmission device 100 notifies each of the wireless reception devices 200 of the group for which the multi-user MIMO transmission is to be performed, by using a group ID identifying the selected group. Based on the notification of the group ID, also, the wireless reception devices 200 can identify the precoding scheme that the wireless transmission device 100 has used.

The configuration of the wireless transmission device 100 according to this embodiment is similar to that of the wireless transmission device 100 of Embodiment 1.1 illustrated in FIG. 2, and is different in terms of the configuration of the precoding unit 323. In addition, the processing performed in the selection unit 315, the group construction unit 307, and the group storage unit 309 differs. A description of the same portions as those in Embodiment 1.1 will be omitted, and different portions will be described hereinafter.

The selection unit 315 selects a group to which a plurality of wireless reception devices 200 for which multiplexing with multi-user MIMO processing is performed belong from among the plurality of groups stored in the group storage unit 309 on the basis of the channel information on each of the wireless reception devices 200, which is acquired by the channel information acquisition unit 313, and the amount of transmit data addressed to each of the wireless reception devices 200, a priority, and the like, which are accumulated in the transmission buffer unit 317. Furthermore, the selection unit 315 outputs a precoding scheme selection signal indicating a precoding scheme determined in advance for each of the wireless reception devices 200 in association with the selected group. The selection unit 315 may also select parameters, such as the Modulation and Coding Scheme (MCS) of transmit data addressed to each of the wireless reception devices 200, on the basis of the CQI or the like from each of the wireless reception devices 200, which are acquired by the channel information acquisition unit 313. In this embodiment, the description will focus on the following case: A group to which four terminals, namely, the first to fourth wireless reception devices 200 among the wireless reception devices 200-1 to 200-8, belong is selected, the selected group is a hybrid linear and non-linear precoding group in which a linear preceding scheme is used for the first and second wireless reception devices 200 and a non-linear preceding scheme is used for the third and fourth wireless reception devices 200, and one sequence (one stream) is transmitted to each of the wireless reception devices 200.

The group construction unit 307 according to this embodiment creates a plurality of groups using a plurality of combinations of wireless reception devices 200 on the basis of at least the supporting precoding scheme information of each of the wireless reception devices 200, which is output from the control information acquisition unit 305, and determines, for each of the groups or each of the wireless reception devices 200, a precoding scheme to be used for each group. Note that one wireless reception device 200 may belong to a plurality of groups. The group construction unit 307 may also perform grouping using position information of each of the wireless reception devices 200 or information such as a result of estimating the angle of arrival of a radio wave from each of the wireless reception devices 200. In this case, for example, wireless reception devices 200 located away from each other or wireless reception devices 200 having largely different radio-wave arrival angles may be combined into a group in order to reduce channel correlation. There may also be a plurality of groups in which each of the wireless reception devices 200 has a different precoding scheme or the order of wireless reception devices 200 is different for the same combination of wireless reception devices 200.

The group storage unit 309 stores information on the groups created by the group construction unit 307 (group configuration information including group IDs, wireless reception devices 200 belonging to the respective groups, precoding schemes used in the respective groups, and the orders of wireless reception devices 200 in the respective groups). The precoding unit 323 receives an input of modulation symbols addressed to a plurality of wireless reception devices 200 belonging to the group selected by the selection unit 315 (here, the description will be given of the case where, by way of example, the first to fourth wireless reception devices 200 belong to the selected group), and precodes each of the input modulation symbols on the basis of the CSI from each of the wireless reception devices 200, which is acquired by the channel information acquisition unit 313, so as to precode the respective modulation symbols addressed to the wireless reception devices 200 using respective precoding schemes for the wireless reception devices 200, which are determined in association with the group selected by the selection unit 315, to generate multi-user MIMO symbols for each of the plurality of antennas of the antenna unit 303 to be used for transmission.

FIG. 9 is a functional block diagram illustrating a precoding unit 323b, which is an example configuration of the precoding unit 323 according to Embodiment 1.2 of the present invention. The precoding unit 323b includes a linear precoding unit 401, a non-linear precoding unit 403, a hybrid precoding unit 801, and a switching unit 803. The linear precoding unit 401 and the non-linear precoding unit 403 are similar to those in Embodiment 1.1, and are illustrated in FIG. 4 and FIG. 5, respectively. The operation of the hybrid precoding unit 801 will be described below. The switching unit 803 receives an input of the results of linear precoding, which are output from the linear precoding unit 401, the results of non-linear precoding, which are output from the non-linear precoding unit 403, and the results of hybrid linear and non-linear precoding, which are output from the hybrid precoding unit 801, and selects one of them on the basis of a precoding scheme selection signal input from the selection unit 315 to output first to fourth multi-user MIMO symbols to be transmitted from the respective antennas of the antenna unit 303. Preferably, each of the linear precoding unit 401, the non-linear precoding unit 403, and the hybrid precoding unit 801 does not perform a processing operation if the precoding scheme selection signal does not specify the selection of the corresponding precoding scheme. This can reduce power consumption.

Figure 10:
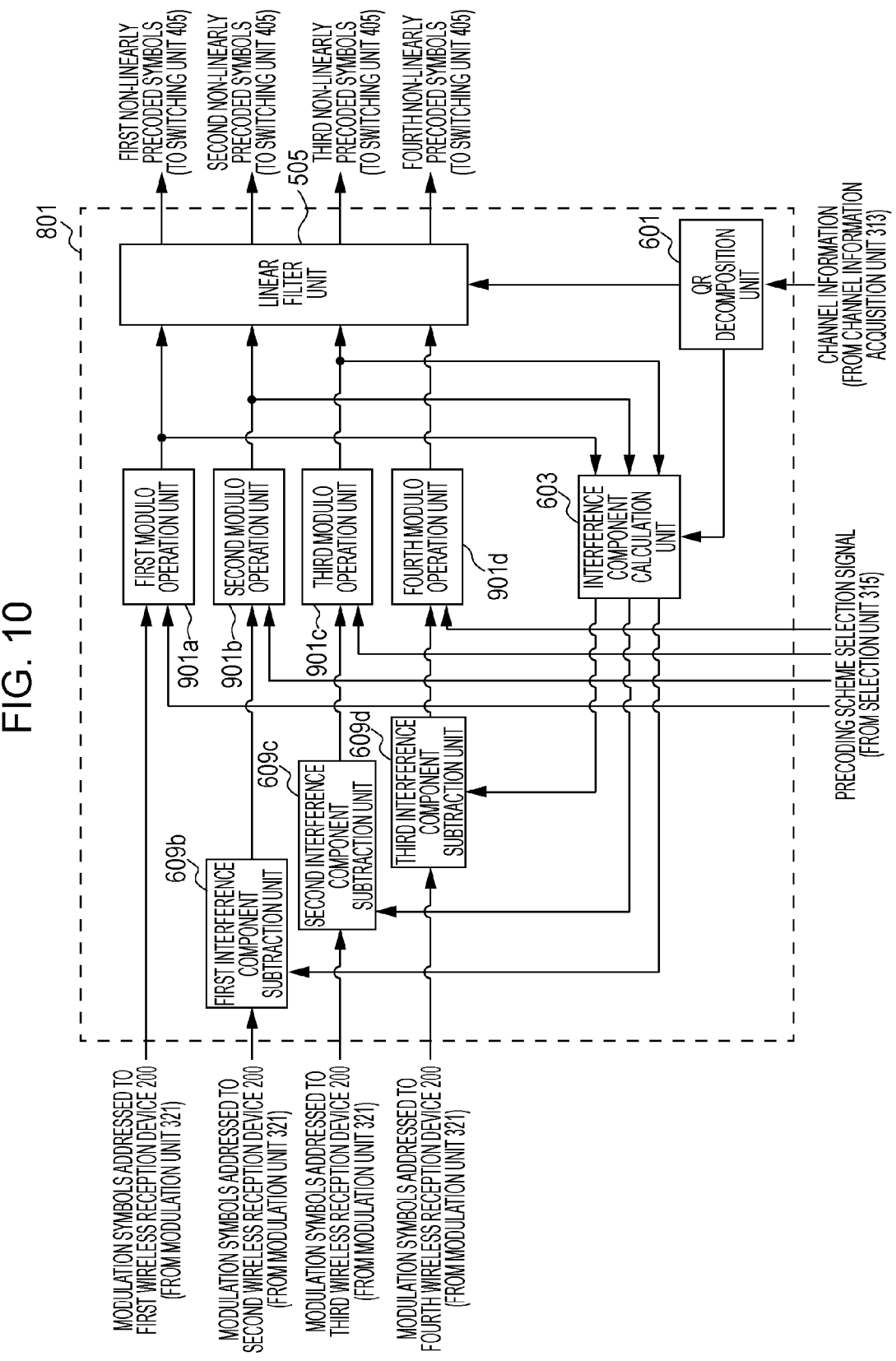
FIG. 10 is a functional block diagram illustrating an example configuration of a hybrid precoding unit 801 according to Embodiment 1.2 of the present invention.

FIG. 10 is a functional block diagram illustrating an example configuration of the hybrid precoding unit 801 according to Embodiment 1.2 of the present invention. Referring to the example in FIG. 10, a description will be given to the case where multi-user MIMO signals are generated using linear precoding and Tomlinson-Harashima precoding (THP) serving as non-linear precoding in a mixed manner, one of which is selected for each of the wireless reception devices 200 on the basis of a precoding scheme selection signal for each of the wireless reception devices 200, which is input from the selection unit 315.

The hybrid precoding unit 801 of FIG. 10 performs basically the same operation as that of the non-linear precoding unit 403 illustrated in FIG. 5. The hybrid precoding unit 801 receives an input of a precoding scheme selection signal from the selection unit 315, and switches whether to perform a modulo operation using first to fourth modulo operation units 901a to 901d corresponding to the first to fourth wireless reception devices 200 (hereinafter, the first to fourth modulo operation units 901a to 901d will also be collectively referred to as "modulo operation units 901") in accordance with the precoding scheme selection signal. Specifically, a modulo operation unit 901 corresponding to a wireless reception device 200 for which the precoding scheme selection signal indicates linear precoding does not perform a modulo operation, and a modulo operation unit 901 corresponding to a wireless reception devices 200 for which the precoding scheme selection signal indicates non-linear precoding performs a modulo operation. In the example of this embodiment, each of the first modulo operation unit 901a and the second modulo operation unit 901b corresponding to the first and second wireless reception devices 200, respectively, does not perform a modulo operation and allows a signal to pass therethrough, while each of the third modulo operation unit 901c and the fourth modulo operation unit 901d corresponding to the third and fourth wireless reception devices 200, respectively, performs a modulo operation on a signal from which the interference component has been subtracted.

In this embodiment, the description will focus on the configuration of the precoding unit 323b which includes three precoding units, namely, the linear precoding unit 401, the non-linear precoding unit 403, and the hybrid precoding unit 801. Alternatively, the precoding unit 323b may include only the hybrid precoding unit 801, as illustrated in FIG. 10. In this case, if the precoding scheme selection signal from the selection unit 315 specifies the selection of linear precoding for all the wireless reception devices 200 (the modulo operation units 901 do not perform a modulo operation), multi-user MIMO symbols equivalent to those of linear precoding are obtained. If the precoding scheme selection signal specifies the selection of non-linear precoding for all the wireless reception devices 200 (the modulo operation units 901 perform a modulo operation), multi-user MIMO symbols equivalent to those of non-linear precoding are obtained.

The configuration of each of the wireless reception devices 200 according to this embodiment is similar to that of each of the wireless reception devices 200 of FIG. 6A or FIG. 6B according to Embodiment 1.1, and is different in terms of the processing of the determination unit 711. A description of the same portions as those in Embodiment 1.1 will be omitted, and different portions will be described hereinafter. The determination unit 711 refers to the group configuration information stored in the group storage unit 707 to determine whether the associated wireless reception device 200 (local station) belongs to a group identified by the group ID acquired by the identification information acquisition unit 709, and notifies the control unit 719 of the determination result. If the associated wireless reception device 200 belongs to the group, the determination unit 711 causes the execution of the data receiving operation through the control unit 719. The determination unit 711 also refers to the group configuration information stored in the group storage unit 707 to determine whether the precoding scheme of the local station in the group identified by the acquired group ID is linear precoding or non-linear precoding. If the precoding scheme is linear precoding, the determination unit 711 generates a signal instructing the modulo operation unit 713 not to perform a modulo operation. If the precoding scheme is non-linear precoding, the determination unit 711 generates a signal instructing the modulo operation unit 713 to perform a modulo operation.

FIG. 11 is a diagram illustrating an example of group information created by the group construction unit 307 of the wireless transmission device 100 and shared with the wireless reception devices 200 in Embodiment 1.2 of the present invention. In the example in FIG. 11, six groups, namely, two groups (groups with group IDs 1 and 2) for which linear precoding is used as a precoding scheme, two groups (groups with group IDs 3 and 4) for which non-linear precoding is used, and two groups (groups with group IDs 5 and 6) including wireless reception devices 200 for which linear precoding and non-linear precoding are mixed, are defined for the wireless reception devices 200-1 to 200-8.

The wireless transmission device 100 selects a plurality of wireless reception devices 200 for which multi-user MIMO transmission is to be performed, on the basis of the channel information or the like informed by the wireless reception devices 200, and selects one group by extracting a group including the selected plurality of wireless reception devices 200. Alternatively, the wireless transmission device 100 may first select a group (and a precoding scheme accordingly) on the basis of the channel information or the like informed by the wireless reception devices 200, and then select the wireless reception devices 200 belonging to the selected group as the target of multi-user MIMO transmission.

While embodiments of this invention have been described in detail with reference to the drawings, a specific configuration is not limited to those embodiments, and design variations and the like within the scope of this invention also fall within the invention.

(Embodiment 2.1)

A communication technique according to this embodiment will be described using as an example a wireless communication system in which a wireless transmission device (base station device, access point, etc.) selects a plurality of wireless reception devices from among multiple wireless reception devices (terminal devices) to perform multi-user MIMO transmission, and suppresses Multi-User Interference (MUI), which is caused between streams addressed to the respective wireless reception devices, using linear precoding or non-linear precoding in advance before performing transmission.

Figure 12:
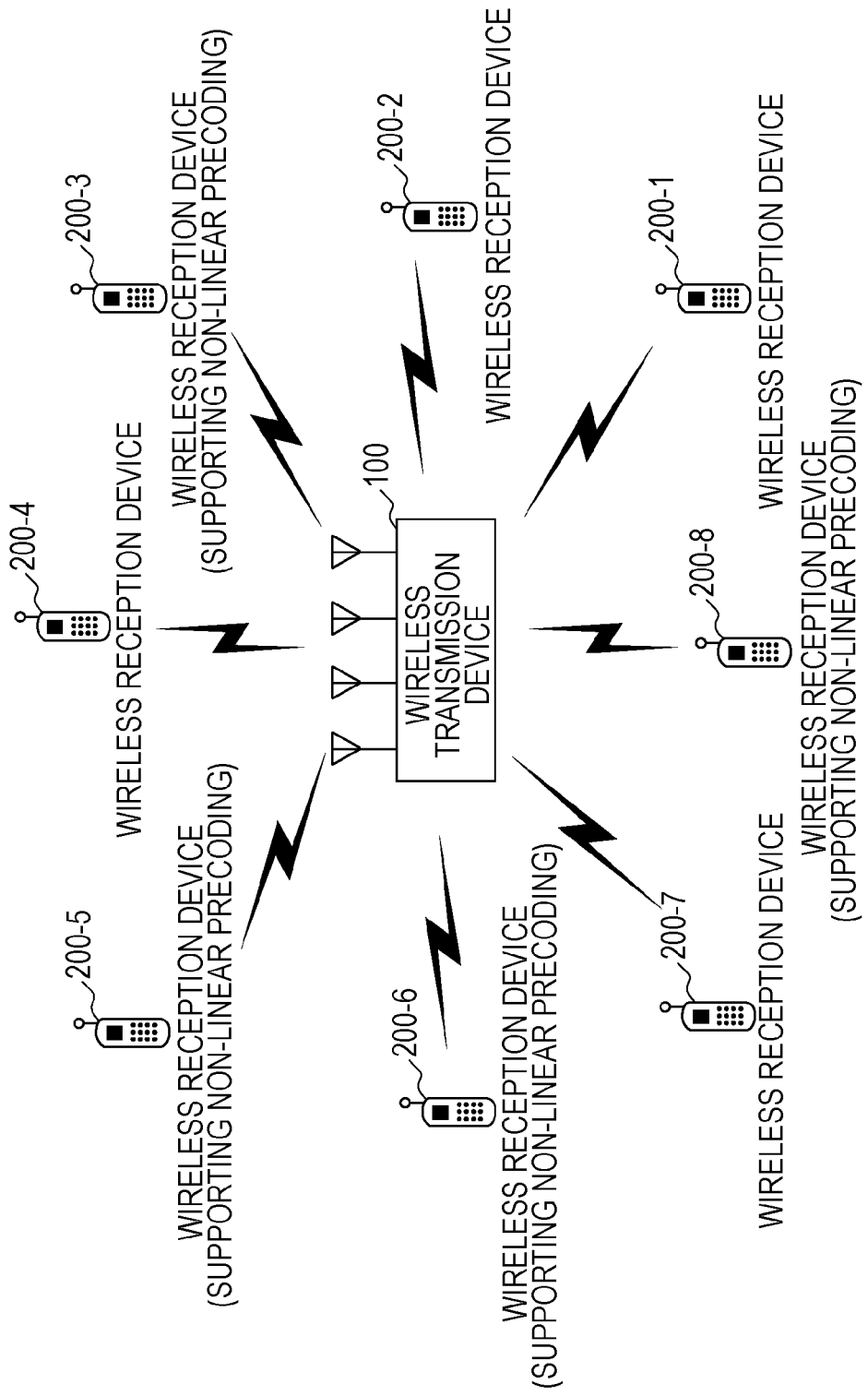
FIG. 12 is a diagram illustrating a schematic example configuration of a communication system of the present invention.

FIG. 12 is a diagram illustrating a schematic example configuration of a wireless communication system of the present invention. As illustrated in FIG. 12, in a wireless communication system according to this embodiment, when a wireless transmission device 100 is to communicate with a plurality of wireless reception devices (for example, wireless reception devices 200-1 to 200-8; the wireless reception devices 200-1 to 200-8 will also be collectively referred to as "wireless reception devices 200"), the wireless transmission device 100 creates a plurality of groups based on a plurality of combinations of wireless reception devices 200 among these wireless reception devices 200, and assigns group identification numbers (group IDs) each identifying one of the groups. Note that one wireless reception device 200 may belong to a plurality of groups. In this embodiment, a precoding scheme to be used for multi-user MIMO transmission is determined in advance for each of the group IDs by the system. In other words, a plurality of candidate group IDs corresponding to a preceding scheme to be used for multi-user MIMO transmission (specifically, a plurality of candidates identified by, for example, the range of values of group IDs, bit pattern, or the like) are determined in advance, and the wireless transmission device 100 selects one different candidate group ID among the candidate group IDs corresponding to the preceding scheme used for each of the created groups, and assigns group IDs of the respective groups. Groups are determined in advance in such a manner that, if group IDs are 6 bits (0 to 63), for example, the group IDs up to 31 are assigned to a group (first group) for which linear preceding is used and group ID 32 and subsequent group IDs are assigned to a group (second group) for which non-linear precoding is used. The group IDs of the first group and the group IDs of the second group may be distinguished from each other by, as described above, dividing the range of values that the group IDs may take into two parts or by dividing the groups by the value of a specific bit when group IDs are represented in binary notation (for example, a first group for the specific bit 0, and a second group for the specific bit 1). Any other method determined in advance by the system and capable of determining a group by only group ID may be used.

The wireless transmission device 100 notifies each of the wireless reception devices 200 of information on the grouping described above (information indicating a group to which each of the wireless reception devices 200 belongs) and information specifying the processing order of wireless reception devices in each group (the order of notification of channel information, ACK/NAK responses, and the like in multi-user MIMO transmission processing, the order of individual pieces of information addressed to the wireless reception devices 200 in a control signal, the order of spatial streams, etc.), prior to communication. The wireless transmission device 100 selects one of the plurality of groups created in the way described above, which are candidate combinations of wireless reception devices 200 (target wireless reception devices) for which multi-user MIMO transmission is to be performed, and performs multi-user MIMO transmission to simultaneously communicate transmit data addressed to a plurality of wireless reception devices 200 belonging to the selected group through spatial multiplexing in the same frequency band. In this case, the wireless transmission device 100 notifies each of the wireless reception devices 200 of the group for which the multi-user MIMO transmission is to be performed, by using a group ID identifying the selected group. Based on the notification of the group ID, also, the wireless reception devices 200 can identify the precoding scheme that the wireless transmission device 100 has used.

The transmission scheme will be described using, for example, but not limited to, a wireless communication system based on Orthogonal Frequency Division Multiplexing (OFDM).

Each of the wireless reception devices 200-1 to 200-8 receives a reference signal (known signal between the transmitter and the receivers; a pilot signal, a training signal, etc.) from the wireless transmission device 100, estimates a channel state between each transmit antenna at the wireless transmission device 100 and each receive antenna at this wireless reception device, and informs the wireless transmission device 100 of channel information indicating the channel states. The wireless transmission device 100 selects one group from among the plurality of groups on the basis of the channel information or the like informed by the wireless reception devices 200, and performs multi-user MIMO transmission to simultaneously communicate transmit data addressed to the plurality of wireless reception devices 200 through spatial multiplexing.

The channel information, examples of which include a Channel Quality Indicator (CQI) indicating a Signal to Noise power Ratio (SNR), a Signal to Interference plus Noise power Ratio (SINR), a Carrier to Noise power Ratio (CNR), a Carrier to Interference plus Noise power Ratio (CINR), or a value calculated from them, Channel State Information (CSI) indicating complex channel gain from each transmit antenna at the wireless transmission device 100 to each receive antenna at each of the wireless reception devices 200 or the covariance value or the like of the complex channel gain, or a desired Precoding Matrix Index (PMI) determined from the channel state, is received from each of the wireless reception devices 200. A group of wireless reception devices 200 for which multiplexing with multi-user MIMO processing is performed is selected on the basis of the received information.

FIG. 2 is a functional block diagram illustrating an example configuration of the wireless transmission device 100 of the present invention. In the example configuration of FIG. 2, the wireless transmission device 100 includes four antennas, and is capable of multi-user MIMO transmission of transmit data addressed to up to four wireless reception devices 200 through spatial multiplexing. A wireless reception unit 301 receives signals transmitted from the individual wireless reception devices 200 (the wireless reception devices 200-1 to 200-8) via a plurality of antennas of an antenna unit 303. A control information acquisition unit 305 acquires information on a precoding scheme supported by each of the wireless reception devices 200 (compatibility information) or category information by which the supporting precoding scheme can be determined (terminal class, compatibility standard information, reception function information indicating the presence or absence of the modulo operation function, etc.), which is received from a wireless reception device 200 with which the wireless transmission device 100 first establishes communication or from each of the wireless reception devices 200 or the like in cases such as when grouping is updated, and outputs supporting precoding scheme information of each of the wireless reception devices 200. In this embodiment, by way of example, in the communication system of FIG. 12, the wireless reception devices 200-1, 200-2, 200-4, and 200-7 are wireless reception devices 200 (hereinafter referred to as "linear wireless reception devices") that support only linear precoding (wireless reception devices 200 each of which does not include a modulo operation unit described below), and the wireless reception devices 200-3, 200-5, 200-6, and 200-8 are wireless reception devices 200 (hereinafter referred to as "non-linear wireless reception devices") that support both linear precoding and non-linear precoding (wireless reception devices 200 each of which include a modulo operation unit). For example, a linear wireless reception device is an existing terminal device supporting multi-user MIMO based on linear precoding, and a non-linear wireless reception device is a terminal device or the like also supporting multi-user MIMO based on non-linear precoding while maintaining backward compatibility.

A group construction unit 307 creates a plurality of groups using a plurality of combinations of wireless reception devices 200 on the basis of at least the supporting precoding scheme information of each of the wireless reception devices 200, which is output from the control information acquisition unit 305, determines a precoding scheme to be used for each group, and assigns a group ID corresponding to the determined precoding scheme. For example, in the example of 6-bit group IDs described above, group IDs up to 31 are assigned to a first group for which linear precoding is used, and group ID 32 and subsequent group IDs are assigned to a second group for which non-linear precoding is used. In this case, the group construction unit 307 also determines the order of the wireless reception devices 200 in each group (the order of notification of channel information, ACK/NAK responses, and the like in multi-user MIMO transmission processing, the order of individual pieces of information addressed to the wireless reception devices 200 in a control signal, the order of spatial streams, etc.). Note that one wireless reception device 200 may belong to a plurality of groups. In addition, there may be a wireless reception device 200 that belongs to none of the groups. However, groups are created such that a linear wireless reception device supporting only linear precoding belongs to the first group. A non-linear wireless reception device supporting both linear precoding and non-linear precoding may belong to either the first group or the second group. Furthermore, the group construction unit 307 may also perform grouping using position information of each of the wireless reception devices 200 or information such as a result of estimating the angle of arrival of a radio wave from each of the wireless reception devices 200. In this case, for example, wireless reception devices 200 located away from each other or wireless reception devices 200 having largely different radio-wave arrival angles may be combined into a group in order to reduce channel correlation. There may also be a plurality of groups in which a precoding scheme or the order of wireless reception devices 200 is different for the same combination of wireless reception devices 200. In this manner, in a case where a plurality of groups in which a precoding scheme or the order of wireless reception devices 200 is different for the same combination of wireless reception devices 200 are created, a group defined by a more efficient precoding scheme or order can be selected from among the plurality of groups in accordance with the state of the respective channels and the like for the wireless reception devices 200 in the combination.

A group storage unit 309 stores information on the groups created by the group construction unit 307 (group configuration information including group IDs, wireless reception devices 200 belonging to the respective groups, and the orders of wireless reception devices 200 in the respective groups). A configuration information generation unit 311 generates group configuration information for notifying each of the wireless reception devices 200 of information on the groups created by the group construction unit 307. The wireless reception devices 200 may be notified of the group configuration information, for each group, by being notified of information indicating wireless reception devices 200 belonging to each group (identification information on the wireless reception devices 200, namely, user IDs, MAC addresses, etc.) and the order of the wireless reception devices 200 in the group, or may be notified of the group configuration information, for each of the wireless reception devices 200, by being notified of information indicating a group to which each of the wireless reception devices 200 belongs and the ordinal number of the wireless reception device 200 in the group. A channel information acquisition unit 313 acquires channel information including information of CQI and CSI, which is transmitted from the wireless reception devices 200-1 to 200-8, from the received signals.

A selection unit 315 selects a group to which a plurality of wireless reception devices 200 (target wireless reception devices) for which multiplexing with multi-user MIMO processing is performed belong from among the plurality of groups stored in the group storage unit 309 on the basis of the amount of transmit data addressed to each of the wireless reception devices 200 and a priority, which are accumulated in a transmission buffer unit 317, and the channel information or the like on each of the wireless reception devices 200, which are acquired by the channel information acquisition unit 313. Furthermore, the selection unit 315 outputs a precoding scheme selection signal indicating a precoding scheme determined in advance in association with the group ID of the selected group. The selection unit 315 may also select parameters, such as the Modulation and Coding Scheme (MCS) of transmit data addressed to each of the wireless reception devices 200, on the basis of the CQI or the like from each of the wireless reception devices 200, which are acquired by the channel information acquisition unit 313. In this embodiment, the description will focus on a case where a group to which four terminals, namely, first to fourth wireless reception devices 200 among the wireless reception devices 200-1 to 200-8, belong is selected and one sequence (one stream) is transmitted to each of the wireless reception devices 200.

The transmission buffer unit 317 accumulates transmit data sequences addressed to the respective wireless reception devices 200, which are input from the higher layer, and outputs the respective transmit data sequences addressed to the first to fourth wireless reception devices 200 selected by the selection unit 315 to a coding unit 319. The coding unit 319 performs error correction coding on the transmit data sequences addressed to the first to fourth wireless reception devices 200, which are input from the transmission buffer unit 317. In a case where the coding rate of the transmit data addressed to each of the wireless reception devices 200 has been selected by the selection unit 315, the coding unit 319 performs rate matching (puncturing) in accordance with the selected coding rate. If no coding rate is specified, the coding unit 319 may perform rate matching with a predetermined coding rate. A modulation unit 321 modulates the transmit data sequences addressed to the first to fourth wireless reception devices 200, each of which has undergone error correction coding, and outputs a modulation symbol for each of sub-carriers addressed to the first to fourth wireless reception devices 200. In a case where the modulation scheme of the transmit data addressed to each of the wireless reception devices 200 has been selected by the selection unit 315, the modulation unit 321 performs modulation using the selected modulation scheme. If no modulation scheme is specified, the modulation unit 321 preferably performs modulation using a predetermined modulation scheme.

A precoding unit 323 receives an input of modulation symbols addressed to the first to fourth wireless reception devices 200, and precodes each of the input modulation symbols on the basis of the CSI from each of the wireless reception devices 200, which is acquired by the channel information acquisition unit 313, using a precoding scheme determined in association with the group ID of the group selected by the selection unit 315 to generate multi-user MIMO symbols for each of the plurality of antennas of the antenna unit 303 to be used for transmission. The details of the precoding unit 323 will be described below.

A reference signal multiplexing unit 325 multiplexes a reference signal to be transmitted from each antenna of the antenna unit 303 on a multi-user MIMO symbol to be transmitted from each antenna. The reference signals are preferably multiplexed so as to allow the wireless reception devices 200 to receive the reference signals transmitted from the respective antennas at the wireless transmission device 100 in an identifiable form. For example, the reference signals may be multiplexed by time division, multiplexed by frequency division so as to be divided into sub-carriers, or multiplexed by code division. In addition, in a case where a sounding signal (sounding frame, sounding packet, null data packet) not including a transmit data sequence but including a reference signal and a control signal is to be transmitted to each of the wireless reception devices 200 for the purpose of channel estimation, the reference signal multiplexing unit 325 directly outputs reference signals to be transmitted from the respective antennas.

An IFFT unit 327 performs frequency-time conversion, such as an Inverse Fast Fourier Transform (IFFT), on each of the multi-user MIMO signals for the respective antennas on which the reference signals have been multiplexed to convert the multi-user MIMO signals into signals in the time-domain. A GI insertion unit 329 inserts a Guard Interval (GI) into each of the time-domain signals for the respective antennas. An identification information generation unit 331 generates group identification information for notifying the wireless reception devices 200 of a group identification number (group ID) for identifying the selected group on the basis of the selection result of the selection unit 315. The group identification information may include information on the MCS of each of the wireless reception devices 200. A wireless transmission unit 333 transmits the signals with GIs inserted therein via the respective antennas of the antenna unit 303. The group configuration information generated by the configuration information generation unit 311 and the group identification information generated by the identification information generation unit 331 are also transmitted via one or more antennas of the antenna unit 303. A control unit 335 controls each of the units described above to execute the respective processing operations.

FIG. 3 is a functional block diagram illustrating a precoding unit 323a, which is an example configuration of the precoding unit 323 according to Embodiment 2.1 of the present invention. The precoding unit 323a includes a linear precoding unit 401, a non-linear precoding unit 403, and a switching unit 405. The linear precoding unit 401 receives an input of modulation symbols addressed to the first to fourth wireless reception devices 200, and performs linear precoding on each of the input modulation symbols on the basis of the CSI or PMI in the channel information acquired by the channel information acquisition unit 313. The details of the linear precoding unit 401 will be described below. The non-linear precoding unit 403 receives an input of modulation symbols addressed to the first to fourth wireless reception devices 200, and performs non-linear precoding on each of the input modulation symbols on the basis of the CSI or PMI in the channel information acquired by the channel information acquisition unit 313. The details of the non-linear precoding unit 403 will be described below.

The switching unit 405 receives an input of the results of linear precoding, which are output from the linear precoding unit 401, and the results of non-linear precoding, which are output from the non-linear precoding unit 403, and selects one of them on the basis of a precoding scheme selection signal input from the selection unit 315 to output first to fourth multi-user MIMO symbols to be transmitted from the respective antennas of the antenna unit 303. Preferably, each of the linear precoding unit 401 and the non-linear precoding unit 403 does not perform a processing operation if the precoding scheme selection signal does not specify the selection of the corresponding precoding scheme. This can reduce power consumption.

FIG. 4 is a functional block diagram illustrating an example configuration of the linear precoding unit 401 according to Embodiment 2.1 of the present invention. The linear precoding unit 401 includes a filter calculation unit 501 and a linear filter unit 503. Referring to the example in FIG. 4, a description will be given to the case where Zero-Forcing precoding based on the CSI is performed as linear precoding to generate multi-user MIMO signals. The filter calculation unit 501 generates, for each sub-carrier, a channel matrix H whose elements correspond to complex channel gain between each antenna at the wireless transmission device 100 and antennas at each of the wireless reception devices 200, from the CSI in the channel information on each of the wireless reception devices 200, which is acquired by the channel information acquisition unit 313, and calculates the inverse matrix H pseudo-inverse matrix $H^{\backslash}=H^{H}(HH^{H})^{-1}$) as a weight matrix W serving as a linear filter. The linear filter unit 503 receives an input of modulation symbols addressed to the first to fourth wireless reception devices, and multiplies, for each sub-carrier, the modulation symbols by the linear filter W calculated by the filter calculation unit 501 to output multi-user MIMO symbols (linearly precoded symbols) to be transmitted from the respective antennas of the antenna unit 303.

Accordingly, in a case where the multi-user MIMO symbols are received at the respective wireless reception devices 200, each of the wireless reception devices 200 receives only the signal addressed to this wireless reception device while interference (MUI) due to the signals to be transmitted to the wireless reception devices other than this wireless reception device is canceled by linear precoding. The linear precoding unit 401 has been described in the context of, as an example, but not limited to, the filter calculation unit 501 calculating and using an inverse matrix as a linear filter. The weight matrix $W=H^{H}(HH^{H}+\alpha I)^{-1}$ (I denotes a unit matrix and α denotes a normalization factor) determined by MMSE criteria may be used as a linear filter. In this case, it is difficult to completely cancel MUI at the time of reception. However, it is possible to maximize the SINR, resulting in improvement in reception performance. In a communication system that uses PMI, furthermore, the filter calculation unit 501 determines a weight matrix from the precoding vector indicated by the PMI of each of the wireless reception devices 200, and uses the weight matrix as a linear filter.

FIG. 5 is a functional block diagram illustrating an example configuration of the non-linear precoding unit 403 according to Embodiment 2.1 of the present invention. Referring to the example in FIG. 5, a description will be given to the case where Tomlinson-Harashima precoding (THP) is performed as non-linear precoding to generate multi-user MIMO signals. A QR decomposition unit (interference matrix calculation unit) 601 generates, for each sub-carrier, a channel matrix H whose elements correspond to complex channel gain between each antenna at the wireless transmission device 100 and antennas at each of the wireless reception devices 200, from the CSI in the channel information on each of the wireless reception devices 200, which is acquired by the channel information acquisition unit 313, and performs QR decomposition on the Hermitian conjugate $H^H$ of the channel matrix H to decompose it into a unitary matrix Q and an upper triangular matrix R. The QR decomposition unit 601 further determines the Hermitian conjugate $R^H$ of the upper triangular matrix R (corresponding to a lower triangular matrix), and determines an interference matrix $B=(diagR^E)^{-1}R^H-I$ representing the gain of MUI between the wireless reception devices 200. The QR decomposition unit 601 outputs the interference matrix B to an interference component calculation unit 603, and outputs the unitary matrix Q to a linear filter unit 605. Note that diagX denotes a matrix having the diagonal elements of a matrix X, and I denotes a unit matrix. The interference matrix B is expressed in the form of Expression (2) given above.

A first modulo operation unit 607a performs a modulo operation on the modulation symbols addressed to the first wireless reception device 200, which are generated by the modulation unit 321. Since there is no MUI for the modulation symbols addressed to the first wireless reception device 200, the provision of an interference component subtraction unit 609 is omitted. The provision of the modulo operation unit 607 may also be omitted. The interference component calculation unit 603 calculates an interference component to be imposed on the modulation symbol of each sub-carrier addressed to the second wireless reception device 200 by the result of the modulo operation on the modulation symbol of each sub-carrier addressed to the first wireless reception device 200, on the basis of the interference matrix B determined by the QR decomposition unit 601. Here, an element $b_{21}$ in the second row and the first column of the interference matrix B represents the complex gain of the interference imposed by the modulation symbol addressed to the first wireless reception device 200 on the modulation symbol addressed to the second wireless reception device 200, and this element can be multiplied by the result of the modulo operation on the modulation symbol addressed to the first wireless reception device 200 to calculate the interference component.

A first interference component subtraction unit 609b subtracts, for each sub-carrier, the interference component for the modulation symbol addressed to the second wireless reception device 200, which is calculated by the interference component calculation unit 603, from the modulation symbol addressed to the second wireless reception device 200, which is generated by the modulation unit 321. A second modulo operation unit 607b performs a modulo operation on the modulation symbol addressed to the second wireless reception device 200 from which the interference component has been subtracted, using a predetermined modulo width based on the modulation scheme.

The interference component calculation unit 603 calculates an interference component to be imposed on the modulation symbol of each sub-carrier addressed to the third wireless reception device 200 by the result of the modulo operation on the modulation symbol of each sub-carrier addressed to the first wireless reception device 200 and the result of the modulo operation on the modulation symbol of each sub-carrier addressed to the second wireless reception device 200. Here, an element $b_{31}$ in the third row and the first column of the interference matrix B represents the complex gain of the interference imposed by the modulation symbol addressed to the first wireless reception device 200 on the modulation symbol addressed to the third wireless reception device 200, and an element $b_{32}$ in the third row and the second column of interference matrix B represents the complex gain of the interference imposed by the modulation symbol addressed to the second wireless reception device 200 on the modulation symbol addressed to the third wireless reception device 200. These elements can be multiplied by the result of the modulo operation on the modulation symbol addressed to the first wireless reception device 200 and the result of the modulo operation on the modulation symbol addressed to the second wireless reception device 200 to calculate the interference components.

A second interference component subtraction unit 609c subtracts, for each sub-carrier, the interference component for the modulation symbol addressed to the third wireless reception device 200, which is calculated by the interference component calculation unit 603, from the modulation symbol addressed to the third wireless reception device 200, which is generated by the modulation unit 321. A third modulo operation unit 607c performs a modulo operation on the modulation symbol addressed to the third wireless reception device 200 from which the interference component has been subtracted, using a predetermined modulo width based on the modulation scheme.

The interference component calculation unit 603 calculates an interference component to be imposed on the modulation symbol of each sub-carrier addressed to the fourth wireless reception device 200 by the result of the modulo operation on the modulation symbol of each sub-carrier addressed to the first wireless reception device 200, the result of the modulo operation on the modulation symbol of each sub-carrier addressed to the second wireless reception device 200, and the result of the modulo operation on the modulation symbol of each sub-carrier addressed to the third wireless reception device 200. Here, an element $b_{41}$ in the fourth row and the first column of the interference matrix B represents the complex gain of the interference imposed by the modulation symbol addressed to the first wireless reception device 200 on the modulation symbol addressed to the fourth wireless reception device 200, an element $b_{42}$ in the fourth row and the second column of the interference matrix B represents the complex gain of the interference imposed by the modulation symbol addressed to the second wireless reception device 200 on the modulation symbol addressed to the fourth wireless reception device 200, and an element $b_{43}$ in the fourth row and the third column of the interference matrix B represents the complex gain of the interference imposed by the modulation symbol addressed to the third wireless reception device 200 on the modulation symbol addressed to the fourth wireless reception device 200. These elements can be multiplied by the result of the modulo operation on the modulation symbol addressed to the first wireless reception device 200 to the result of the modulo operation on the modulation symbol addressed to the third wireless reception device 200 to calculate the interference components.

A third interference component subtraction unit 609d subtracts, for each sub-carrier, the interference component for the modulation symbol addressed to the fourth wireless reception device 200, which is calculated by the interference component calculation unit 603, from the modulation symbol addressed to the fourth wireless reception device 200, which is generated by the modulation unit 321. A fourth modulo operation unit 607d performs a modulo operation on the modulation symbol addressed to the fourth wireless reception device 200 from which the interference component has been subtracted, using a predetermined modulo width based on the modulation scheme.

The linear filter unit 605 receives an input of the result of the modulo operation on the modulation symbol addressed to the first wireless reception device 200, which is output from the first modulo operation unit 607a, the result of the modulo operation on the modulation symbol addressed to the second wireless reception device 200, which is output from the second modulo operation unit 607b, the result of the modulo operation on the modulation symbol addressed to the third wireless reception device 200, which is output from the third modulo operation unit 607c, and the result of the modulo operation on the modulation symbol addressed to the fourth wireless reception device 200, which is output from the fourth modulo operation unit 607d, and multiplies, for each sub-carrier, the results by the unitary matrix Q calculated by the QR decomposition unit 601 as a linear filter to output multi-user MIMO symbols (non-linearly precoded symbols) to be transmitted from the respective antennas of the antenna unit 303.

Accordingly, in a case where the multi-user MIMO symbols are received at the respective wireless reception devices 200, each of the wireless reception devices 200 receives only the signal addressed to this wireless reception device while interference (MUI) due to the signals to be transmitted to the wireless reception devices other than this wireless reception device is canceled by THP. In this embodiment, a method for implementing THP has been described in the context of, as an example, but not limited to, a method using QR decomposition of a channel matrix. A method that allows quasi-optimal ordering of the wireless reception devices 200 in THP by using the V-BLAST (Vertical Bell Laboratories Layered Space Time) approach, such as the method described in NPL 5 given above, may be used.

Figure 13A:
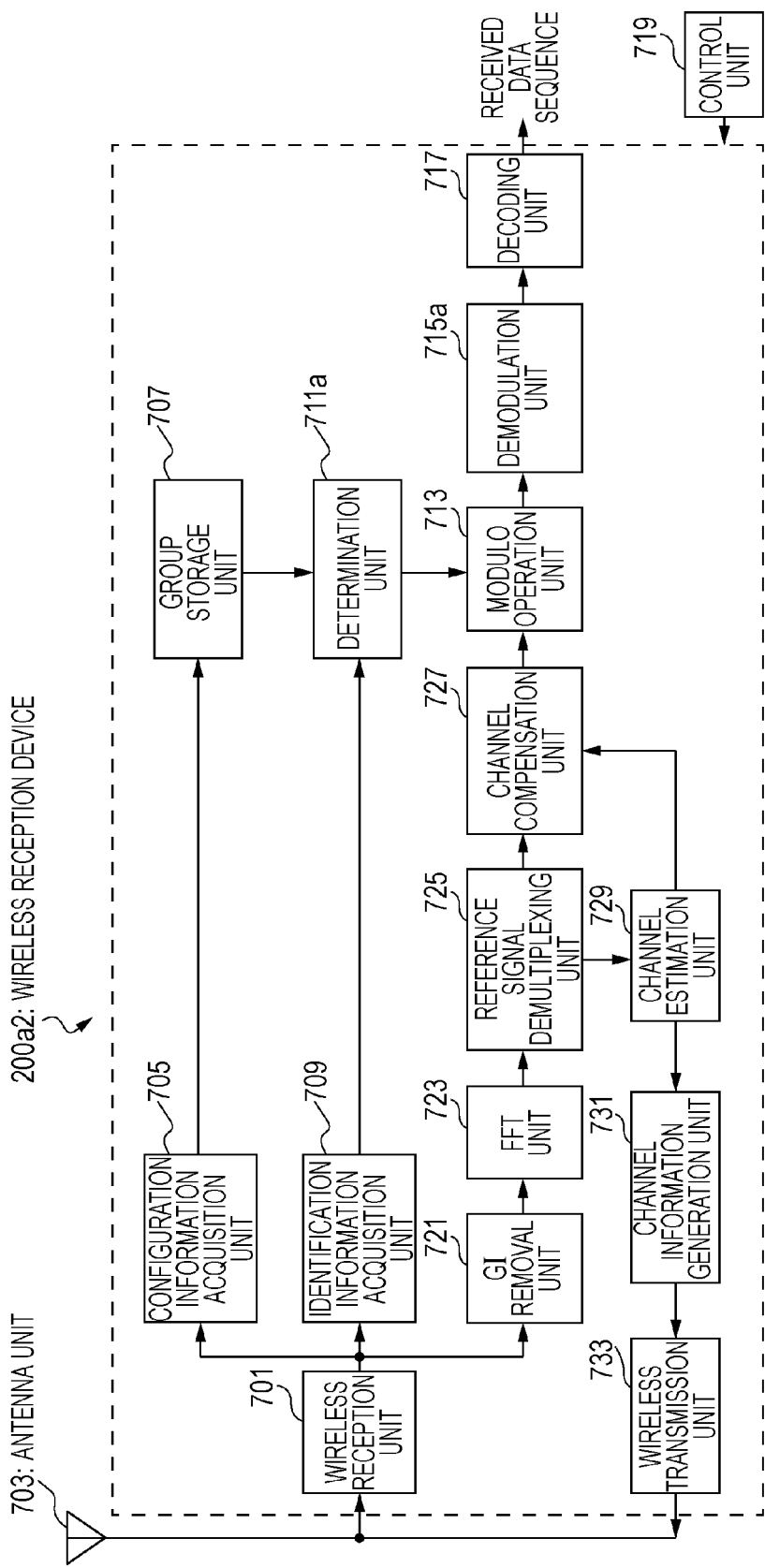
FIG. 13A is a functional block diagram illustrating a wireless reception device 200a2, which is an example configuration of a wireless reception device 200 according to Embodiment 2.1 of the present invention.

FIG. 13A is a functional block diagram illustrating a wireless reception device 200a2, which is an example configuration of the wireless reception devices 200 according to Embodiment 2.1 of the present invention. The wireless reception device 200a2 of FIG. 13A is an example of a non-linear wireless reception device that supports both precoding schemes, namely, linear precoding and non-linear precoding (THP). A wireless reception unit 701 receives a signal from the wireless transmission device 100 via an antenna unit 703. A configuration information acquisition unit 705 acquires group configuration information notified by the wireless transmission device 100, and outputs the group configuration information to a group storage unit 707. The group storage unit 707 stores the group configuration information acquired by the configuration information acquisition unit 705. An identification information acquisition unit 709 acquires group identification information (group ID) notified by the wireless transmission device 100, and outputs the group identification information to a determination unit 711a. If the group identification information includes information of MCS, the MCS information is also output to a modulo operation unit (constituting a reception processing unit together with a demodulation unit described below) 713, a demodulation unit 715a, and a decoding unit 717.

The determination unit 711a refers to the group configuration information stored in the group storage unit 707 to determine whether the associated wireless reception device (local station) belongs to a group identified by the group ID acquired by the identification information acquisition unit 709, and notifies a control unit 719 of the determination result. If the associated wireless reception device belongs to the group, the determination unit 711a causes the execution of the data receiving operation, described below, through the control unit 719. The determination unit 711a further determines whether the group identified by the acquired group ID is a group for which multi-user MIMO based on linear precoding is performed or a group for which multi-user MIMO based on non-linear precoding is performed. If the group is a group for which multi-user MIMO based on linear precoding is performed, the determination unit 711a generates a signal instructing the modulo operation unit 713 not to perform a modulo operation. If the group is a group for which multi-user MIMO based on non-linear precoding is performed, the determination unit 711a generates a signal instructing the modulo operation unit 713 to perform a modulo operation. A GI removal unit 721 removes a guard interval (GI) from the received signal.

An FFT unit 723 performs a time-frequency conversion on the received signal from which the GI has been removed, using a Fast Fourier Transform (FFT) or the like to convert the received signal into modulation symbols of individual sub-carriers. A reference signal demultiplexing unit 725 demultiplexes the modulation symbols into symbols of received data and symbols of a reference signal, and inputs the symbols of the received data to a channel compensation unit 727, and the symbols of the reference signal to a channel estimation unit 729. The channel estimation unit 729 estimates the channel state (complex channel gain) between each antenna at the wireless transmission device 100 and the antenna unit 703 of the wireless reception device 200a2 and the reception quality expressed in SNR or SINR on the basis of the symbols of the reference signal obtained by demultiplexing. The channel compensation unit 727 performs channel compensation (equalization) on the received data symbols on the basis of the estimated channel state obtained by the channel estimation unit 729.

The channel-compensated received data symbols are input to the modulo operation unit 713. In a case where an instruction signal to perform a modulo operation is input to the modulo operation unit 713 from the determination unit 711a, the modulo operation unit 713 performs a modulo operation on the channel-compensated received data symbols using a predetermined width of the modulo operation (modulo width) based on the modulation scheme (the modulation scheme in the MCS if MCS information has been input from the identification information acquisition unit 709). In a case where an instruction signal not to perform a modulo operation is input, the modulo operation unit 713 outputs the channel-compensated received data symbols as they are. The demodulation unit 715a demodulates each of the received data symbols output from the modulo operation unit 713 (on the basis of the modulation scheme in the MCS if MCS information has been input from the identification information acquisition unit 709).

The decoding unit 717 performs error correction decoding processing on the demodulated sequence to generate a received data sequence, and outputs the received data sequence. If MCS information has been input from the identification information acquisition unit 709, the decoding unit 717 performs rate matching (depuncturing) in accordance with the coding rate in the MCS. A channel information generation unit 731 generates a Channel Quality Indicator (CQI) indicating an SNR, an SINR, a CNR, and a CINR, or a value calculated from them, and CSI indicating complex channel gain from each transmit antenna at the wireless transmission device 100 to each receive antenna at each wireless reception device 200 or the covariance value or the like of the complex channel gain on the basis of the estimated channel state. A wireless transmission unit 733 transmits the channel information generated by the channel information generation unit 731 to the wireless transmission device 100 via the antenna unit 703. The control unit 719 controls each of the units described above to execute the respective processing operations.

In this embodiment, the description has focused on an example of the configuration of the wireless reception device in which if the determination unit 711*a* determines that the wireless reception device is in a group for which multi-user MIMO based on non-linear precoding is performed, the modulo operation unit 713 performs a modulo operation on the channel-compensated received data symbols prior to demodulation at the demodulation unit 715*a* (determination of received constellation points). Another example configuration of the wireless reception device is illustrated in FIG. 13B.

Figure 13B:
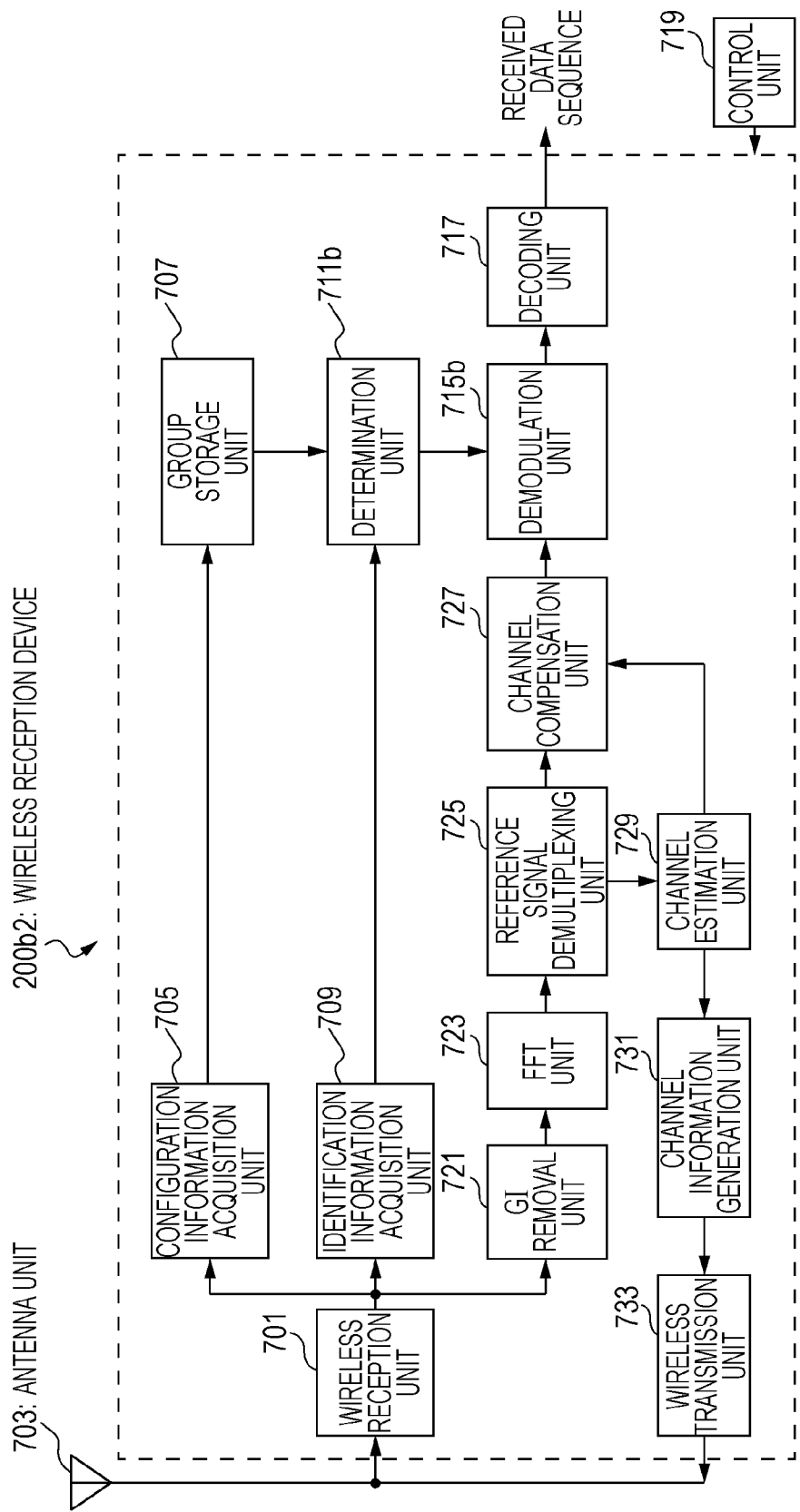
FIG. 13B is a functional block diagram illustrating a wireless reception device 200b2, which is another example configuration of the wireless reception device 200 according to Embodiment 2.1 of the present invention.

Unlike the wireless reception device 200*a*2 of FIG. 13A, the wireless reception device 200*b*2 of FIG. 13B does not include the modulo operation unit 713. If the determination unit 711*b* determines that the wireless reception device 200*b*2 is in a group for which multi-user MIMO based on non-linear precoding is performed, the demodulation unit 715*b* takes into account that the arrangement of candidate constellation points of a received signal takes a form in which constellation points obtained when the wireless transmission device performs modulation are repeatedly arranged with the modulo width due to the effect of the modulo operation performed by the wireless transmission device, and calculates the Log Likelihood Ratio (LLR) of a demodulated bit from the Euclidean distance between a (noisy) received constellation point and each of the candidate constellation points that are repeated with the modulo width (soft-decision demodulation processing). The demodulation unit 715*b* inputs the calculated LLR to the decoding unit 717 to perform error correction decoding. Here, the demodulation unit 715*b* may calculate an LLR by using, for example, a well-known method given by Expressions (15) to (20) described in NPL 6. That is, this calculation may be made using an algorithm for calculating an LLR using the Euclidean distance between a received constellation point and a candidate constellation point close to the received constellation point among candidate constellation points that are repeated with the modulo width. This configuration can also be applied to the wireless reception devices of the following embodiments in a similar manner.

Figure 13C:
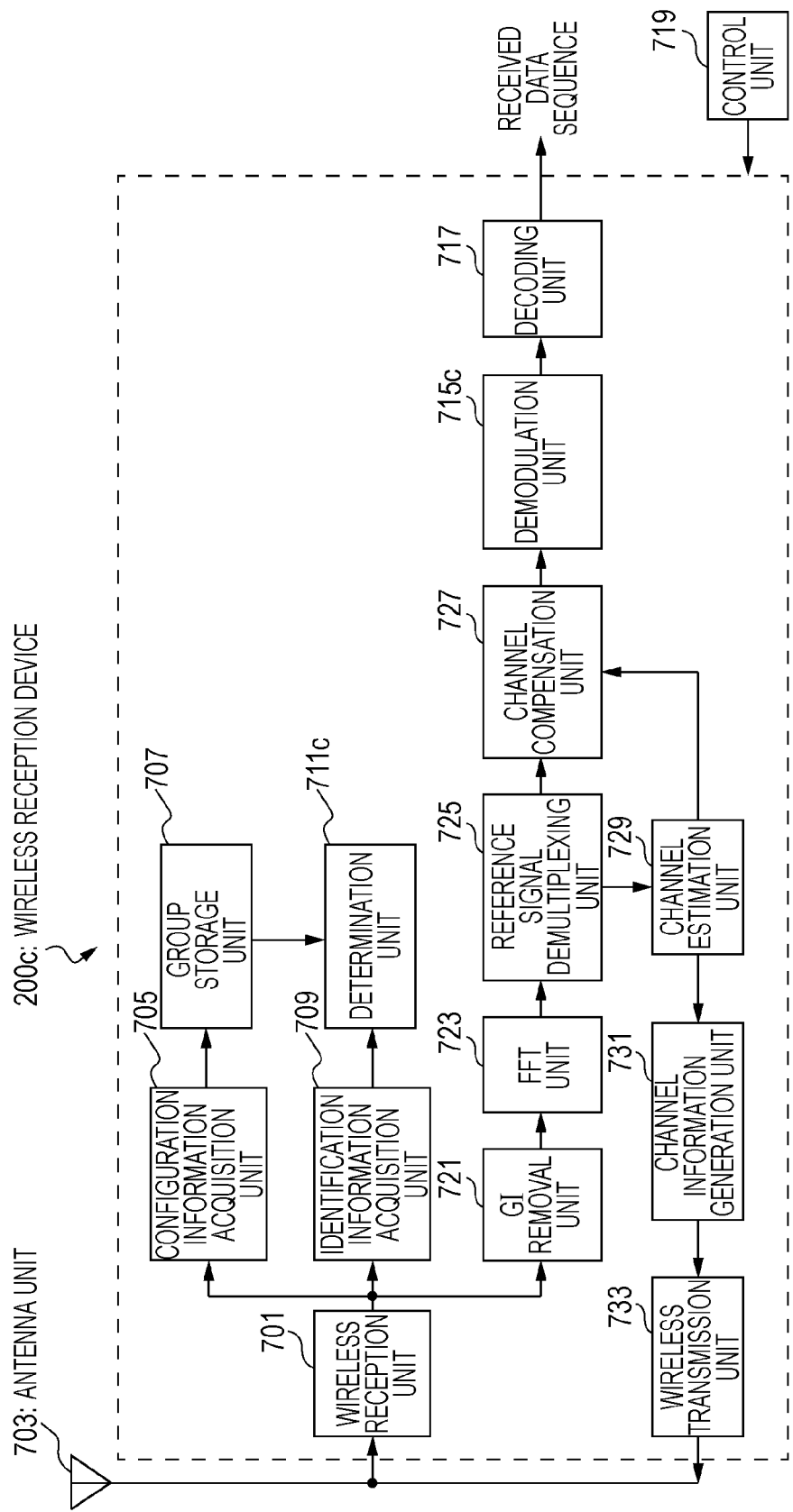
FIG. 13C is a functional block diagram illustrating a wireless reception device 200c, which is another example configuration of the wireless reception device 200 according to Embodiment 2.1 of the present invention.

FIG. 13C is a functional block diagram illustrating a wireless reception device 200*c*, which is another example configuration of the wireless reception devices 200 according to Embodiment 2.1 of the present invention. The wireless reception device 200*c* of FIG. 13C is an example of a linear wireless reception device that supports only linear precoding. The wireless reception device 200*c* of FIG. 13C is different from the wireless reception device 200*a*2 of FIG. 13A in that it does not include the modulo operation unit 713. A determination unit 711*c* refers to the group configuration information stored in the group storage unit 707 to determine whether the associated wireless reception device (local station) belongs to a group identified by the group ID acquired by the identification information acquisition unit 709, and notifies the control unit 719 of the determination result. If the associated wireless reception device belongs to the group, the determination unit 711*c* causes the execution of the data receiving operation through the control unit 719. The wireless reception device 200*c* does not support non-linear precoding, and thus does not determine whether or not to perform a modulo operation. Even if there is a linear wireless reception device (for example, compatible with old specifications) that does not know that the wireless transmission device 100 at the communication partner is a wireless transmission device supporting multi-user MIMO which uses non-linear precoding, the wireless transmission device 100 constructs groups such that this linear wireless reception device belongs to only a group for which linear precoding is used. This allows such a linear wireless reception device to receive a multi-user MIMO signal based on linear precoding merely by determining whether the associated wireless reception device (local station) belongs to a group identified by the group ID acquired by the identification information acquisition unit 709 without performing any additional special processing. Other operation is similar to that of the wireless reception device 200*a*2.

FIG. 14 is a diagram illustrating an example of group information created by the group construction unit 307 of the wireless transmission device 100 and shared with the wireless reception devices 200*a*2 or 200*b*2 and 200*c* in Embodiment 2.1 of the present invention. In the illustration of FIG. 14, by way of example, group IDs are 6 bits (0 to 63), and the group IDs up to 31 are defined to be assigned to a first group for which linear precoding is performed and group ID 32 and subsequent group IDs are defined to be assigned to a second group for which non-linear precoding is used. In the illustrated example, group IDs 0 and 63 are unoccupied for groups for multi-user MIMO since these group IDs will be used as numbers indicating special uses (such as those to be used for single user MIMO or before definition of groups). A first group having group IDs 1 to 31 for which linear precoding is used as a precoding scheme and a second group having group IDs 32 to 62 for which non-linear precoding is used are defined for the wireless reception devices 200-1 to 200-8. The wireless reception devices 200-1, 200-2, 200-4, and 200-7 (the wireless reception devices 200 underlined in FIG. 14), which are linear wireless reception devices supporting only linear precoding, can belong to only the first group, and the wireless reception devices 200-3, 200-5, 200-6, and 200-8, which are non-linear wireless reception devices supporting both linear precoding and non-linear precoding, can belong to both the first and second groups.

FIG. 8A and FIG. 8B illustrate an example of a sequence chart illustrating the operation between the wireless transmission device 100 and each of the wireless reception devices 200 according to Embodiment 2.1 of the present invention. In FIG. 8A and FIG. 8B, the wireless reception devices 200-1, 200-2, and 200-8 are illustrated as representatives of the wireless reception devices 200. In the following description, furthermore, group identification information is included in control information added to a sounding signal and a multi-user MIMO signal. First, each of the wireless reception devices 200 transmits information on a precoding scheme supported by each of the wireless reception devices 200 (compatibility information) or compatibility information based on category information by which the supporting precoding scheme can be determined (terminal class, compatibility standard information, reception function information indicating the presence or absence of the modulo operation function, etc.) to the wireless transmission device 100 (step S101). Each of the wireless reception devices 200 may transmit compatibility information at individual timing, for example, when it first establishes communication with the wireless transmission device 100 or when it receives a request from the wireless transmission device 100.

The wireless transmission device 100 creates groups by separating the wireless reception devices 200 into a plurality of groups for which precoding schemes to be used for multi-user MIMO transmission are determined on the basis of the compatibility information or the like notified by the wireless reception devices 200 (step S103), and notifies each of the wireless reception devices 200 of information on the corresponding group (group configuration information) (step S105). Then, the wireless transmission device 100 selects a group for which multi-user MIMO transmission is performed (step S107), generates a sounding signal with control information including a group ID identifying the selected group (step S109), and transmits the control information (step S111). The sounding signal is transmitted (step S111) once to all the wireless reception devices in the group.

Each of the wireless reception devices 200 receives the sounding signal described above, and checks the group ID included in the control information to determine whether this wireless reception device belongs to the group (step S113). If this wireless reception device belongs to the group, the wireless reception device 200 estimates the channel state between the wireless reception device 200 and the wireless transmission device 100 on the basis of the reception state of the reference signal included in the sounding signal, generates channel information indicating the estimated channel state (step S115), and notifies the wireless transmission device 100 of the channel information (step S117). In the illustration of the example in FIG. 8A and FIG. 8B, the wireless reception devices 200-2 and 200-8 belong to the group. The notification of channel information is made sequentially in the predetermined order of the wireless reception devices 200 in the group.

The wireless transmission device 100 receives channel information from each of the wireless reception devices 200 belonging to the selected group, and precodes transmit data sequences addressed to the wireless reception devices 200 using a precoding scheme determined for the group ID of the selected group on the basis of the received channel information to generate multi-user MIMO symbols (step S119). Then, the wireless transmission device 100 transmits a multi-user MIMO signal to which control information including the group ID identifying the selected group is added (step S121). The multi-user MIMO signal is transmitted (step S121) once to all the wireless reception devices in the group. The transmission of a multi-user MIMO signal may be recognized as being included in the sequence from transmission of a sounding signal to the transmission of a multi-user MIMO signal, and no group ID may be added to the multi-user MIMO signal.

Each of the wireless reception devices 200 receives the multi-user MIMO signal described above, and checks the group ID included in the control information to determine whether this wireless reception device belongs to the group (step S123). If this wireless reception device belongs to the group, the wireless reception device 200 receives the multi-user MIMO symbols, and performs data receiving processing such as demodulation and error correction decoding (step S125). The wireless reception device 200 notifies the wireless transmission device 100 of an Acknowledgement (ACK) if no error is detected in the received data, and notifies the wireless transmission device 100 of a Negative Acknowledgment (NAK or NACK) if an error is detected (step S127). The notification of an ACK and an NAK is made sequentially in the predetermined order of the wireless reception devices 200 in the group.

As described above, according to this embodiment, in a wireless communication system configured such that the wireless transmission device 100 selects and uses one of linear precoding and non-linear precoding every time multi-user MIMO transmission is performed, it is possible to determine whether a multi-user MIMO signal transmitted from the wireless transmission device 100 has undergone linear precoding or non-linear precoding, by using a group ID, and it is possible to notify the wireless reception devices 200 of the determined precoding scheme without increasing the amount of control information.

In addition, also if there is a wireless reception device 200 (for example, a linear wireless reception device compatible with old specifications) that does not know that the wireless transmission device 100 at the communication partner is a wireless transmission device supporting multi-user MIMO which uses non-linear precoding, such a wireless reception device 200 can receive a multi-user MIMO signal based on linear precoding from the wireless transmission device 100 merely by determining whether this wireless reception device (local station) belongs to a group identified by the group ID without performing any additional special processing.

(Embodiment 2.2)

A communication technique according to this embodiment will be described using as an example, similarly to Embodiment 2.1, a communication system in, which a wireless transmission device 100 selects a plurality of wireless reception devices 200 from among multiple wireless reception devices 200 to perform multi-user MIMO transmission, and suppresses MUI, which is caused between streams addressed to the wireless reception devices 200, using linear precoding or non-linear precoding in advance before performing transmission. In this embodiment, the description will focus on, by way of example, a wireless communication system using hybrid linear and non-linear precoding that allows mixing of linear precoding and non-linear precoding, one of which is selected for each of a plurality of wireless reception devices 200 to which data is simultaneously transmitted via multi-user MIMO transmission.

In the wireless communication system according to this embodiment, similarly to Embodiment 2.1, when the wireless transmission device 100 is to communicate with a plurality of wireless reception devices 200 (for example, the wireless reception devices 200-1 to 200-8), the wireless transmission device 100 creates a plurality of groups based on a plurality of combinations of wireless reception devices 200, and assigns group identification numbers (group IDs) each identifying one of the groups. Note that one wireless reception device 200 may belong to a plurality of groups. The wireless transmission device 100 notifies each of the wireless reception devices 200 of information on the grouping described above (information indicating a group to which each of the wireless reception devices 200 belongs) and information specifying the processing order of wireless reception devices in each group, prior to communication.

This embodiment is the same as Embodiment 2.1 in that a first group for which linear precoding is used as a precoding scheme to be used for multi-user MIMO transmission and a second group for which non-linear precoding is used are determined in advance for each group ID by the system. In this embodiment, however, a linear wireless reception device supporting only linear precoding is allowed to belong to the second group. In a case where multi-user MIMO transmission is performed for the second group, if a linear wireless reception device belongs to the second group, no modulo operation is performed on transmit data addressed to this linear wireless reception device. This enables multi-user MIMO transmission of transmit data that has undergone non-linear precoding for a non-linear wireless reception device and that has equivalently undergone linear precoding (precoding that does not involve a modulo operation at the time of reception) for a linear wireless reception device.

Then, similarly to Embodiment 2.1, the wireless transmission device 100 selects one of the plurality of groups created in the way described above, which are candidate combinations of wireless reception devices 200 (target wireless reception devices) for which multi-user MIMO transmission is to be performed, and performs multi-user MIMO transmission to simultaneously communicate transmit data addressed to a plurality of wireless reception devices 200 belonging to the selected group through spatial multiplexing in the same frequency band. In this case, the wireless transmission device 100 notifies each of the wireless reception devices 200 of the group for which the multi-user MIMO transmission is to be performed, by using a group ID identifying the selected group. Based on the notification of the group ID, also, the wireless reception devices 200 can identify the precoding scheme that the wireless transmission device 100 has used.

The configuration of the wireless transmission device 100 according to this embodiment is similar to that of the wireless transmission device 100 of Embodiment 2.1 illustrated in FIG. 2, and is different in terms of the configuration of the precoding unit 323. In addition, the processing performed in the selection unit 315 and the group construction unit 307 differs. A description of the same portions as those in Embodiment 2.1 will be omitted, and different portions will be described hereinafter.

The group construction unit 307 according to this embodiment creates a plurality of groups using a plurality of combinations of wireless reception devices 200 on the basis of at least the supporting precoding scheme information of each of the wireless reception devices 200, which is output from the control information acquisition unit 305, determines a precoding scheme to be used for each group, and assigns a group ID corresponding to the determined precoding scheme. For example, in the example of 6-bit group IDs described above, group IDs up to 31 are assigned to a first group for which linear precoding is used, and group ID 32 and subsequent group IDs are assigned to a second group for which non-linear precoding is used. In this case, the group construction unit 307 also determines the order of the wireless reception devices 200 in each group (the order of notification of channel information, ACK/NAK responses, and the like in multi-user MIMO transmission processing, the order of individual pieces of information addressed to the wireless reception devices 200 in a control signal, the order of spatial streams, etc.).

Note that one wireless reception device 200 may belong to a plurality of groups. In addition, a linear wireless reception device supporting only linear precoding may belong to the second group. Furthermore, the group construction unit 307 may also perform grouping using position information of each of the wireless reception devices 200 or information such as a result of estimating the angle of arrival of a radio wave from each of the wireless reception devices 200. In this case, for example, wireless reception devices 200 located away from each other or wireless reception devices 200 having largely different radio-wave arrival angles may be combined into a group in order to reduce channel correlation. There may also be a plurality of groups in which a precoding scheme or the order of wireless reception devices 200 is different for the same combination of wireless reception devices 200. In this manner, in a case where a plurality of groups in which a precoding scheme or the order of wireless reception devices 200 is different for the same combination of wireless reception devices 200 are created, a group defined by a more efficient precoding scheme or order can be selected from among the plurality of groups in accordance with the state of the respective channels and the like for the wireless reception devices 200 in the combination.

The selection unit 315 selects a group to which a plurality of wireless reception devices 200 for which multiplexing with multi-user MIMO processing is performed belong from among the plurality of groups stored in the group storage unit 309 on the basis of the channel information on each of the wireless reception devices 200, which is acquired by the channel information acquisition unit 313, and the amount of transmit data addressed to each of the wireless reception devices 200, a priority, and the like, which are accumulated in the transmission buffer unit 317. Furthermore, the selection unit 315 outputs, for each of the wireless reception devices 200, a precoding scheme selection signal indicating a precoding scheme determined in advance in association with the group ID of the selected group. The precoding scheme selection signal for each of the wireless reception devices 200 is output in such a manner that a signal for selecting linear precoding for all the wireless reception devices 200 is output if the selected group is the first group, and a signal for selecting non-linear precoding for basically all the wireless reception devices 200 is output if the selected group is the second group. However, even if the selected group is the second group, a signal for selecting linear precoding for a linear wireless reception device is output as a precoding scheme selection signal if the linear wireless reception device belongs to the second group. In addition, the selection unit 315 may also select parameters, such as the Modulation and Coding Scheme (MCS) of transmit data addressed to each of the wireless reception devices 200, on the basis of the CQI or the like from each of the wireless reception devices 200, which are acquired by the channel information acquisition unit 313. In this embodiment, the description will focus on the following case: The second group to which four terminals, namely, the first to fourth wireless reception devices 200 among the wireless reception devices 200-1 to 200-8, belong is selected, the selected group includes linear wireless reception devices serving as the first and second wireless reception devices 200, and non-linear wireless reception devices serving as the third and fourth wireless reception devices 200, and one sequence (one stream) is transmitted to each of the wireless reception devices 200.

The precoding unit 323 receives an input of modulation symbols addressed to a plurality of wireless reception devices 200 belonging to the group selected by the selection unit 315 (here, the description will be given of the case where, by way of example, the first to fourth wireless reception devices 200 belong to the selected group), and precodes each of the input modulation symbols on the basis of the CSI from each of the wireless reception devices 200, which is acquired by the channel information acquisition unit 313, so as to precode the respective modulation symbols addressed to the wireless reception devices 200 using a precoding scheme determined in association with the group ID of the group selected by the selection unit 315 to generate multi-user MIMO symbols for each of the plurality of antennas of the antenna unit 303 to be used for transmission. However, in a case where the group selected by the selection unit 315 is the second group and a linear wireless reception device belongs to this group, no modulo operation is performed on transmit data addressed to this linear wireless reception device. The details will be described below.

FIG. 9 is a functional block diagram illustrating a precoding unit 323*b*, which is an example configuration of the precoding unit 323 according to Embodiment 2.2 of the present invention. The precoding unit 323*b* includes a linear precoding unit 401, a non-linear precoding unit 403, a hybrid precoding unit 801, and a switching unit 803. The linear precoding unit 401 and the non-linear preceding unit 403 are similar to those in Embodiment 2.1, and are illustrated in FIG. 4 and FIG. 5, respectively. The operation of the hybrid precoding unit 801 will be described below.

The switching unit 803 receives an input of the results of linear precoding, which are output from the linear precoding unit 401, the results of non-linear precoding, which are output from the non-linear precoding unit 403, and the results of hybrid linear and non-linear precoding, which are output from the hybrid precoding unit 801. If the precoding scheme selection signal for each of the wireless reception devices 200, which is input from the selection unit 315, is a signal for selecting linear precoding for all the wireless reception devices 200, the switching unit 803 selects the results of linear precoding, which are output from the linear preceding unit 401. If the precoding scheme selection signal is a signal for selecting non-linear precoding for all the wireless reception devices 200, the switching unit 803 selects the results of non-linear preceding, which are output from the non-linear preceding unit 403. If the preceding scheme selection signal is a mixture of a signal for selecting linear precoding and a signal for selecting non-linear precoding, the switching unit 803 selects the results of hybrid linear and non-linear precoding, which are output from the hybrid preceding unit 801. Accordingly, the switching unit 803 outputs first to fourth multi-user MIMO symbols to be transmitted from the respective antennas of the antenna unit 303. Preferably, each of the linear precoding unit 401, the non-linear precoding unit 403, and the hybrid precoding unit 801 does not perform a processing operation if the precoding scheme selection signal does not specify the selection of the corresponding precoding scheme. This can reduce power consumption.

FIG. 10 is a functional block diagram illustrating an example configuration of the hybrid precoding unit 801 according to Embodiment 2.2 of the present invention. Referring to the example in FIG. 10, a description will be given to the case where multi-user MIMO signals are generated using linear precoding and Tomlinson-Harashima precoding (THP) serving as non-linear preceding in a mixed manner, one of which is selected for each of the wireless reception devices 200 on the basis of a precoding scheme selection signal for each of the wireless reception devices 200, which is input from the selection unit 315. The hybrid precoding unit 801 of FIG. 10 performs basically the same operation as that of the non-linear precoding unit 403 illustrated in FIG. 5. The hybrid precoding unit 801 receives an input of a precoding scheme selection signal from the selection unit 315, and switches whether to perform a modulo operation using first to fourth modulo operation units 901a to 901d corresponding to the first to fourth wireless reception devices 200 (hereinafter, the first to fourth modulo operation units 901a to 901d will also be collectively referred to as "modulo operation units 901") in accordance with the preceding scheme selection signal. Specifically, a modulo operation unit 901 corresponding to a wireless reception device 200 for which the precoding scheme selection signal indicates linear precoding does not perform a modulo operation, and a modulo operation unit 901 corresponding to a wireless reception devices 200 for which the precoding scheme selection signal indicates non-linear precoding performs a modulo operation. In the example of this embodiment, each of the first modulo operation unit 901a and the second modulo operation unit 901b corresponding to the first and second wireless reception devices 200, respectively, does not perform a modulo operation and allows a signal to pass therethrough, while each of the third modulo operation unit 901c and the fourth modulo operation unit 901d corresponding to the third and fourth wireless reception devices 200, respectively, performs a modulo operation on a signal from which the interference component has been subtracted.

In this embodiment, the description will focus on the configuration of the precoding unit 323b which includes three precoding units, namely, the linear precoding unit 401, the non-linear preceding unit 403, and the hybrid precoding unit 801. Alternatively, the precoding unit 323b may include only the hybrid precoding unit 801, as illustrated in FIG. 10. In this case, if the precoding scheme selection signal from the selection unit 315 specifies the selection of linear precoding for all the wireless reception devices 200 (the modulo operation units 901 do not perform a modulo operation), multi-user MIMO symbols equivalent to those of linear precoding are obtained. If the precoding scheme selection signal specifies the selection of non-linear precoding for all the wireless reception devices 200 (the modulo operation units 901 perform a modulo operation), multi-user MIMO symbols equivalent to those of non-linear precoding are obtained.

The configuration of each of the wireless reception devices 200 according to this embodiment is similar to that of the wireless reception device 200a2 (non-linear wireless reception device) of FIG. 13A, the wireless reception device 200b2 (non-linear wireless reception device) of FIG. 13B, or the wireless reception device 200c (linear wireless reception device) of FIG. 13C according to Embodiment 2.1, and is different in terms of the processing of the determination units 711a to 711c. A description of the same portions as those in Embodiment 2.1 will be omitted, and different portions will be described hereinafter. The determination unit 711a in the non-linear wireless reception device 200a2 refers to the group configuration information stored in the group storage unit 707 to determine whether the associated wireless reception device (local station) belongs to a group identified by the group ID acquired by the identification information acquisition unit 709, and notifies the control unit 719 of the determination result. If the associated wireless reception device belongs to the group, the determination unit 711a causes the execution of the data receiving operation through the control unit 719. The determination unit 711a further determines whether the group identified by the acquired group ID is a group for which multi-user MIMO based on linear precoding is performed or a group for which multi-user MIMO based on non-linear precoding is performed. If the group is a group for which multi-user MIMO based on linear precoding is performed, the determination unit 711a generates a signal instructing the modulo operation unit 713 not to perform a modulo operation. If the group is a group for which multi-user MIMO based on non-linear precoding is performed, the determination unit 711a generates a signal instructing the modulo operation unit 713 to perform a modulo operation.

The determination unit 711b in the non-linear wireless reception device 200b2 refers to the group configuration information stored in the group storage unit 707 to determine whether the associated wireless reception device (local station) belongs to a group identified by the group ID acquired by the identification information acquisition unit 709, and notifies the control unit 719 of the determination result. If the associated wireless reception device belongs to the group, the determination unit 711b causes the execution of the data receiving operation through the control unit 719. The determination unit 711b further determines whether the group identified by the acquired group ID is a group for which multi-user MIMO based on linear precoding is performed or a group for which multi-user MIMO based on non-linear precoding is performed. If the group is a group for which multi-user MIMO based on linear precoding is performed, the determination unit 711b generates a signal instructing the demodulation unit 715b to perform demodulation processing that does not take into account a modulo operation. If the group is a group for which multi-user MIMO based on non-linear precoding is performed, the determination unit 711b generates a signal instructing the demodulation unit 715b to perform demodulation processing that takes into account a modulo operation performed in the wireless transmission device 100.

The determination unit 711c in the linear wireless reception device 200c refers to the group configuration information stored in the group storage unit 707 to determine whether the associated wireless reception device (local station) belongs to a group identified by the group ID acquired by the identification information acquisition unit 709, and notifies the control unit 719 of the determination result. If the associated wireless reception device belongs to the group, the determination unit 711c causes the execution of the data receiving operation, described below, through the control unit 719. The wireless reception device 200c does not support non-linear precoding, and thus does not determine whether or not to perform a modulo operation. Even if there is a linear wireless reception device (for example, compatible with old specifications) that does not know that the wireless transmission device 100 at the communication partner is a wireless transmission device supporting multi-user MIMO which uses non-linear precoding, the wireless transmission device 100 generates a multi-user MIMO signal using precoding (equivalent to linear precoding) which does not involve modulo operation for this linear wireless reception device regardless of the group to which the linear wireless reception device belongs. This allows such a linear wireless reception device to receive a multi-user MIMO signal merely by determining whether the associated wireless reception device (local station) belongs to a group identified by the group ID acquired by the identification information acquisition unit 709 without performing any additional special processing.

FIG. 15 is a diagram illustrating an example of group information created by the group construction unit 307 of the wireless transmission device 100 and shared with the wireless reception devices 200a2 or 200b2 and 200c in Embodiment 2.2 of the present invention. In the illustration of FIG. 15, by way of example, group IDs are 6 bits (0 to 63), and the group IDs up to 31 are defined to be assigned to a first group for which linear precoding is used and group ID 32 and subsequent group IDs are defined to be assigned to a second group for which non-linear precoding is used. In the illustrated example, group IDs 0 and 63 are unoccupied for groups for multi-user MIMO since these group IDs will be used as numbers indicating special uses (such as those to be used for single user MIMO or before definition of groups). A first group having group IDs 1 to 31 for which linear precoding is used as a precoding scheme and a second group having group IDs 32 to 62 for which non-linear precoding is used are defined for the wireless reception devices 200-1 to 200-8.

Unlike Embodiment 2.1 (FIG. 14), the wireless reception devices 200-1, 200-2, 200-4, and 200-7 (the wireless reception devices 200 underlined in FIG. 14)), which are linear wireless reception devices supporting only linear precoding, can also belong to the second group for which non-linear precoding is used. For example, for the group with group ID 33, the wireless transmission device 100 does not perform a modulo operation on the transmit data addressed to the wireless reception devices 200-1 and 200-7, and the wireless transmission device 100 performs a modulo operation on the transmit data addressed to the wireless reception devices 200-3 and 200-6. These pieces of transmit data are simultaneously spatially multiplexed to perform multi-user MIMO transmission.

The wireless transmission device 100 selects a plurality of wireless reception devices 200 for which multi-user MIMO transmission is to be performed, on the basis of the channel information or the like informed by the wireless reception devices 200, and selects one group by extracting a group including the selected plurality of wireless reception devices 200. Alternatively, the wireless transmission device 100 may first select a group (and a precoding scheme accordingly) on the basis of the channel information or the like informed by the wireless reception devices 200, and then select the wireless reception devices 200 belonging to the selected group as the target of multi-user MIMO transmission.

As described above, according to this embodiment, in a wireless communication system configured such that the wireless transmission device 100 selects and uses one of linear precoding, non-linear precoding, and hybrid linear and non-linear precoding every time multi-user MIMO transmission is performed, it is possible to determine whether a multi-user MIMO signal transmitted from the wireless transmission device 100 has undergone linear precoding or non-linear precoding, by using a group ID, and it is possible to notify the wireless reception devices 200 of the determined precoding scheme without increasing the amount of control information. In addition, also if there is a linear wireless reception device (for example, compatible with old specifications) that does not know that the wireless transmission device 100 at the communication partner is a wireless transmission device supporting multi-user MIMO which uses non-linear precoding, this linear wireless reception device can receive a multi-user MIMO signal from the wireless transmission device 100 merely by determining whether the associated wireless reception device (local station) belongs to a group identified by the group ID without performing any additional special processing. In this case, transmit data addressed to other non-linear wireless reception devices which support non-linear precoding, which has undergone non-linear precoding, can also be simultaneously spatially multiplexed.

(Embodiment 2.3)

A communication technique according to this embodiment will be described using as an example, similarly to Embodiment 2.2, a communication system in which a wireless transmission device 100 selects a plurality of wireless reception devices 200 from among multiple wireless reception devices 200 to perform multi-user MIMO transmission, and suppresses MUI, which is caused between streams addressed to the wireless reception devices 200, using linear precoding or non-linear precoding in advance before performing transmission. Similarly to Embodiment 2.2, the description will focus on, by way of example, a wireless communication system using hybrid linear and non-linear precoding that allows mixing of linear precoding and non-linear precoding, one of which is selected for each of a plurality of wireless reception devices 200 to which data is simultaneously transmitted via multi-user MIMO transmission.

In the wireless communication system according to this embodiment, similarly to Embodiment 2.2, when the wireless transmission device 100 is to communicate with a plurality of wireless reception devices 200 (for example, the wireless reception devices 200-1 to 200-8), the wireless transmission device 100 creates a plurality of groups based on a plurality of combinations of wireless reception devices 200, and assigns group identification numbers (group IDs) each identifying one of the groups. Note that one wireless reception device 200 may belong to a plurality of groups. The wireless transmission device 100 notifies each of the wireless reception devices 200 of information on the grouping described above (information indicating a group to which each of the wireless reception devices 200 belongs) and information specifying the processing order of wireless reception devices in each group, prior to communication.

In this embodiment, a first group for which linear precoding is used as a precoding scheme to be used for multi-user MIMO transmission, a second group for which non-linear precoding is used, and a third group for which linear precoding and non-linear precoding are (explicitly) mixed are determined in advance for each group ID by the system. A linear wireless reception device supporting only linear precoding is allowed to belong to the second group. The processing for the first and second groups is the same as that in Embodiment 2.2. In a case where multi-user MIMO transmission is performed for the third group, non-linear precoding is performed such that no modulo operation is performed on transmit data addressed to the wireless reception devices 200 up to the wireless reception device 200 with an ordinal number of N in the processing order in the group (N is greater than or equal to 1 and less than the number of wireless reception devices belonging to the group: N is hereinafter referred to as a preceding threshold value) among the wireless reception devices 200 belonging to the third group (equivalent linear preceding that does not involve a modulo operation at the time of reception) and a modulo operation is performed on transmit data addressed to the wireless reception devices 200 with ordinal numbers greater than or equal to N+1. However, if the ordinal number of a linear wireless reception device is greater than or equal to N+1, no modulo operation is performed on transmit data addressed to this linear wireless reception device.

Accordingly, linear precoding can be performed on transmit data addressed to a wireless reception device 200 that is early in the processing order in a group such that the effect of transmission power suppression caused by the modulo operation because of low MUI is low when non-linear precoding such as THP is performed, and non-linear preceding can be performed on transmit data addressed to a wireless reception device 200 that is late in the processing order such that the effect of transmission power suppression caused by the modulo operation because of high MUI is high when non-linear precoding such as THP is performed. These pieces of transmit data can be simultaneously spatially multiplexed to perform multi-user MIMO transmission. The value N may be determined in advance by the system, or may be specified in advance by the system, such as a half the number of wireless reception devices 200 belonging to the group (half is rounded up or down to the closest whole number if the number of wireless reception devices is odd).

Then, similarly to Embodiment 2.2, the wireless transmission device 100 selects one of the plurality of groups created in the way described above, which are candidate combinations of wireless reception devices 200 (target wireless reception devices) for which multi-user MIMO transmission is to be performed, and performs multi-user MIMO transmission to simultaneously communicate transmit data addressed to a plurality of wireless reception devices 200 belonging to the selected group through spatial multiplexing in the same frequency band. In this case, the wireless transmission device 100 notifies each of the wireless reception devices 200 of the group for which the multi-user MIMO transmission is to be performed, by using a group ID identifying the selected group. Based on the notification of the group ID, also, the wireless reception devices 200 can identify the precoding scheme that the wireless transmission device 100 has used.

The configuration of the wireless transmission device 100 according to this embodiment is similar to that of the wireless transmission device 100 of Embodiment 2.2, and similar in the precoding unit 323b. The processing performed in the selection unit 315 and the group construction unit 307 differs.

A description of the same portions as those in Embodiment 2.2 will be omitted, and different portions will be described hereinafter.

The group construction unit 307 according to this embodiment creates a plurality of groups using a plurality of combinations of wireless reception devices 200 on the basis of at least the supporting precoding scheme information of each of the wireless reception devices 200, which is output from the control information acquisition unit 305, determines a precoding scheme to be used for each group, and assigns a group ID corresponding to the determined preceding scheme. For example, in the example of 6-bit group IDs described above, group IDs up to 20 are assigned to a first group for which linear precoding is used, group IDs 21 to 40 are assigned to a second group for which non-linear precoding is used, and group ID 41 and subsequent group IDs are assigned to a third group. In this case, the group construction unit 307 also determines the order of the wireless reception devices 200 in each group (the order of notification of channel information, ACK/NAK responses, and the like in multi-user MIMO transmission processing, the order of individual pieces of information addressed to the wireless reception devices 200 in a control signal, the order of spatial streams, etc.). Note that one wireless reception device 200 may belong to a plurality of groups. In addition, a linear wireless reception device supporting only linear precoding may belong to the second group. Furthermore, the group construction unit 307 may also perform grouping using position information of each of the wireless reception devices 200 or information such as a result of estimating the angle of arrival of a radio wave from each of the wireless reception devices 200. In this case, for example, wireless reception devices 200 located away from each other or wireless reception devices 200 having largely different radio-wave arrival angles may be combined into a group in order to reduce channel correlation. There may also be a plurality of groups in which each of the wireless reception devices 200 has a different precoding scheme or the order of wireless reception devices 200 is different for the same combination of wireless reception devices 200. In this manner, in a case where a plurality of groups in which a precoding scheme or the order of wireless reception devices 200 is different for the same combination of wireless reception devices 200 are created, a group defined by a more efficient precoding scheme or order can be selected from among the plurality of groups in accordance with the state of the respective channels and the like for the wireless reception devices 200 in the combination.

The selection unit 315 selects a group to which a plurality of wireless reception devices 200 for which multiplexing with multi-user MIMO processing is performed belong from among the plurality of groups stored in the group storage unit 309 on the basis of the channel information on each of the wireless reception devices 200, which is acquired by the channel information acquisition unit 313, and the amount of transmit data addressed to each of the wireless reception devices 200, a priority, and the like, which are accumulated in the transmission buffer unit 317. Furthermore, the selection unit 315 outputs, for each of the wireless reception devices 200, a precoding scheme selection signal indicating a precoding scheme determined in advance in association with the group ID of the selected group. The precoding scheme selection signal for each of the wireless reception devices 200 is output in such a manner that a signal for selecting linear precoding for all the wireless reception devices 200 is output if the selected group is the first group, and a signal for selecting non-linear precoding for basically all the wireless reception devices 200 is output if the selected group is the second group. If the selected group is the third group, a signal for selecting linear precoding for the wireless reception devices 200 up to the wireless reception device 200 with an ordinal number of a predetermined value N in the group, and a signal for selecting non-linear precoding for the wireless reception devices 200 with ordinal numbers greater than or equal to N+1 are output as precoding scheme selection signals for the individual wireless reception devices 200. However, even if the selected group is the second group, a signal for selecting linear preceding for a linear wireless reception device is output as a precoding scheme selection signal if the linear wireless reception device belongs to the second group. In addition, if the selected group is the third group and the ordinal number of a linear wireless reception device is greater than or equal to N+1, a signal for selecting linear precoding for the linear wireless reception device is output as a preceding scheme selection signal.

FIG. 16 is a diagram illustrating an example of group information created by the group construction unit 307 of the wireless transmission device 100 and shared with the wireless reception devices 200a2 or 200b2 and 200c in Embodiment 2.3 of the present invention. In the illustration of FIG. 16, by way of example, group IDs are 6 bits (0 to 63), and the group IDs up to 20 are defined to be assigned to a first group for which linear precoding is used, group IDs 21 to 40 are defined to be assigned to a second group for which non-linear preceding is used, and group ID 41 and subsequent group IDs are defined to are assigned to a third group for which linear preceding and non-linear preceding are mixed. In the illustrated example, group IDs 0 and 63 are unoccupied for groups for multi-user MIMO since these group IDs will be used as numbers indicating special uses (such as those to be used for single user MIMO or before definition of groups). A first group having group IDs 1 to 20 for which linear precoding is used as a precoding scheme, a second group having group IDs 21 to 40 for which non-linear precoding is used, and a third group having group IDs 41 to 62 for which linear preceding and non-linear preceding are used in a mixed manner are defined for the wireless reception devices 200-1 to 200-8. Here, as in FIG. 14 and FIG. 15, the underlined wireless reception devices 200 are linear wireless reception devices supporting only linear precoding.

In the following description, by way of example, the precoding threshold value N described above is 2. For the third group, for example, for the group with group ID 42, the wireless transmission device 100 does not perform a modulo operation on the transmit data addressed to the wireless reception devices 200-3 and 200-5 with ordinal numbers up to 2, and the wireless transmission device 100 performs a modulo operation on the transmit data addressed to the wireless reception devices 200-6 and 200-8. These pieces of transmit data are simultaneously spatially multiplexed to perform multi-user MIMO transmission. If, as in the group with group ID 62, a linear wireless reception device (the wireless reception devices 200-7) is included in the wireless reception devices 200 with ordinal numbers greater than or equal to 3 (=N+1), the wireless transmission device 100 does not perform a modulo operation on the transmit data addressed to the wireless reception devices 200-7.

As described above, according to this embodiment, in a wireless communication system configured such that the wireless transmission device 100 selects and uses one of linear precoding, non-linear precoding, and hybrid linear and non-linear preceding every time multi-user MIMO transmission is performed, it is possible to determine whether a multi-user MIMO signal transmitted from the wireless transmission device 100 has undergone linear precoding or non-linear precoding, by using a group ID, and it is possible to notify the wireless reception devices 200 of the determined precoding scheme without increasing the amount of control information. In addition, also if there is a linear wireless reception device (for example, compatible with old specifications) that does not know that the wireless transmission device 100 at the communication partner is a wireless transmission device supporting multi-user MIMO which uses non-linear precoding, this linear wireless reception device can receive a multi-user MIMO signal from the wireless transmission device 100 merely by determining whether the associated wireless reception device (local station) belongs to a group identified by the group ID without performing any additional special processing. In this case, transmit data addressed to other non-linear wireless reception devices which support non-linear precoding, which has undergone non-linear precoding, can also be simultaneously spatially multiplexed.

In addition, this embodiment can also be applied to multi-user MIMO transmission using preceding that is capable of improving transmission performance by performing linear preceding on transmit data addressed to a wireless reception device 200 that has a low effect of transmission power suppression caused by the modulo operation because of low MUI when non-linear preceding such as THP is performed and by performing non-linear preceding on transmit data addressed to a wireless reception device 200 that has a high effect of transmission power suppression caused by the modulo operation because of high MUI.

A program operating on a communication device according to the present invention may be a program for controlling a CPU (Central Processing Unit) and the like (a program for causing a computer to function) to implement the functions in the embodiments described above according to the present invention. The information handled in these devices is temporarily accumulated in a RAM (Random Access Memory) when processed, and is then stored in various ROMs such as a Flash ROM (Read Only Memory) or an HDD (Hard Disk Drive) to read, modify, and write the program by means of the CPU, if necessary. In addition, a program for implementing the functions of the configuration of FIG. 2 and the like may be recorded on a computer-readable recording medium, and the program recorded on the recording medium may be read into a computer system and executed to perform the processing of the individual units. The term "computer system", as used herein, is used to include an OS and hardware such as a peripheral device.

The term "computer-readable recording medium" refers to a storage device including a transportable medium such as a flexible disk, a magneto-optical disk, a ROM, or a CD-ROM, and a device incorporated in a computer system, such as a hard disk. In addition, the term "computer-readable recording medium" is used to include a unit that dynamically holds a program for a short period of time, such as a communication line when the program is transmitted via a network such as the Internet or a communication network such as a telephone network, and a unit that holds a program for a certain period of time, such as an internal volatile memory of a computer system serving as a server or a client in the aforementioned case. The program may be used to implement some of the functions described above, or may be implemented by combining the functions described above with a program that has already been recorded on the computer system. In addition, part or all of each of the communication devices (the wireless transmission device 100 and the wireless reception devices 200) in the foregoing embodiments may be implemented as an LSI that is typically an integrated circuit. The respective functional blocks of a communication device may be individually built into chips, or some or all of them may be integrated into a chip. The method for forming an integrated circuit is not limited to LSI, and may be implemented by a dedicated circuit or a general-purpose processor. In the case of the advent of integrated circuit technology replacing LSI due to the advancement of semiconductor technology, it is also possible to use an integrated circuit based on this technology.

While embodiments of this invention have been described in detail with reference to the drawings, a specific configuration is not limited to those embodiments, and design variations and the like within the scope of this invention also fall within the invention. The present invention can be applied to communication devices.

REFERENCE SIGNS LIST

100: wireless transmission device
200, 200-1 to 200-8, 200a, 200b, 200a2, 200b2, 200c: wireless reception device
301: wireless reception unit
303: antenna unit
305: control information acquisition unit
307: group construction unit
309: group storage unit
311: configuration information generation unit
313: channel information acquisition unit
315: selection unit
317: transmission buffer unit
319: coding unit
321: modulation unit
323, 323a, 323b: precoding unit
325: reference signal multiplexing unit
327: IFFT unit
329: GI insertion unit
331: identification information generation unit
333: wireless transmission unit
335: control unit
401: linear precoding unit
403: non-linear precoding unit
405: switching unit
501: filter calculation unit
503: linear filter unit
601: QR decomposition unit
603: interference component calculation unit
605: linear filter unit
607: modulo operation unit
607a: first modulo operation unit
607b: second modulo operation unit
607c: third modulo operation unit
607d: fourth modulo operation unit
609: interference component subtraction unit
609b: first interference component subtraction unit
609c: second interference component subtraction unit
609d: third interference component subtraction unit
701: wireless reception unit
703: antenna unit
705: configuration information acquisition unit
707: group storage unit
709: identification information acquisition unit
711, 711a, 711b, 711c: determination unit
713: modulo operation unit
715, 715a, 715b: demodulation unit
717: decoding unit
719: control unit
721: GI removal unit
723: FFT unit
725: reference signal demultiplexing unit
727: channel compensation unit
729: channel estimation unit
731: channel information generation unit
733: wireless transmission unit
801: hybrid precoding unit
803: switching unit
901: modulo operation unit
901a: first modulo operation unit
901b: second modulo operation unit
901c: third modulo operation unit
901d: fourth modulo operation unit

The invention claimed is:

1. A wireless transmission device having a plurality of transmit antennas and performing multi-user MIMO transmission, for spatially multiplexing and simultaneously transmitting transmit data addressed to a plurality of wireless reception devices, comprising:
a group construction unit configured to create a plurality of groups representing a combination of the plurality of wireless reception devices used to perform the multi-user MIMO transmission and to determine in advance, for each of the groups, one of a linear precoding or a non-linear precoding, a precoding scheme used to perform the mult-user MIMO transmission,
a configuration information generation unit configured to generate group configuration information for notifying the plurality of wireless reception devices of a configuration and a group identification number in advance for each of the plurality of groups;
a selection unit configured to select one group from among the plurality of groups;
an identification information generation unit configured to generate group identification information for notification of the group identification number of the selected group; and
a precoding unit configured to precode transmit data addressed to each of the wireless reception devices belonging to the selected group using the precoding scheme determined in advance for the selected group, wherein
the group configuration information is transmitted to the plurality of wireless reception device in advance prior to transmission of the precoded signals, and the group identification information together with the precoded signals is transmitted to each of the wireless reception devices belonging to the selected group.

2. The wireless transmission device according to claim 1, wherein
the group construction unit further determines in advance, for each of the wireless reception devices in each of the groups, a precoding scheme used to perform the multi-user MIMO transmission, and
the precoding unit precodes transmit data addressed to each of the wireless reception devices belonging to the selected group using a precoding scheme determined in advance for each of the wireless reception devices in the selected group.

3. The wireless transmission device according to claim 1, wherein
the group construction unit further assigns one group identification number on the basis of the precoding scheme determined in advance for each of the groups among candidate group identification numbers determined in advance in association with a precoding scheme, and
the precoding unit precodes transmit data addressed to each of the wireless reception devices belonging to the selected group using the precoding scheme corresponding to the group identification number assigned to the selected group.

4. The wireless transmission device according to claim 3, wherein
the precoding unit performs a modulo operation on a signal to be transmitted to a wireless reception device belonging to the selected group in a case where the precoding scheme corresponding to the group identification number assigned to the selected group is non-linear precoding.

5. The wireless transmission device according to claim 4, wherein in a case where the precoding scheme corresponding to the group identification number assigned to the selected group is non-linear precoding, the precoding unit does not perform a modulo operation on a signal to be transmitted to a wireless reception device which supports only linear precoding in a case where the wireless reception device which supports only linear precoding belongs to the selected group.

6. The wireless transmission device according to claim 3, wherein
the precoding scheme is one of linear precoding, non-linear precoding, and hybrid linear and non-linear precoding including a mixture of linear precoding and non-linear precoding,
the group construction unit further determines an ordinal number of each of wireless reception devices belonging to each of the groups, in the group, and
in a case where the precoding scheme corresponding to the group identification number assigned to the selected group is hybrid linear and non-linear precoding, the precoding unit does not perform a modulo operation on a signal to be transmitted to a wireless reception device with an ordinal number less than or equal to a predetermined threshold value among the wireless reception devices belonging to the selected group, and performs a modulo operation on a signal to be transmitted to a wireless reception device with an ordinal number greater than the threshold value.

7. The wireless transmission device according to claim 6, wherein in a case where the precoding scheme corresponding to the group identification number assigned to the selected group is hybrid linear and non-linear precoding, the precoding unit does not perform a modulo operation on a signal to be transmitted to a wireless reception device which supports only linear precoding in a case where the wireless reception device which supports only linear precoding is included in wireless reception devices with ordinal numbers greater than the threshold value among the wireless reception devices belonging to the selected group.

8. The wireless transmission device according to claim 6, wherein the group construction unit further generates a plurality of groups including an identical combination of wireless reception devices, wherein different precoding schemes are determined in advance for each of the groups including the identical combination of wireless reception devices or the wireless reception devices are arranged in different orders in the groups.

9. A wireless reception device for receiving a multi-user MIMO signal which is obtained by spatially multiplexing transmit data addressed to a plurality of wireless reception devices and simultaneous transmitted, from a wireless transmission device having a plurality of transmit antennas, comprising:
a reception unit configured to receive group configuration information for notification of a configuration and a group identification number of a group which the plurality of wireless reception devices to which the multi-user MIMO signals are to be transmitted belongs to, prior to reception of the multi-user MIMO signals and to receive group identification information for notification of the group identification number of the group which the plurality of wireless reception devices to which the multi-user MIMO signals are to be transmitted belongs to, together with the multi-user MIMO signals;

a determination unit configured to determine whether the wireless reception device belongs to a group indicated by the group identification information on the basis of the group configuration information and the group identification information; and a reception processing unit configured to perform reception processing on the received multi-user MIMO in accordance with a precoding scheme determined in advance to one of a linear precoding or a non-linear precoding, for the wireless reception device in the group indicated by the group identification information in a case where as a result of the determination, the wireless reception device is determined to belong to the group indicated by the group identification information.

10. The wireless reception device according to claim 9, wherein
the reception processing unit performs a modulo operation on a data symbol of the received multi-user MIMO signal in a case where the precoding scheme is non-linear precoding.

11. A wireless reception device for receiving a multi-user MIMO signal which is obtained by spatially multiplexing transmit data addressed to a plurality of wireless reception devices and simultaneous transmitted, from a wireless transmission device having a plurality of transmit antennas, comprising:
a reception unit configured to receive group configuration information for notification of a configuration and a group identification number of a group which the plurality of wireless reception devices to which the multi-user MIMO signals are to be transmitted belongs to, prior to reception of the multi-user MIMO signals and to receive group identification information for notification of the group identification number of the group which the plurality of wireless reception devices to which the multi-user MIMO signals are to be transmitted belongs to, together with the multi-user MIMO signals;

a determination unit configured to determine whether the wireless reception device belongs to a group indicated by the group identification information on the basis of the group configuration information and the group identification information; and a reception processing unit configured to perform reception processing on the received multi-user MIMO signal in accordance with a precoding scheme determined in advance to be one of a linear precoding or a non-linear precoding, for the group identified by the group identification information in a case where as a result of the determination, the wireless reception device is determined to belong to the group indicated by the group identification information.

12. The wireless reception device according to claim 11, wherein
the reception processing unit performs a modulo operation on a data symbol of the received multi-user MIMO signal in a case where the precoding scheme is non-linear precoding.

13. The wireless reception device according to claim 11, wherein
the reception processing unit performs reception processing in accordance with a precoding scheme determined in advance in association with a group identification number indicated by the group identification information in a case where it is determined that the wireless reception device belongs to the group indicated by the group identification information.

14. The wireless reception device according to claim 13, wherein
the precoding scheme is one of linear precoding, non-linear precoding, and hybrid linear and non-linear precoding including a mixture of linear precoding and non-linear precoding, and
the reception processing unit performs a modulo operation on a received data symbol in a case where the precoding scheme is non-linear precoding.

15. The wireless reception device according to claim 13, wherein
the precoding scheme is one of linear precoding, non-linear precoding, and hybrid linear and non-linear precoding including a mixture of linear precoding and non-linear precoding, and
in a case where the precoding scheme is hybrid linear and non-linear precoding, the reception processing unit does not perform a modulo operation on a received data symbol in a case where the ordinal number of the wireless reception device in the group is less than or equal to a predetermined threshold value, and performs a modulo operation on a received data symbol in a case where the ordinal number of the wireless reception device in the group indicated by the group identification information is greater than the predetermined threshold value.

16. The wireless transmission device according to claim 1, wherein the group construction unit further generates a plurality of groups including an identical combination of wireless reception devices, wherein different precoding schemes are determined in advance for each of the groups including the identical combination of wireless reception devices.

* * * * *